(12) United States Patent
Tanner et al.

(10) Patent No.: US 10,613,814 B2
(45) Date of Patent: Apr. 7, 2020

(54) LOW LATENCY WIRELESS DISPLAY

(71) Applicant: Intel Corporation, Santa Clara, CA (US)

(72) Inventors: Jason Tanner, Folsom, CA (US); Arthur Jeremy Runyan, Folsom, CA (US); Satya N. Yedidi, Roseville, CA (US); Changliang Wang, Bellevue, WA (US); Ankur Shah, Folsom, CA (US); Paul S. Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 165 days.

(21) Appl. No.: 15/867,520

(22) Filed: Jan. 10, 2018

(65) Prior Publication Data
US 2019/0042177 A1 Feb. 7, 2019

(51) Int. Cl.
*G06F 3/14* (2006.01)
*H04N 19/174* (2014.01)
(Continued)

(52) U.S. Cl.
CPC ........... *G06F 3/1454* (2013.01); *G09G 5/003* (2013.01); *H04N 19/174* (2014.11);
(Continued)

(58) Field of Classification Search
CPC ........ G06F 3/1454; G09G 5/003; G09G 5/39; G09G 2360/18; G09G 2350/00; H04N 19/46
See application file for complete search history.

(56) References Cited

U.S. PATENT DOCUMENTS

2012/0237180 A1* 9/2012 Yoshioka ............... H04N 19/60
386/239
2014/0187331 A1* 7/2014 Kim ....................... A63F 13/12
463/42

(Continued)

OTHER PUBLICATIONS

IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, IEEE Std 802.11ad™-2012, (Amendment to IEEE Std 802.11™-2012, as amended by IEEE Std 802.11ae™-2012 and IEEE Std 802.11aa™-2012), Dec. 28, 2012, 628 pages (5 parks submitted); http://exocomm.com/.

*Primary Examiner* — Alexander Eisen
*Assistant Examiner* — Kebede T Teshome
(74) *Attorney, Agent, or Firm* — Patent Capital Group

(57) ABSTRACT

In one aspect, an apparatus comprises an encoder configured to encode groups of pixels of a video frame into encoded groups. The video frame comprises a plurality of tiles and each of the plurality of tiles comprises one or more of the groups. For each tile in the plurality of tiles: the encoder is configured to generate a notification based on completion of encoding an encoded tile corresponding to the tile. The apparatus comprises a packetizer configured to generate packets corresponding to the video frame simultaneous with the encoding of the video frame by the encoder. For each tile in the plurality of tiles: the packetizer is configured to generate packets from the encoded tile corresponding to the tile based on the notification.

20 Claims, 16 Drawing Sheets

(51) Int. Cl.
*H04N 19/46* (2014.01)
*G09G 5/00* (2006.01)
*H04N 19/436* (2014.01)
*G09G 5/39* (2006.01)

(52) U.S. Cl.
CPC ........... H04N 19/436 (2014.11); H04N 19/46 (2014.11); *G09G 5/39* (2013.01); *G09G 2350/00* (2013.01); *G09G 2360/18* (2013.01); *G09G 2370/16* (2013.01)

(56) References Cited

U.S. PATENT DOCUMENTS

| | | | |
|---|---|---|---|
| 2016/0182946 A1* | 6/2016 | Diefenbaugh ... | H04N 21/43637 345/2.3 |
| 2016/0275919 A1* | 9/2016 | Lawrence ................ | G09G 5/39 |
| 2018/0124355 A1* | 5/2018 | Perraud ............... | H04W 36/023 |

* cited by examiner

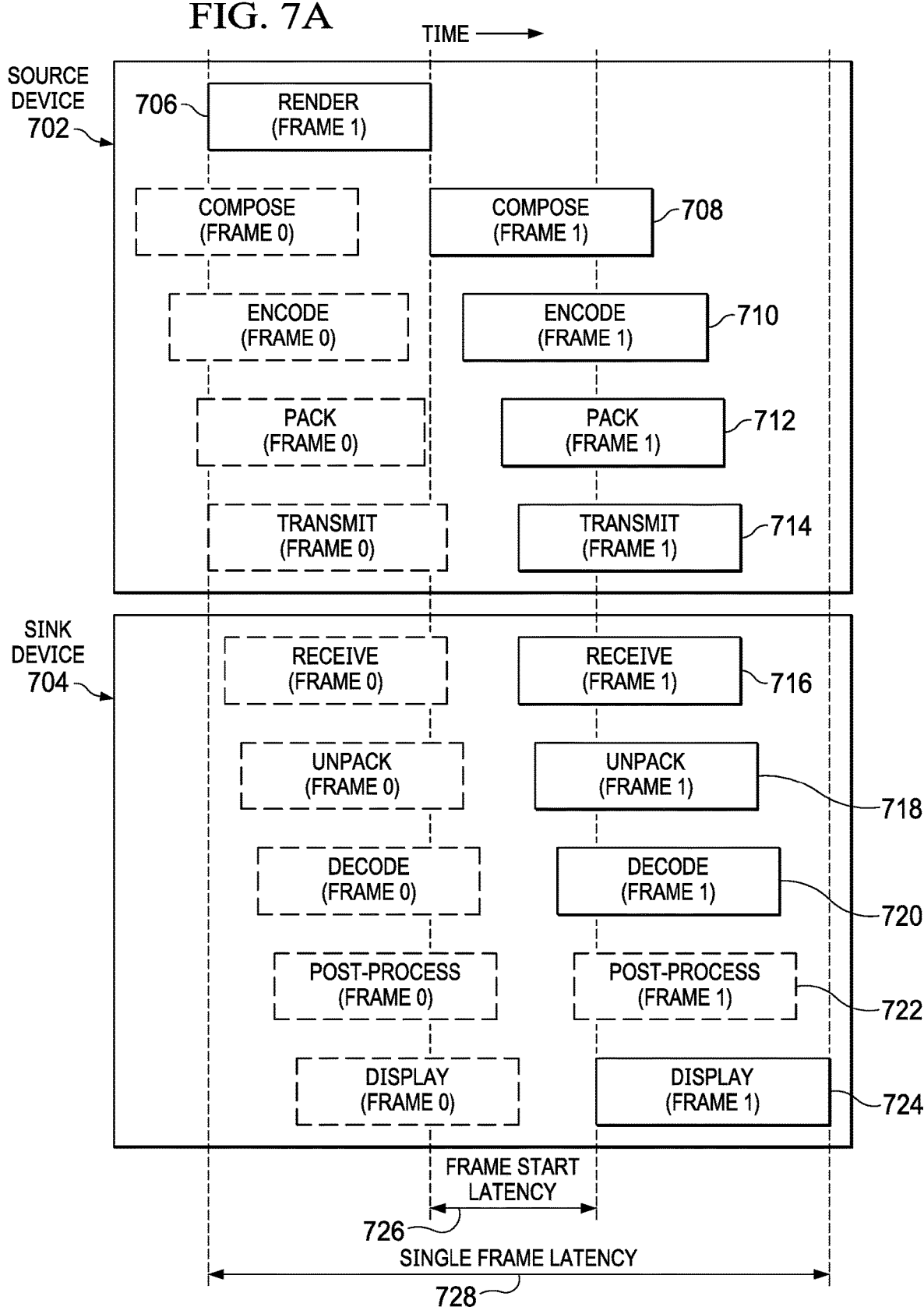

LOW LATENCY WIRELESS DISPLAY

TECHNICAL FIELD

Embodiments described generally relate to the field of display systems and more particularly to low latency wireless display systems.

BACKGROUND

Some wireless display systems allow a device to wirelessly share graphical content with another device. For example, a mobile device can wirelessly transmit graphical content to a display device (e.g., a monitor, television, or other device) for display thereon. The graphical content can be from a multitude of sources. For example, such graphical content can include, e.g., screen sharing (e.g., displaying the screen of the mobile device on the display device), audio-visual files, data generated from an operating system or an application running within an operating system (e.g., word processor, an Internet browser, a virtual meeting application, a video player, a video game, and the like). The transfer of graphical content from one device to another takes time (sometimes referred to as latency). In some cases, the latency causes problems with displaying the graphical content. For example, high latency can cause display errors (e.g., half rendered displays/frames, gargled graphical data, and the like) and/or delays (e.g., a "frozen" screen, a screen that is unresponsive or slow to respond, and the like).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 7A and 7B are simplified diagrams illustrating timing of processing a video frame through a first device and a second device, according to some embodiments of the present disclosure;

DESCRIPTION OF EMBODIMENTS

Figure 1:
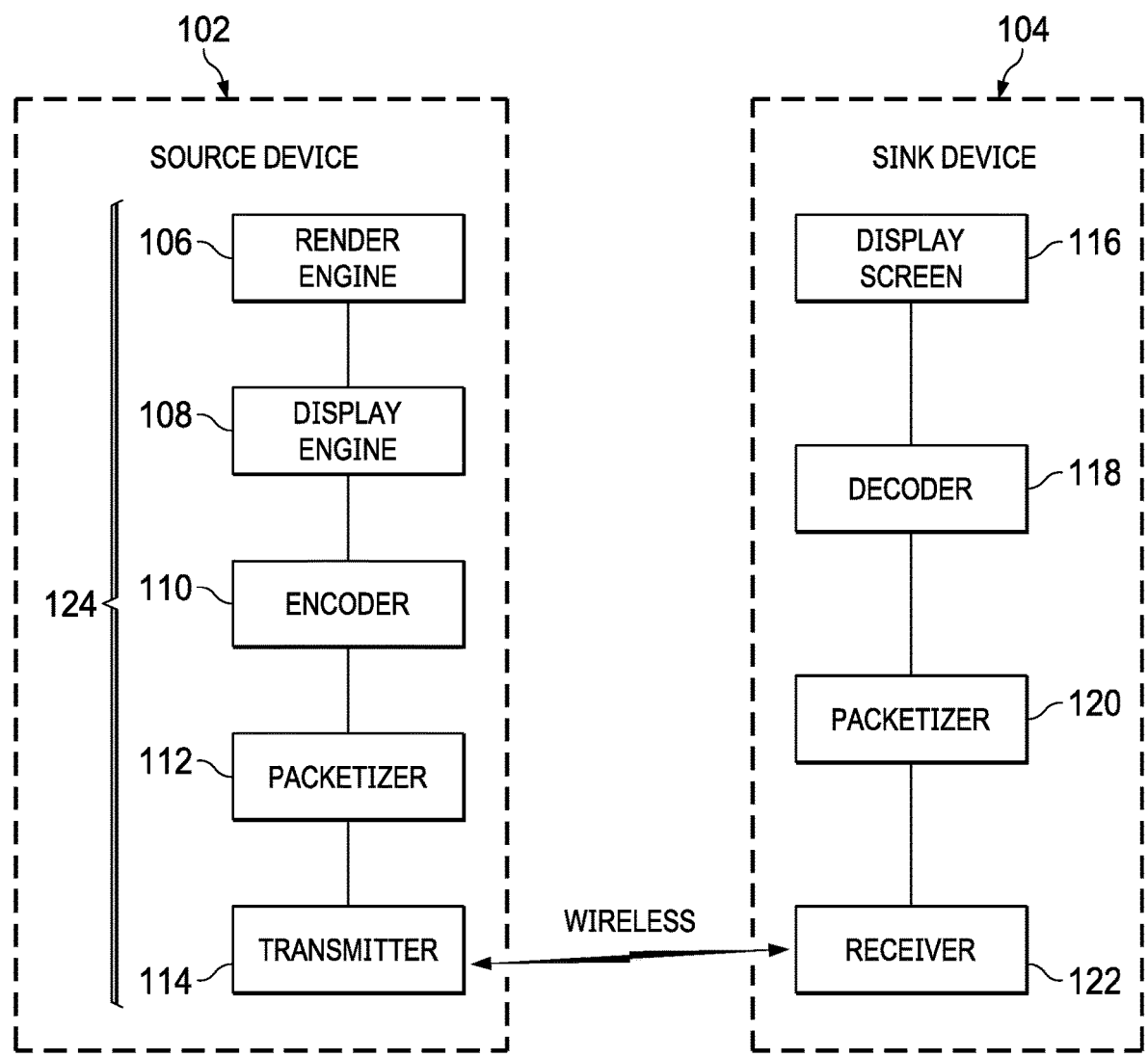
FIG. 1 is a simplified diagram of a first device using a wireless display pipeline to communicate video data with a second device, according to some embodiments of the present disclosure.

Many wireless display systems are frame-based. A frame-based wireless display system operates frame-by-frame in a video stream. In such systems, each component of the wireless display system operates on only one frame at a time; multiple components do not simultaneously work on a same frame. As an illustrative example, consider a frame-based system that contains a composition engine, an encoder, and a transmission radio. At time 1, the composition engine may compose a first frame. At time 2 (after the composition engine has composed the first frame in its entirety), the encoder encodes the first frame into a bitstream. At time 3 (after the encoder encodes the first frame, in its entirety, into the bitstream), the transmission radio transmits the bitstream to a display device for displaying (e.g., on a display screen). Each frame is processed in series by the composition engine, the encoder, and the transmission radio. After processing by a component, a frame is transferred from the component to the next component.

In frame-based wireless display systems, the latency for processing and displaying a frame can be about 200 microseconds (ms), one-way (or 400 ms two-way). However, a latency of 200 ms is prohibitively high for some applications. For example, some productivity applications (e.g., word processing, presentation production software, virtual meeting software) can require a latency of 30 ms, one-way (or 60 ms two-way); some virtual reality (VR) applications require 10 ms, one-way (or 20 ms two-way); some display monitors require a latency of about 17 ms (e.g., based on about 60 frames per second). These requirements are based, e.g., on what is required to keep the display rate high enough to prevent (or reduce the likelihood) of display errors or delays. A latency of 200 ms, as produced by some frame-based wireless display systems, is not sufficient to prevent such problems. Moreover, in some systems, e.g., utilizing Vertical Synchronization (VSync), each frame is only processed and transmitted at a rate that is synchronized with a monitor's refresh rate, which can further increase the latency (e.g., if the processing could potentially work faster than the refresh rate of the monitor).

There is a need for a wireless display system capable of providing low latency. In addition, the low latency wireless display system should be sufficient to support advanced display systems (e.g., requiring low power and high resolution).

A solution to the above issues (and other issues) disclosed herein parallelizes two or more components of a wireless display pipeline to simultaneously operate on different portions of a same video frame to produce low latency. Messages (e.g., register values, notifications, requests, and the like) communicated between components of the wireless display pipeline facilitate the parallelization without one component erroneously surpassing another component. Advantageously, the messaging facilitates scalability to multiple instances of components of the wireless display pipeline (e.g., which can be coordination based on sharing messages). The parallelization can be initiated based on software-based messages (e.g., from an operating system (OS) or application running in the OS), which reduces latency relative to hardware-synchronized systems such as VSync, which limits the output of a system to the refresh rate of a monitor. Moreover, the wireless display pipeline supports multiple instances of components, each of which can be managed by the OS and/or a microprocessor. Embodiments of the present disclosure are parallelized to on work units smaller than a video frame (e.g., a pixel, a group of pixels, a tile including one or more blocks, or any other portion of a video frame), which reduces latency relative to frame-based systems. In addition, some embodiments disclosed herein support multiple instances of the components of the wireless display pipeline to further reduce latency.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not, in itself, dictate a relationship between the various embodiments and/or configurations discussed.

Turning to FIG. 1, FIG. 1 illustrates a simplified diagram of a system comprising a video source device 102 (source device 102) using a wireless display pipeline 124 to wirelessly communicate video data with a video sink device 104 (sink device 104), according to some embodiments of the present disclosure. The video data comprises an ordered set of video frames. Each video frame is made of a set of pixels. The video data may be stored locally on the video source device 102, stored remotely from the video source device 102 (cloud storage service, online file storage), and/or may streamed from an online source (e.g., a website, an application connected to a source of the video data over the Internet, an online video streaming service, an online live television streaming service). The system comprises a first device (source device 102) configured to wirelessly transmit of a portion of a video frame and a second device (sink device 104) configured to receive wireless transmission of the portion of a video frame. A wireless display pipeline is configured to reduce latency associated with a display of the video frame (video data) on the second device based on one of the components being configured to operate in parallel with others of the components on the video frame.

In general, the video data may be from any source on the source device. For example, any graphical data from the source device 102 is treated as a video data for the purpose of transmission to the sink device 104. In some cases, the video data is produced by an application playing a video (e.g., a video player application, an Internet browser, a virtual meeting application, and the like) or by an application generating multiple frames (e.g., a gaming application, a simulation application, and the like). However, the video data can be produced from any program executing on the source device (i.e., not limited to video applications, per se). For example, an operating system can generate a virtual desktop, views of which can be included in the video data for transferred to the sink device (e.g., for screen sharing). As another example, a view of a word processing application can be included in the video data for transferred to the sink device. Any source of graphical data from the source device can be utilized in the video data from transmission to and display in the sink device 104.

The source device 102 comprises the wireless display pipeline 124, which comprises (components) a render engine 106, a display engine 108, an encoder 110, a packetizer 112, and a transmitter 114. The wireless display pipeline 124 reduces latency associated with a display of the video data based on one of the components being configured to operate in parallel with others of the components on a same video frame. For example, the two or more of the components can simultaneously operate on the same video frame. The sink device 104 comprises a display screen 116, a decoder 118, a packetizer 120, and a receiver 122. In operation, the source device 102 processes the video data through the wireless display pipeline 124 to facilitate transferring the video data to the sink device 104. The sink device 104 processes the video data (received from the source device 102) facilitate displaying the video data on the display screen 116.

The source device 102 processes the video data through the wireless display pipeline 124 in a particular order. In this example, the video data is processed through the wireless display pipeline 124 in the following order 1) the render engine 106, 2) the display engine 108, 3) the encoder 110, 4) the packetizer 112, and 5) the transmitter 114. The render engine 106 renders the video data. The display engine 108 composes the video data. The encoder 110 encodes (e.g., compresses) the video data into a video compression format. The compression enables more the vide data to consume less memory for storage and/or to consume less bandwidth for transmission. The packetizer 112 generate packets corresponding to the video data. The transceiver 114 transmits the packets corresponding to the video data to the sink device 104. Upstream components process the video data and transfer the processed data to a downstream component for further processing. For example, the render engine 106 is upstream of the display engine 108 (and the display engine 108 is downstream of the render engine 106), the display engine 108 is upstream of the encoder 110 (and the encoder 110 is downstream of the display engine 108), etc. Video data is sequentially processed by each of the components and then passed downstream to an adjacent component in the wireless display pipeline 124.

Though the wireless display pipeline includes several components (in a particular order), each of the components is only utilized when it is needed for a particular wireless display situation. There are situations in which some components of the wireless display pipeline are not utilized. In such situations, a relative order of components is preserved with only the unused component(s) removed from the particular order. For example, rendering may not be utilized while composition is utilized (e.g., when an application playing a video with subtitles (which require composition) is the only source of graphical content for wireless display). Thus, the particular order may be amended to remove the render engine 106 and result in the following pipeline order: 1) the display engine 108, 2) the encoder 110, 3) the packetizer 112, and 4) the transmitter 114 (each of which may work in parallel with the others). In other examples, rendering is utilized and composition is not utilized (e.g., when a 3-dimensional gaming application is playing in a full screen mode). Thus, the particular order may be amended to remove the display engine 108 and result in the following pipeline order: 1) the render engine 106, 2) the encoder 110, 3) the packetizer 112, and 4) the transmitter 114 (each of which may work in parallel with the others). In still other examples, neither rendering nor composition is utilized (e.g., when an application playing a video without subtitles is the only source of graphical content for wireless display, such as in full screen mode). Thus, the particular order may be amended to remove the display engine 108 and the render engine 106, resulting in the following pipeline order: 1) the encoder 110, 3) the packetizer 112, and 4) the transmitter 114 (each of which may work in parallel with the others).

The source device 102 processes the video data in a particular order to display the video data on the display screen 116. In this example, the video data is processed through the sink device 104 in the following order: 1) the receiver 122, 2) the packetizer 120, 3) the decoder 118, and 4) the display screen 116. The receiver 122 receives the packets corresponding to the video data (from the source 102). The packetizer 120 unpacks the video data from the packets. The decoder 118 decodes the video data from the video compression format. The display screen 116 displays the video data. Because the components of the wireless display pipeline 124 operate in parallel with one another on the same video frame, the latency is low, e.g., about 25 ms or less (e.g., as measured between rendering (i.e., by the render engine 106) and displaying the video data (i.e., by the display screen 116)).

Figure 2:
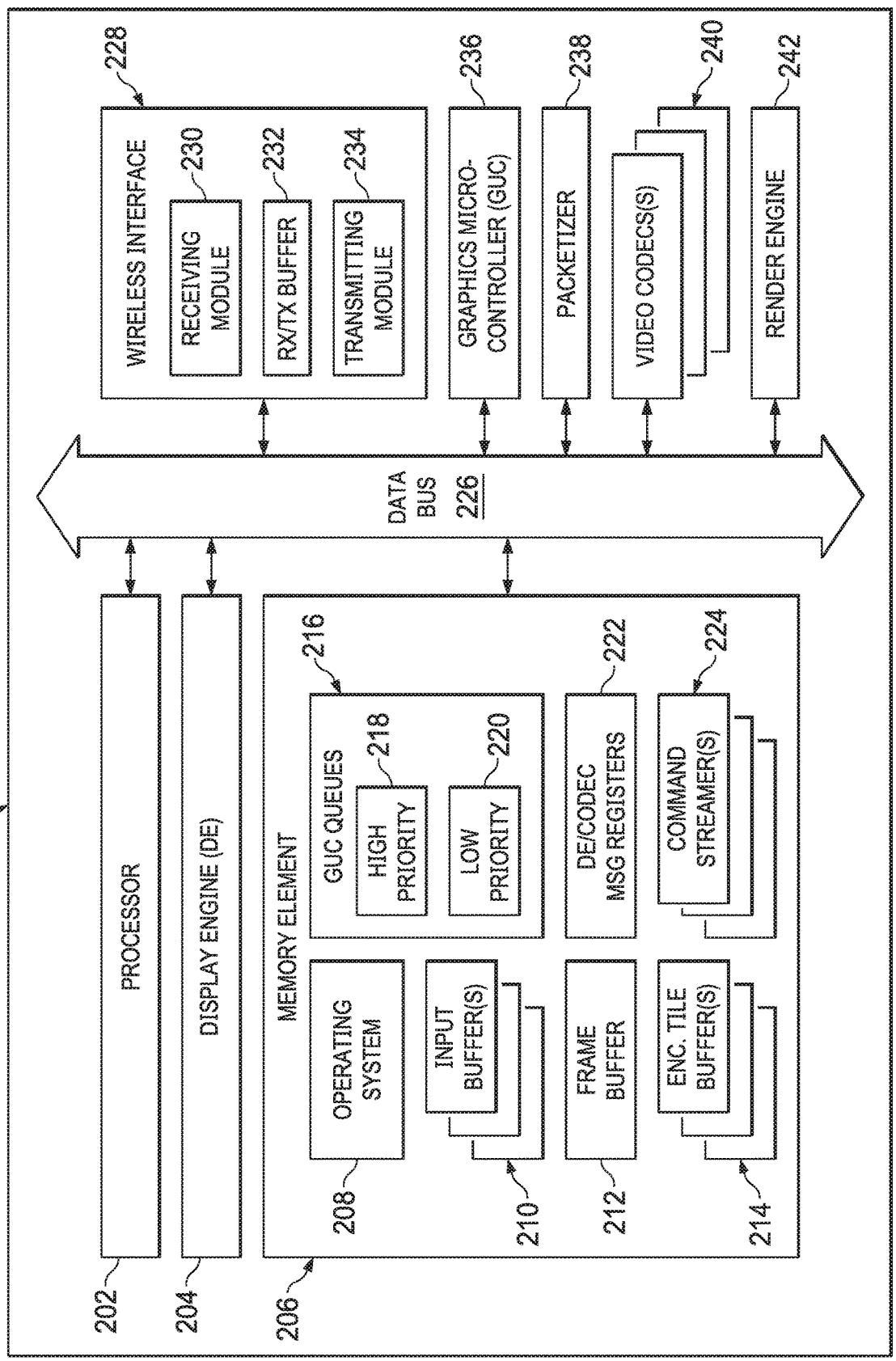
FIG. 2 is a simplified diagram of a device, according to some embodiments of the present disclosure.

Each of the source device 102 and the sink device 104 include hardware, firmware, and/or software to facilitate the parallelized pipeline and/or the wireless transfer of the video data between the two. FIG. 2 illustrates further details of an example device.

Turning to FIG. 2, FIG. 2 illustrates a simplified diagram of a device 200, according to some embodiments of the present disclosure. The device 200 comprises a processor 202, a display engine (DE) 204, a memory element 206, a wireless interface 228, a graphics microcontroller (GUC) 236, a packetizer 238, one or more video codecs 240, and a render engine 242, each of which is operably coupled others by a data bus 226. The memory element 206 comprises an operating system (OS) 208 (e.g., code for execution by the processor 202), one or more input buffers 210, a frame buffer 212, one or more encoded title buffers 214, a GUC queue 216, message registers 222 (i.e., for the DE 204 and video codecs 240), and one or more command streamers 224. The GUC queue 216 comprises a high priority queue 218 and a low priority queue 220. Requests in the high priority queue 218 are processed by the video codecs 240 before the requests in the low priority queue 220. The wireless interface 228 comprises a receiving module 230, a receive (Rx) and transmit (Tx) buffer 232, and a transmitting module 234. The device 200 may be used to carry out the functions describe herein to be performed by a wireless display pipeline, a source device, a sink device, and any systems, apparatuses, methods, logic, and/or other teachings disclosed herein. For example, the device 200 can execute instructions corresponding to at least a portion of a wireless display pipeline (e.g., based on instructions executed by the render engine 242, the display engine 204, the video codecs 240, the packetizer 238, and/or the wireless interface 228).

It is noted that the device 200 may be any type of device. The device 200 may be any device operable to establish a wireless communication session with another device, such as a computer, a personal digital assistant (PDA), a laptop or electronic notebook, a cellular telephone, a tablet, a gaming console, or any other device, component, element, network element, or object capable of initiating video, media, and/or data exchanges within a communication system.

The memory element 206 is configured to store data used for the operations described herein. This includes the memory element 206 being able to store software, logic, code, or processor instructions that are executed to carry out the activities described in this Specification and to store video data. Though depicted as a single block for clarity in FIG. 2, the memory element 206 may comprise multiple memory elements. For example, the memory element 206 may comprise any of a hard disk drive (HDD), a solid-state drive (SSD), random access memory (RAM), a remote storage device (e.g., cloud storage service, online file storage), other memory elements (or combinations thereof). To achieve low latency, some data may be stored in main memory (e.g., HDD or SRAM) while other data is stored in RAM (where fast access is needed to achieve/maintain low latency). The processor 202 can execute any type of instructions associated with the data to achieve the operations detailed herein in this Specification.

The processor 202 may be any type of processor, such as a microprocessor, an embedded processor, a digital signal processor (DSP), a network processor, a multi-core processor, a single core processor, or other device to execute code. The processor 202 may be a single-threaded or multi-threaded in that it may include more than one hardware thread context (or "logical processor"). The processor 202 is configured to execute instruction code in a manner disclosed herein. Though depicted as a single block for clarity in FIG. 2, the processor 202 may comprise multiple (one or more) processing elements.

The wireless interface 228 comprises the receiving module 230, the Rx/Tx buffer 232, and the transmitting module 234. The wireless interface 228 is to wirelessly transmit and wirelessly receive data (e.g., packets). The wireless interface 228 is configured to implement a wireless communication protocol. Some wireless communication protocols include, e.g., (but are not limited to) WI-FI (e.g., the Institute of Electrical and Electronics Engineers (IEEE) 802.11 such as IEEE std 802.11-2016), WIGIG (e.g., IEEE 802.11ad-2012, published December 2013), and the like. The wireless interface 228 is configured to wirelessly transmit and wirelessly receive packets that comply with such a wireless communication protocol. In some embodiments, the wireless interface 228 is a transceiver or a transmitter-receiver. As an example, the receiving module 230 may comprise a radio receiver configured to receive electromagnetic waves in a radio frequency (e.g., packets encoded in a wireless communication protocol therein); the transmitting module 234 may comprise a radio transmitter configured to transmit electromagnetic waves in a radio frequency (e.g., packets encoded in a wireless communication protocol therein). The transmitting module 234 and the receiving module 230 can utilize the Rx/Tx buffer 232 to store data that is to be transmitted and/or to store data that is received.

The render engine 242 renders graphical data. The render engine 242 places (e.g., writes) the rendered graphical data into an input buffer in the one or more input buffers 210. The render engine 242 can produce graphic representations of data generated by a program. Such graphic representations may include, e.g., images, pixels, a video frame (or a portion of any of the foregoing). Many programs generate data that must be graphically represented on a screen. Such a program may include, e.g., an operating system (e.g., OS 208), an application running within an operating system (e.g., word processor, an Internet browser, a virtual meeting application, a video player, a video game, and the like). Each program produces data that can be rendered for display on a screen. For example, text, icons, images, location of icons for the program, images corresponding to the icons, size and location of letters in the program or any other data for which a graphic representation may be displayed. The render engine 242 can for example, process data from a 3-dimensional virtual reality game to render a video frame based on inputs from an input device (e.g., render video frames that show a user's virtual perspective based on movements from a joystick). The render engine 242 places (e.g., writes) the rendered video frame into an input buffer in the one or more input buffers 210. In some embodiments, the render engine comprises one or more execution units (EUs).

The display engine (DE) 204 composes (or composites) graphical data such as video data retrieved (e.g., read) from the one or more input buffers 210 (e.g., produced by the render engine 242). After composing a pixel, the DE 204 places (e.g., writes) the pixel into the frame buffer 212 to create a video frame. The graphical data may come from multiple sources. For example, the device 200 may execute multiple applications, each of which produces graphical data. The DE 204 analyses the graphical data to determine what should be visible and/or what should not be visible. The DE 204 composes the graphical data, e.g., by determining and selecting (or producing) a set of pixels for display based on the graphical data from one or more of the sources of the graphical data. For example, when a one program is visually on "top" of (and, e.g., completely obfuscating) another program, the DE 204 determines that only the topmost program should be to visible (and selects the corresponding pixels for inclusion in an image or a video frame). In such an example, the composing (by the DE 204) can comprise, for each pixel location in a video frame, selecting one pixel from a plurality of options for pixels for the location (e.g. from multiple sources) and placing the one pixel selected in the pixel location in the video frame (e.g., in the frame buffer 212). As another example, the composing (by the DE 204) can comprise blending pixels from two or more of the multiple sources) to create a new pixel. For example, a user interface of an application may have partially transparency (or partially opaque) portions that enable other background elements to be seen (e.g., as shaded). In such an example, the DE 204 may blend the partially transparency pixel from the menu with a pixel from another background element to create a final pixel for display. In other examples, e.g., where the graphical data is produced by only a single source, the DE 204 takes the pixels directly from the single source (e.g., and passed them to the next component in the wireless display pipeline 124. It is noted that the term "compose" (and variations such as "composing"), the term "composite" (and variations such as "compositing"), and "composition" are used interchangeable in the present disclosure to generally refer to the synthesis/analysis to, e.g., determine what should (or should not) be visible and to generate (e.g., select, produce, blend) pixels based on the determination (e.g., as performed by the DE 204). The DE 204 can be implemented in hardware, software, or firmware (or a combination of any of the foregoing). Embodiments of the present disclosure reduce latency associated with a display of the video frame based on two or more components of a wireless display pipeline being configured to operate in parallel with one another. For example, the DE 204 can work in parallel with other components of the wireless display pipeline.

The display engine (DE) 204 consumes little power. Thus, the DE 204 is a power-efficient hardware to use for relatively simple graphics tasks (e.g., compositing a video frame, blending pixels, selecting pixels, blending of flat frames (choosing pixels), alpha blend, scaling frames, overlaying menus, blending videos over an application window, and the like). In contrast, an execution unit (EU) consumes much more power than the DE 204, e.g., because such EUs process more complex graphical tasks (e.g., rendering frames at a high rate, rendering complex 3D objects and mapping textures onto such surface, and the like). However, some existing system utilize the EUs for simple tasks. Advantageously, the embodiments disclosed herein utilize the relatively low-power display engine for simple graphics tasks (instead of EUs, which not only lowers the amount of power consumed by the compositing process (and other simple graphics tasks) but also frees the EUs processing power to be used elsewhere (e.g., for the more complex processing). In addition, the DE 204 works in parallel with other components of the device to achieve low latency transfer of video data to another device. Such efficient use of hardware resources can lower the overall power consumption of the device 200 while also supporting a low-latency wireless display pipeline.

Each video codec of the one or more video codecs 240 (the video codecs 240) can both encode and decode video frames based on a video compression format (also known as a video coding format). Operations for encode and decode are similar. Thus, the same hardware can do both encode and decode. For example, a video codec is operable to encode an unencoded video frame into an encoded video frame (e.g., bitstream) that complies with a video compression standard. Once encoded, the encoded video frames are stored in the one or more encoded title buffers 214. Similarly, the video codec is operable to decode an encoded video frame into an unencoded video frame. As a further example, after a portion of a video frame is composed (e.g., by the display engine 204) into the frame buffer 212, the video codecs 240 encode the portion of the frame into an encoded bitstream. The video codecs 240 can store the encoded bitstream in the buffers 214. The video codecs 240 can be implemented in hardware, software, or firmware (or a combination of any of the foregoing).

Some video compression standards are developed by the Moving Picture Experts Group (MPEG) working group of the International Organization for Standardization (ISO) and the International Electrotechnical Commission (IEC) (referred to herein as the "ISO/IEC MPEG group"). For example, the ISO/IEC MPEG group publishes a standard, ISO/IEC 14496 ("Information technology—Coding of audio-visual objects"). Part 10 of the standard, titled "Advanced Video Coding" (e.g., Edition 8, which was published in September 2014) defines a video compression standard for advanced video coding for coding of audio-visual objects (referred to herein as "AVC"). In addition, the ISO/IEC MPEG group publishes a standard, ISO/IEC 23008 ("Information technology—High efficiency coding and media delivery in heterogeneous environments"). Part 2 of the standard, titled "High efficiency video coding" (HEVC) (e.g., Edition 3, which was published in October 2017) defines a video compression standard for high efficiency video coding (referred to herein as "HEVC"). The present disclosure is not limited to HEVC or AVC. Indeed, the teachings of the present disclosure are applicable to other video compression standards.

In operation, a video codec (e.g., any of the video codecs 240) encodes and/or decodes groups of pixels (blocks) at a time based on a video compression standard. Each video compression standard describes the size of the group of pixels (e.g., rectangular dimensions of mXn). For example, AVC video compression standard refers to the groups of pixels as "macro blocks", while the HEVC video compression standard the groups of pixels as a largest coding unit (LCU). A tile is a group of contiguous blocks. Thus, the size of a tile is a multiple of the size of a block. Each video compression standard may place an upper limit on a number of tiles in a video frame. For example, HEVC may use a LCU (block) size of 22×20 and/or limit the number of tiles to be about 400 per video frame). The encoders/decoders (codecs) of the present disclosure may working on group of pixels (blocks) of any size and/or tiles of any size. Embodiments of the present disclosure reduce latency associated with a display of the video frame based on two or more components of a wireless display pipeline being configured to operate in parallel with one another. For example, the video codecs 240 can work in parallel with other components of the wireless display pipeline. In addition, the video codecs 240 (e.g., a plurality of encoders) can be used to simultaneously encode different blocks of the same video frame.

Each video codec of the one or more video codecs 240 is a shared between a wireless display pipeline (e.g., the wireless display pipeline 124) and the operating system (OS) 208; the graphics microcontroller (GUC) 236 manages the sharing between the wireless display pipeline and the OS 208 and uses the command streamers 224 to stream commands based on a source of and/or a type of processing requested. This is in stark contrast to some fixed-function encoders/decoders, which have a fixed functionality designed for processing data from a single source. While fixed-function encoders/decoders may require two separate (and redundant) sets of encode/decode hardware (i.e., one for the OS and another for the DE), the video codecs 240 are consolidated into a single resource shared by the OS 208 and the wireless display pipeline. For example, the encode and/or decode capabilities of the video codecs 240 can be requested (or scheduled for use) by a component of the wireless display pipeline (e.g., the display engine 204), by the OS 208, and/or by applications running on the OS 208. Advantageously, this consolidation into a single, schedulable resource can reduce the cost and complexity of hardware systems to implement wireless display pipelines while also achieving low latency. The wireless display pipeline of the present disclosure to achieve low latency based at least in part on the video codecs 240 being shared and schedulable.

Each of the video codecs 240 is associated with a corresponding one of the commands streamers 224. Each of the command streamers 224 to configured to stream commands to a corresponding one of the video codecs 240. The commands include instructions to be executed by the video codec to carry out a particular function. Each of the video codecs 240 is configured to receive the commands from the corresponding one of the commands streamers 224 and execute the commands to complete the particular function. The GUC 236 uses the command streamers 224 to stream commands to a corresponding one of the video codecs 240 based on source of a request (e.g., from the OS 208, from a component of the wireless display pipeline, from an application executing within the OS 208, and the like) and/or a type of processing requested (e.g., encode or decode).

A challenge with sharing the video codecs 240 is that use of the video codecs 240 by the OS 208 could potentially increase the latency for the wireless display pipeline (e.g., due to the video codec hardware being busy with work from the OS, which thereby slows the ability of the hardware to quickly encode/decode for the wireless display pipeline). Advantageously, the GUC 236 addresses this challenge by utilizing the GUC queues 216 to manage the relative priority of requests coming from the wireless display pipeline and the OS 208. In general, the GUC 236 manages various parallel processes and hardware. Because achieving a low latency wireless display requires that requests from the wireless display pipeline be instantly fulfilled, the GUC 236 assigns requests that originate from the wireless display pipeline a higher priority than requests that originate from the OS 208 (and application executing thereon). For example, when the GUC 236 determines that a request for encoding (e.g., a notification) originated from the DE 204, it can assign the request a high priority (e.g., place it in the high priority queue 218). Since such requests are part of the wireless display pipeline (which require fast processing for low latency), they are given higher priority than other requests. Requests in the high priority queue 218 are processed by the video codecs 240 before the requests in the low priority queue 220. When the GUC 236 determines that a request for encoding originated from the OS 208, it can assign the request a low priority (e.g., place it in the low priority queue 220). Thus, requests from the OS 208 are given a lower priority than requests from the wireless display pipeline.

The OS 208 can relay requests for processing by the video codecs 240 (e.g., even in cases where the request does not originate from the OS 208). For example, requests that originate from the DE 204 may be relayed by the OS 208 to the video codecs 240. This enables the OS 208 to track the requests (e.g., a hardware or software component from which the request originated, whether the request has been complete (fulfilled).

The GUC 236 uses the GUC queues 216 and the command streamers 224 to manage simultaneous processing of a same video frame (composed by from the display engine 204) by the one or more video codecs 240. For example, the display engine 204 may generate a notification (i.e., a request originating from the DE 204) indicating that a video frame has been at least partially composed by the display engine 204 and is ready for encoding. The display engine 204 transmits the notification to the OS 208, which determines the original source (in this case the DE 204) and the type of request (in this case an encoding request). The OS may then relay the request (And information about the source and type of request) to the GUC 236. The GUC 236 places the request in the appropriate queue (in this case the high priority queue 218). The GUC 236 also transforms the request into a set of commands for streaming to a corresponding video codec by one of the command streamers 224. When the request is retrieved from the GUC queue 216, the commands corresponding to the request are streamed to the corresponding video codec. For example, when the GUC 236 determines that one of the video codecs 240 is available (e.g., based on the GUC 236 determining that the command stream—corresponding to the available video codec—is empty), the GUC 236 checks whether there are any requests in the high priority queue 218. If there is work in the high priority queue 218, then the GUC 236 assigns the request (from the high priority queue 218) work to the available video codec. If there is no work in the high priority queue 218, then the GUC 236 checks whether there are any requests in the low priority queue 22o. Only then (when the high priority queue is empty) does the GUC 236 assign requests from the low priority queue 220 work to the available video codec. Advantageously, the GUC 236 can manage simultaneous processing of the same video frame by the one or more video codecs 240. Since multiple video codecs may be used to process different portions of the same frame, the GUC 236 can be used to schedule and coordinate the parallel processing by the video codecs. In some examples, the GUC 236 is inclusive of an integrated circuit that is configured to execute firmware for managing such parallel processes.

The packetizer 238 is configured to generate packets corresponding to graphical data. For example, after a portion of a video frame is encoded (e.g., by one of the video codecs 240) into a bitstream, the packetizer 238 generates packets from the bitstream. The packetizer 238 puts the bitstream into packets that are comply with a wireless communication protocol used by the wireless interface 228. The packetizer 238 can be implemented in hardware, software, or firmware (or a combination of any of the foregoing). Embodiments of the present disclosure reduce latency associated with a display of the video frame based on two or more components of a wireless display pipeline being configured to operate in parallel with one another. For example, the packetizer 238 can work in parallel with other components of the wireless display pipeline.

The device 200 may comprise (e.g., be operably coupled to) a display device, e.g., a CRT (cathode ray tube) or LCD (liquid crystal display) monitor, for displaying the video data, a keyboard, and a pointing device, e.g., a mouse or a trackball, by which a user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

A wireless display pipeline of the present disclosure may include components comprising: an encoder configured to encode a first portion of the video frame; a packetizer configured to generate packets corresponding to a second portion of the video frame simultaneous with the encoding of the first portion of the video frame by the encoder; and a transmitter configured to wirelessly transmit packets corresponding to a third portion of the video frame simultaneous with the generation of packets corresponding to the second portion of the video frame by the packetizer. The wireless display pipeline can reduce latency associated with a display of the video frame based on one of the components being configured to operate in parallel with others of the components on the video frame. In addition, the components of the wireless display pipeline may operate in parallel with on the video frame with outside components that are not a part of the wireless display pipeline (e.g., any application that can contribute graphical data on a basis of a portion of a video frame (e.g., pixel-by-pixel, line-by-line, column-by-column, block-by-block, tile-by-tile, or basis)). For example, the wireless display pipeline may be implemented with an application programming interface (API) that enables parallel processing of a single video frame in tandem with such outside components. Other components such as a render engine and a display engine may be operated in parallel with the components of the wireless display pipeline based on whether such processing is needed (e.g., if rendering and/or composition is needed). One or more processor may determine whether such processing is needed (e.g., based on a source of the graphical data to be used for a video frame). A21. The apparatus of claim A1, wherein the apparatus is configured to reduce latency associated with display of the video frame based on the encoder, the packetizer, and the transmitter being configured to operate in parallel on the video frame. For example, a render engine may be configured to render the fifth portion of the video frame. The encoder can encode the first portion of the video frame simultaneous with the rendering of the fifth portion of the video frame by the encoder. In addition, a display engine may be configured to compose a sixth portion of a video frame. The encoder can encode the first portion of the video frame simultaneous with the composing of the sixth portion of the video frame by the display engine. Alternatively, the display engine may compose the sixth portion of a video frame simultaneous with the rendering of the fifth portion of the video frame by the render engine, and the encoder may encode the first portion of the video frame simultaneous with the composing of the sixth portion of the video frame by the display engine.

Figure 3:
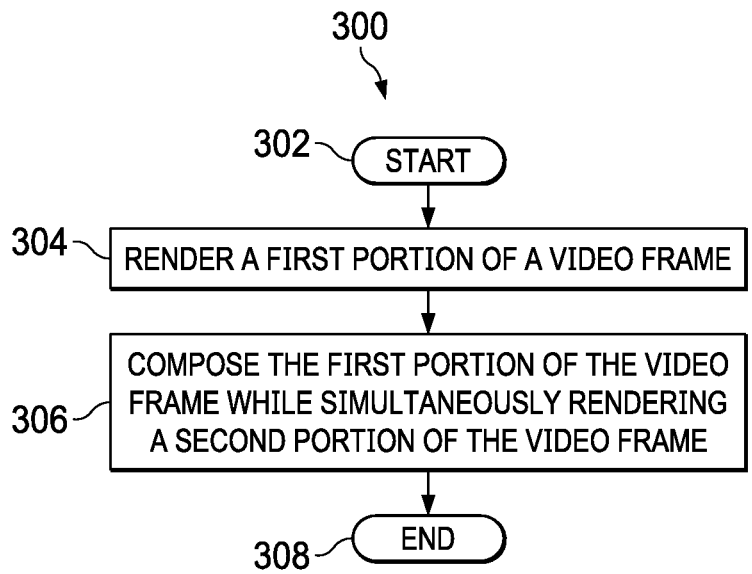
FIG. 3 illustrates logic for parallel rendering and composition of a video frame, according to some embodiments of the present disclosure.

Turning to FIG. 3, FIG. 3 illustrates logic (300) for parallel rendering and composition of a video frame, according to some embodiments of the present disclosure. The logic 300 may be executed by one or more processor (e.g., in a device (e.g., source device, a sink device), server, or other device) and/or other components (e.g., of a wireless display pipeline). The logic 300 corresponds to instructions (e.g., stored in code) and/or a method to be carried out by the one or more processor and/or other components.

Logic 300 begins at 302, which may coincide with a start/end point of other logic, routines, and/or applications. At 304, a first portion of a video frame is rendered. The rendering may be executed, e.g., by a render engine and/or a processor. For example, a render engine may be configured to render an image based on data generated by a program. The image may comprise a plurality of tiles. Each of the plurality of tiles may comprise one or more groups of pixels (blocks of pixels). At 306, the first portion of the video frame is composed while simultaneously a second portion of the video frame is rendered. The composing may be executed, e.g., by a display engine and/or the processor. For example, a display engine may be configured to compose pixels of the image corresponding to a first tile of the image simultaneous with the rendering pixels of the image corresponding to a second tile of the image by the render engine. The logic 300 advances to 308, at which the logic 300 ends. 308 may coincide with a start/end point of other logic, routines, and/or applications. The logic 300 reduces latency associated with a display of the video frame based on the rendering and the composing being executed in parallel with one another.

Figure 4:
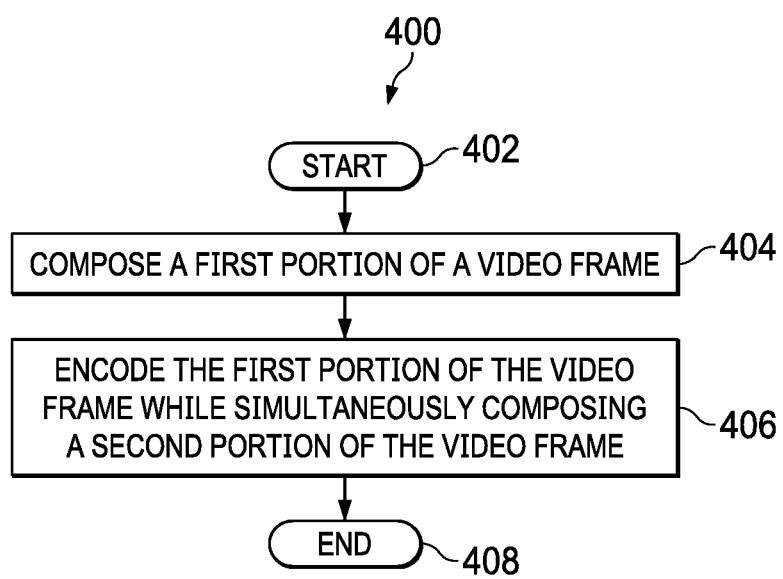
FIG. 4 illustrates logic for parallel composition and encoding of a video frame, according to some embodiments of the present disclosure.

Turning to FIG. 4, FIG. 4 illustrates logic (400) for parallel composition and encoding of a video frame, according to some embodiments of the present disclosure. The logic 400 may be executed by one or more processor (e.g., in a device (e.g., source device, a sink device), server, or other device) and/or other components (e.g., of a wireless display pipeline). The logic 400 corresponds to instructions (e.g., stored in code) and/or a method to be carried out by the one or more processor and/or other components.

Logic 400 begins at 402, which may coincide with a start/end point of other logic, routines, and/or applications. At 404, a first portion of a video frame is composed. The composing may be executed, e.g., by a display engine and/or a processor. For example, a display engine may be configured to compose pixels of a video frame, and generate a notification based on a threshold portion of the video frame being composed. At 406, the first portion of the video frame is encoded while simultaneously a second portion of the video frame is composed. The encoding may be executed, e.g., by an encoder (e.g., a standalone encoder, a video codec, and the like) and/or the processor. For example, an encoder may be configured to encode, based on the notification, groups of the pixels of the video frame simultaneous with the composition of the video frame by the display engine. For each group (in the groups) the encoder may: encode the group based on a determination that the group has been encoded (e.g., the group is included in a first subset of the pixels of the video frame that are composed), and prevent encoding the group based on a determination that the group has not been encoded (e.g., the first subset excludes the group).

The logic 400 advances to 408, at which the logic 400 ends. 408 may coincide with a start/end point of other logic, routines, and/or applications. The logic 400 reduces latency associated with a display of the video frame based on the composing and the encoding being executed in parallel with one another.

Figure 5:
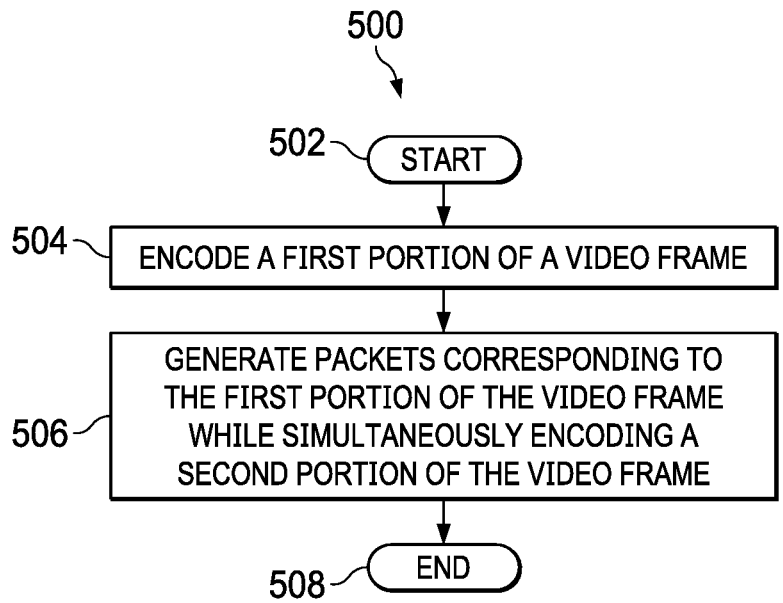
FIG. 5 illustrates logic for parallel encoding and packetizing of a video frame, according to some embodiments of the present disclosure.

Turning to FIG. 5, FIG. 5 illustrates logic (500) for parallel encoding and packetizing of a video frame, according to some embodiments of the present disclosure. The logic 500 may be executed by one or more processor (e.g., in a device (e.g., source device, a sink device), server, or other device) and/or other components (e.g., of a wireless display pipeline). The logic 500 corresponds to instructions (e.g., stored in code) and/or a method to be carried out by the one or more processor and/or other components.

Logic 500 begins at 502, which may coincide with a start/end point of other logic, routines, and/or applications. At 504, a first portion of a video frame is encoded. The encoding may be executed, e.g., by an encoder (e.g., a standalone encoder, a video codec, and the like) and/or a processor. For example, an encoder may be configured to encode groups of pixels of a video frame into encoded groups. The video frame can comprise a plurality of tiles. Each of the plurality of tiles can comprises one or more of the groups. For each tile (in the plurality of tiles) the encoder may be configured to generate a notification based on completion of encoding an encoded tile corresponding to the tile. At 506, packets corresponding to the first portion of the video frame are generated while simultaneously a second portion of the video frame is encoded. The generation of the packets may be executed, e.g., by a packetizer and/or the processor. For example, a packetizer may be configured to generate packets corresponding to the video frame simultaneous with the encoding of the video frame by the encoder. For each tile (in the plurality of tiles) the packetizer may be configured to generate the packets from the encoded tile corresponding to the tile based on the notification (e.g., each notification corresponding to the tile). The logic 500 advances to 508, at which the logic 500 ends. 508 may coincide with a start/end point of other logic, routines, and/or applications. The logic 500 reduces latency associated with a display of the video frame based on the encoding and the generation of the packets being executed in parallel with one another.

Figure 6:
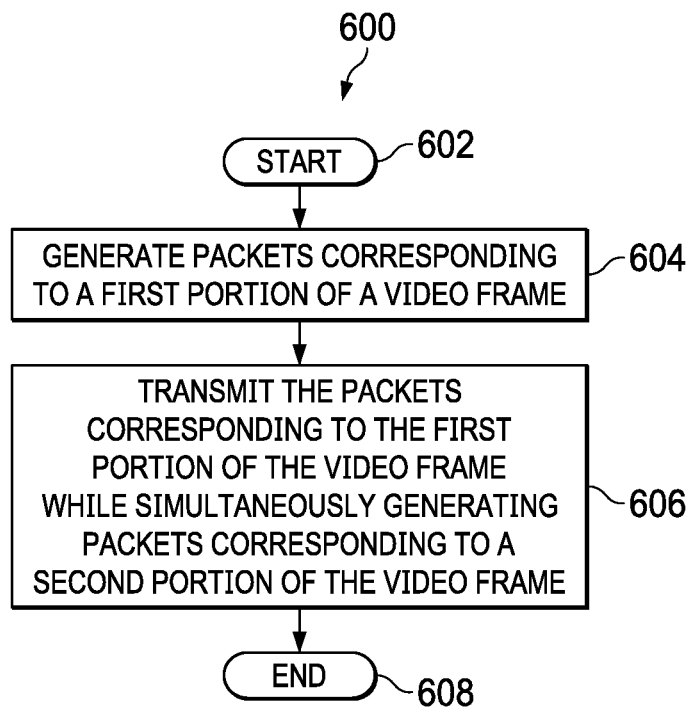
FIG. 6 illustrates logic for parallel packetizing and transmitting of a video frame, according to some embodiments of the present disclosure.

Turning to FIG. 6, FIG. 6 illustrates logic (600) for parallel packetizing and transmitting of a video frame, according to some embodiments of the present disclosure. The logic 600 may be executed by one or more processor (e.g., in a device (e.g., source device, a sink device), server, or other device) and/or other components (e.g., of a wireless display pipeline). The logic 600 corresponds to instructions (e.g., stored in code) and/or a method to be carried out by the one or more processor and/or other components.

Logic 600 begins at 602, which may coincide with a start/end point of other logic, routines, and/or applications. At 604, packets corresponding to a first portion of a video frame are generated. The packets may be generated, e.g., by a packetizer and/or a processor. For example, a packetizer may be configured to generate packets corresponding to a first tile of a plurality of tiles of a video frame. Each of the plurality of tiles may comprises a group of pixels of the video frame. At 606, the packets corresponding to the first portion of the video frame are transmitted while simultaneously packets corresponding to a second portion of the video frame are generated. The packets may be transmitted, e.g., by a transmitter (e.g., a wireless interface, a transceiver, a radio transmitter, and/or the processor. For example, a transmitter may be configured to wirelessly transmit the packets corresponding to the first tile of the video frame simultaneous with the generation of packets corresponding to others of the plurality of tiles of the video frame by the packetizer. The logic 600 advances to 608, at which the logic 600 ends. 608 may coincide with a start/end point of other logic, routines, and/or applications. The logic 600 reduces latency associated with a display of the video frame based on the generation of the packets (packetizing) and the transmission of packets being executed in parallel with one another.

The logic of any of 300, 400, 500, and 600 (either individually or in combination with others) may be simultaneously executed by a device. For example, a device may execute only logic 400 to reduce latency associated with a display of the video (and the video frames therein). Similarly, a device may execute only logic 500 to reduce latency associated with a display of the video (and the video frames therein). Likewise, a device may simultaneously execute both 300 and 400 (or both 300 and 500, or both 300 and 600, or both 400 and 500, or both 400 and 600, or both 500 and 600), to further reduce the latency associated with the display of the video. Similarly, a device may simultaneously execute 300, 400, and 500 (or 300, 500, and 600; or 400, 500, and 600) to further reduce the latency associated with the display of the video; and so on. In general, a device of the present disclosure may simultaneously execute any one or more of (and any combination or permutation of) the logic of 300, 400, 500, and 600 to achieve low latency for the display of the video. For example, FIGS. 7A and 7B illustrate examples of a device executing different combinations of the logic of 300, 400, 500, and 600 to achieve low latency for display of a video.

Figure 7B:
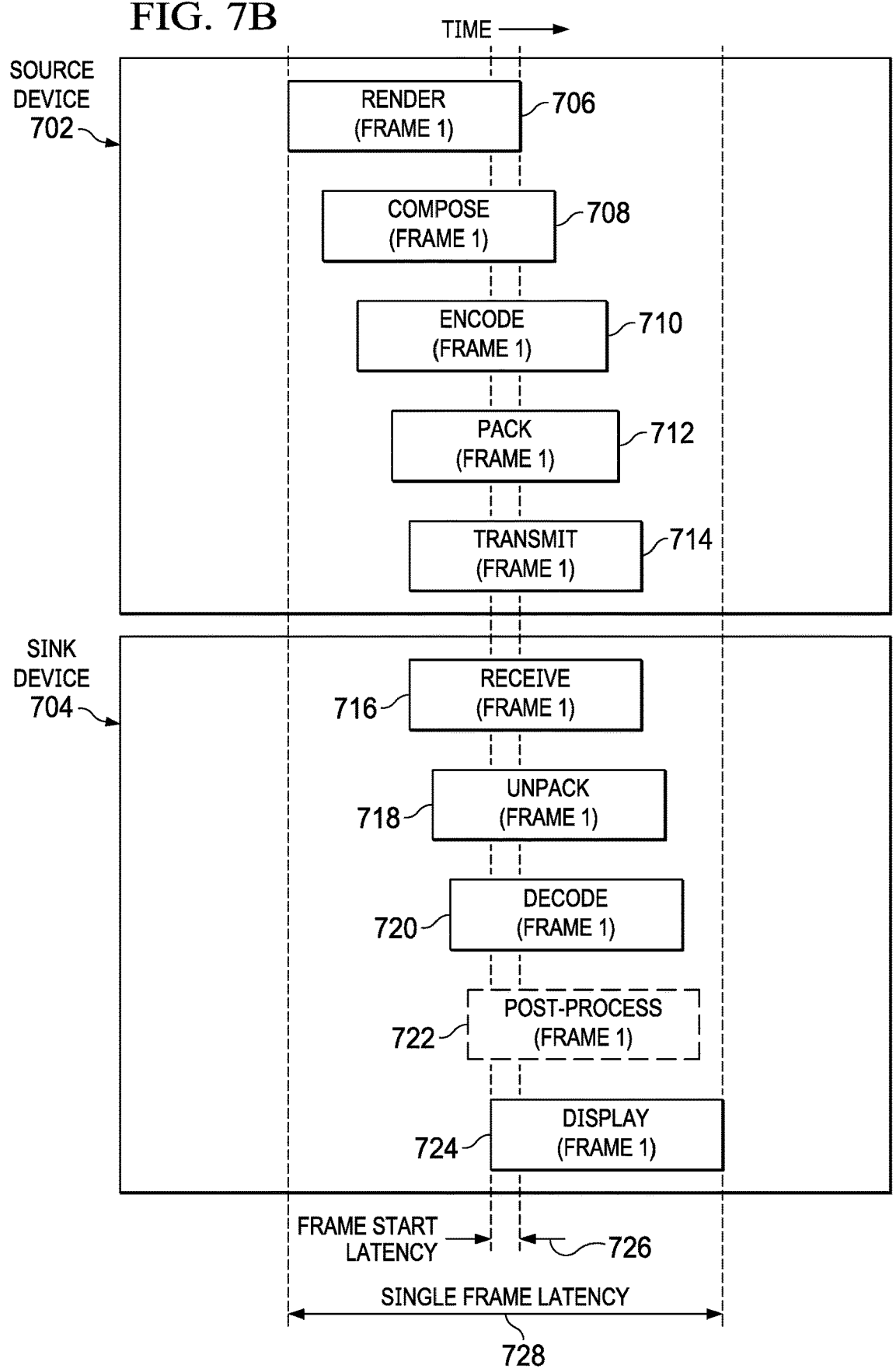

Each of FIGS. 7A and 7B is a simplified diagram illustrating timing of processing a video frame through a source device 702 and a sink device 704, according to some embodiments of the present disclosure. The source device 702 implements a wireless display pipeline comprising a render engine (for rendering video frames), a display engine (for composing video frames), an encoder (for encoding video frames), a packetizer (for packetizing video frames), and a transmitter (for transmitting video frames). The sink device 704 implements a wireless display pipeline comprising a receiver (for receiving video frames), a packetizer (for unpacking video frames), a decoder (for decoding video frames), (in some embodiments) a post-processor (for post-processing video frames, e.g., scaling, interpolation, sub-sampling, sharpen, unsharpen, and the like), and a display screen (for displaying video frames). In the FIGS. 7A and 7B, time progresses forward from left to right. In FIG. 7A, the source device 702 utilizes a wireless display pipeline to simultaneously compose, encode, packetize, and transmit different portions of a same video frame (e.g., Frame 1) (e.g., simultaneously executing the logic of 400, 500, and 600 to achieve low latency for display of a video). In FIG. 7B, the source device 702 utilizes the wireless display pipeline to simultaneously render, compose, encode, packetize, and transmit different portions of the same video frame (e.g., simultaneously executing the logic of 300, 400, 500, and 600 to achieve low latency for display of a video). Advantageously, devices of the present disclosure can vary a degree to which the wireless display pipeline is parallelized (e.g., by selectively parallelizing different portions of the wireless display pipeline to achieve a latency criteria). One difference between the FIGS. 7A and 7B is that the source device 702 in FIG. 7B renders the frame in parallel with other components of the wireless display pipeline while the source device 702 in FIG. 7A renders the frame in series (i.e., not in parallel) with other components of the wireless display pipeline.

Turning to FIG. 7A, the source device 702 utilizes the wireless display pipeline to render the video frame (Frame 1) in a first duration of time 706. The video frame (Frame 1) is rendered while other portions of the wireless display pipeline simultaneous process a previous video frame (i.e., Frame 0). In this example, the source device 702 completes rendering the Frame 1 in its entirety (i.e., within the first duration of time 706) before commencing the simultaneous processing of the Frame 1 by other portions of the wireless display pipeline. At the end of the first duration of time 706, the source device 702 begins composing the video frame (Frame 1) (i.e., begins at a second duration of time 708, during which the frame is composed). After a portion of the video frame is composed, the source device 702 begins encoding the portion of the video frame (i.e., begins at a third duration of time 710, during which the frame is encoded). After the portion of the video frame is encoded, the source device 702 begins packetizing the portion of the video frame (i.e., begins at a fourth duration of time 712, during which the video frame is packetized). After the portion of the video frame is packetized, the source device 702 begins transmitting the portion of the video frame to the sink device 704 (i.e., begins at a fifth duration of time 714, during which the video frame is transmitted). Because the source device 702 simultaneously composes, encodes, packetizes, and transmits different portions of the video frame (e.g., Frame 1), the second duration of time 708, the third duration of time 710, the fourth duration of time 712, and the fifth duration of time 714 partially overlap one another (i.e., each is executed in parallel with one or more of the others).

The sink device 704 utilizes the wireless display pipeline to simultaneously receive, unpack, decode, post-process, and display different portions of the frame (e.g., Frame 1). The sink device 704 receives the video frame within a fifth duration of time 716. After a portion of the video frame is received, the sink device 704 begins unpacking the portion of the video frame (i.e., begins at a sixth duration of time 718, during which the video frame is unpacked). After the portion of the video frame is unpacked, the sink device 704 begins decoding the portion of the video frame (i.e., begins at a seventh duration of time 720, during which the video frame is decoded). After the portion of the video frame is decoded, the sink device 704 begins post-processing the portion of the video frame (i.e., begins at eighth duration of time 722, during which the video frame is post-processed). After the portion of the video frame is post-processed or after the portion of the video frame is decoded (as the case may be), the sink device 704 begins displaying the portion of the video frame (i.e., begins at ninth duration of time 724, during which the video frame is displayed). Because the sink device 704 simultaneously receives, unpacks, decodes, post-processes, and displays different portions of the video frame, the fifth duration of time 716, the sixth duration of time 718, the seventh duration of time 720, the eighth duration of time 722 (when present), and the ninth duration of time 724 partially overlap one another (i.e., each is executed in parallel with the others).

Turning to FIG. 7B, some details of the source device 702 and the sink device 704 as illustrated in FIG. 7B are similar to details are described for FIG. 7A; such details are not repeated here only for the purpose of brevity. A difference from FIG. 7A is that in, FIG. 7B, the source device 702 renders the video frame (Frame 1) (i.e., in the first duration of time 706) while simultaneously composing, encoding, packetizing, and transmitting different portions of the video frame. Because the source device 702 simultaneously renders, composes, encodes, packetizes, and transmits different portions of the video frame (e.g., Frame 1), the first duration of time 706, the second duration of time 708, the third duration of time 710, the fourth duration of time 712, and the fifth duration of time 714 partially overlap one another (i.e., each is executed in parallel with one or more of the others).

In FIGS. 7A and 7B, a frame start latency 726 is measured between completion of the rendering of a video frame and the beginning of the display of the video frame; an overall frame latency 728 is measured between a beginning of the rendering of a video frame and the completion of the display of the video frame.

In some embodiments using the degree of parallelization as illustrated in FIG. 7A, the frame start latency 726 is about 3 ms and the overall frame latency 728 is about 25 ms. In some embodiments using the degree of parallelization as illustrated in FIG. 7B, the frame start latency 726 is about −5 ms (i.e., a negative frame start latency) and the overall frame latency 728 is about 18 ms (i.e., a reduction of about 7 ms). The negative frame start latency occurs when a display device begins to display a frame before the frame has been rendered in its entirety. The wireless display pipelines of the present disclosure can advantageously produce a negative frame start latency, which contribute to a very low overall frame latency 728.

Figure 8:
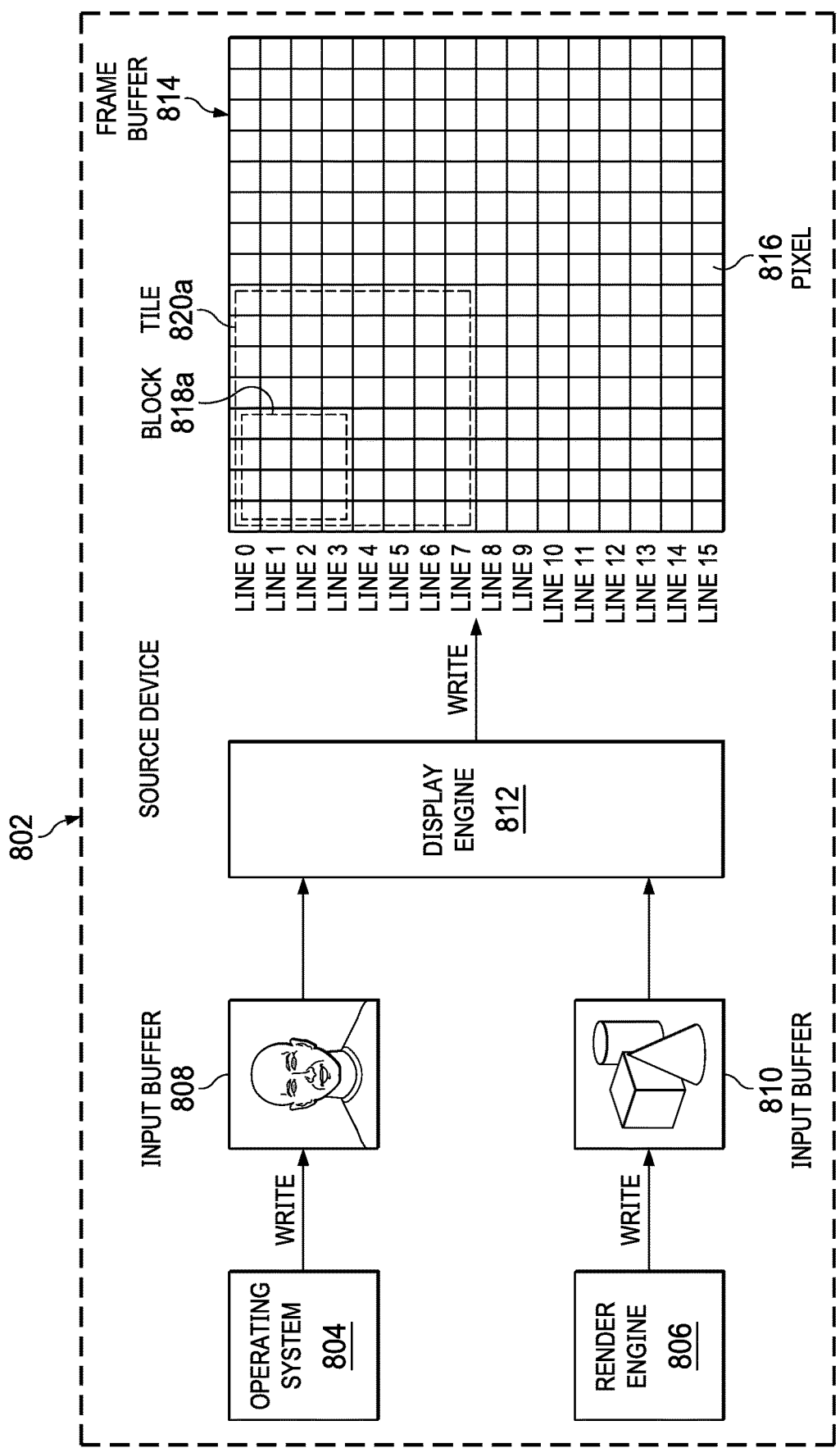
FIG. 8 illustrates a device composing (compositing) a video frame, according to some embodiments of the present disclosure.

Turning to FIG. 8, FIG. 8 illustrates a video source device 802 composing (compositing) a video frame, according to some embodiments of the present disclosure. The video source device (source device) 802 comprises an operating system 804, a render engine 806, input buffers 808 and 810, a display engine 812, and a frame buffer 814. In this example, an application (e.g., a video chat application) executing within the operating system 804 produces an image (e.g., a video frame); the operating system writes the image into the input buffer 808. The render engine 806 writes an image into the input buffer 810. The display engine 812 reads data from the input buffers 808 and 810, composes a video frame based at least in part on the data in the input buffers 808 and 810, and writes the composed pixels to the frame buffer 814. The display engine 812 may blend, overlay, combine, arrange, scale or otherwise compose pixels from each of the input buffers 808 and 810 into a final video frame for display. For example, the display engine 812 is configured to access a set of input pixels. Each in the set of input pixels can be retrieved the input buffer 808 and 810. The display engine 812 is configured to generate an output pixel based on the set of input pixels and store the output pixel in the frame buffer 814. In general, the display engine 812 may generate an output pixel based on a combination of pixels from the input buffers 810 and 808.

The frame buffer 814 comprises an area of memory in which to store data (e.g., the video frame). The frame buffer 814 has a size that corresponds to the size of a video frame. The frame buffer includes a number of pixels, one of which is pixel 816. In this example, the frame buffer 814 is 16×16 pixels (256 pixels) in size. The frame buffer includes 16 rows (i.e., labeled Line 0, 1, 2, . . . , and 15) and 16 columns. This particular size is only for simplicity of the Figures.

Embodiments of the present disclosure may operate on video frames and utilize corresponding frame buffers of any size. Labels of several portions of the video frame are overlaid on the frame buffer 814. For example, the video frame (and the frame buffer 814) includes groups (blocks) of pixels. In this example, each block is 4×4 pixels (16 pixels). Thus, the video frame (and the frame buffer 814) includes a total of 16 blocks. A first group, i.e., block 818*a* is labeled in the FIG. 8. The other blocks are not explicitly labeled only to avoid overcomplicating the Figure. The video frame (and the frame buffer 814) comprises a plurality of tiles. Each of the tiles comprises a plurality of the blocks. In this example, each tile includes 4 blocks (i.e., 8×8 pixels (64 pixels). Thus, the video frame (and the frame buffer 814) includes a total of 4 tiles. A first tile, i.e., tile 820*a* is labeled in the FIG. 8. The other tiles are not explicitly labeled only to avoid overcomplicating the Figure. In some embodiments of the present disclosure, the block size and the tile size are configurable (e.g., programmable). In such embodiments, the particular size of a block and/or of a tile can be changed to suit any particular application or video compression standard.

The display engine 812 compose pixels of the video frame. In this example, the display engine 812 composes the video frame on a line-by-line basis (i.e., one line at a time). Each line is a portion (smaller subset) of the frame buffer 814. As the display engine composites the video frame on a line-by-line basis, it writes pixels out linearly into the frame buffer 814 (e.g., beginning with Line 0 (working from left to right within the line) and repeating for each row; finally ending with Line 15). The display engine 812 is not limited to working on a line-by-line basis. In some embodiments, the display engine 812 works on a block-by-block basis or on a tile-by-tile basis.

The display engine 812 can reduce latency associated with a display of the video frame based on the composing being executed in parallel with another process for a wireless display pipeline. For example, the display engine 812 can perform composition in parallel with the rendering of the input buffers 808 and 810 by the OS 804 and/or the render engine 806 (e.g., based on the display engine 812 executing at least a portion of the logic 300 of FIG. 3 and/or based on the OS 804 and/or the render engine 806 executing at least a portion of the logic 300 of FIG. 3). Likewise, the display engine 812 can perform composition in parallel with the encoding of from the frame buffer 814 by an encoder (e.g., (e.g., based on the display engine 812 executing at least a portion of the logic 400 of FIG. 4 and/or based on the encoder executing at least a portion of the logic 400 of FIG. 4).

In the example of FIG. 8, the render engine 806 and the display engine 812 can work in parallel to render and compose a vide frame. However, rendering (i.e., the render engine 806) may not be utilized while composition (i.e., the display engine 812) is utilized. For example, when an application (executing in the operating system 804) playing a video with subtitles is the only source of graphical content for wireless display (e.g., the application/OS 804 written to the input buffer 808), the display engine 812 may compose the video with the subtitles and write them in the frame buffer 814 (with no activity from the render engine 806). In other examples, rendering is utilized and composition is not utilized. For example, when a 3-dimensional gaming application is playing in a full screen mode, the render engine 806 may be used to render frames of the 3D gaming scene. Since no composition is required, the render engine 806 may write a rendered frame directly into the frame buffer 814. In such an example, the render engine 806 can operate in parallel with an encoder (e.g., encoder 908) in a manner as described for the display engine 812 in FIGS. 9A-9E below; the render engine 806 would take the place of the display engine 812 in the examples described with respect to FIGS. 9A-9E below. In still other examples, neither rendering nor composition is utilized. For example, when the only source of graphical content for wireless display is an application (executing in the operating system 804) connecting to an online streaming service playing a video without subtitles (such as in full screen mode), the application and/or the OS 804 may write each video frame of the video directly into the frame buffer 814 (and/or copy it from the input buffer 808). In such an example, the application and/or the OS 804 can operate in parallel with an encoder (e.g., encoder 908) in a manner as described for the display engine 812 in FIGS. 9A-9E below; the application and/or the OS 804 would take the place of the display engine 812 in the examples described with respect to FIGS. 9A-9E below.

FIGS. 9A, 9B, 9C, 9D, 9E illustrate a video source device 802 composing and encoding a video frame in parallel, according to some embodiments of the present disclosure. Each of the FIGS. 9A, 9B, 9C, 9D, 9E illustrates a display engine (the display engine 812) and an encoder (an encoder 908) at a particular point (e.g., a "snapshot") in the parallel composing and encoding of the video frame. The display engine 812 composes each pixel of the video frame and writes it into the frame buffer 814. The encoder 908 reads each pixel of the video frame and encode it into another buffer. In this example, the display engine (DE) 812 and the encoder 908 share the frame buffer 814. Thus, to compose and encode the video frame in parallel each of the display engine 812 and the encoder 908 is accessing the frame buffer 814 at the same time. A challenge with such sharing of the frame buffer 814 is that the DE 812 and the encoder 908 could potentially "bump" into each other. For example, the encoder 908 could erroneously attempt to encode pixels of the frame buffer 814 that have not been composed by the DE 812 (i.e., the encoder 908 lapping, overtaking, or otherwise proceeding past the DE 812). Such a situation could cause the encoder 908 to encode erroneous data (e.g., or data from a previous frame, which could be erroneously mixed with data from a current frame). Advantageously, the system disclosed used herein utilizes one or more register to store identifiers for each of the DE 812 and the encoder 908 to prevent the encoder 908 from lapping (proceeding past) the DE 812 and vice versa. In the example of FIGS. 9A, 9B, 9C, 9D, 9E, each of the DE 812 and the encoder 908 maintains (e.g., reads, writes, updates) a corresponding reference value and polarity value (e.g., to identify/track its own location in the frame buffer 814) in a register; in addition, each of the DE 812 and the encoder 908 can read the other's reference and polarity values (e.g., to identify/track it's the other's location in the frame buffer 814, may be stored as a bit, a byte, other data type). The registers track progression of the DE 812 (during the sequential composition of portions of the vide frame) and progression of the encoder 908 (during the sequential encoding of portions of the vide frame). Each component is repeatedly updates the value of the registers to track its position. Such values enable the DE 812 and the encoder 908 to work in parallel on the same video frame and from a single, shared buffer without erroneously lapping one another. The display engine 812 and the encoder 908 can reduce latency associated with a display of the video frame by working in parallel with one another (e.g., based on the display engine 812 executing at least a portion of the logic 400 of FIG. 4 and/or based on the OS 804 and/or the encoder 908 executing at least a portion of the logic 400 of FIG. 4).

Figure 9A:
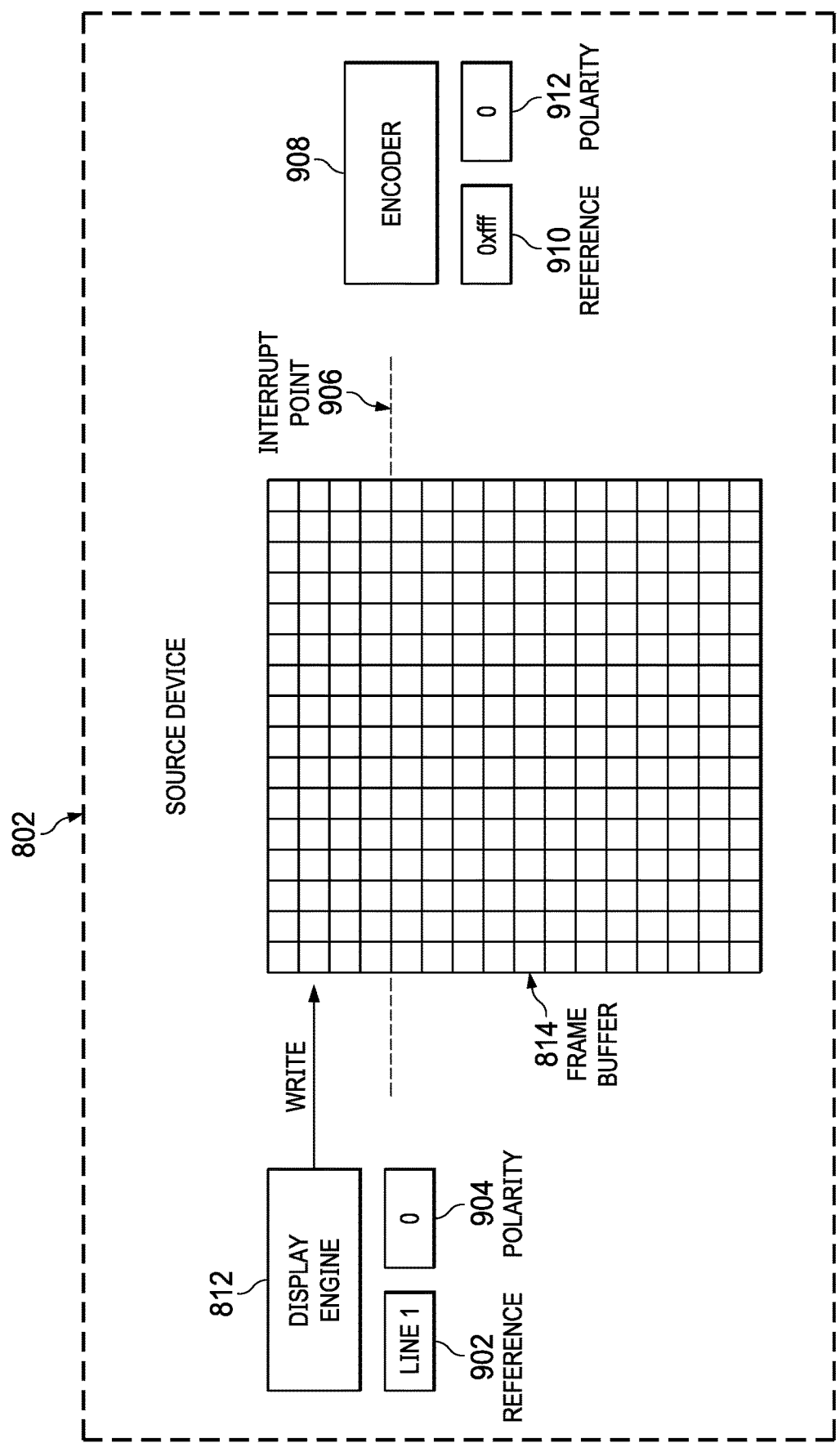
FIGS. 9A, 9B, 9C, 9D, 9E illustrate a device composing and encoding a video frame in parallel, according to some embodiments of the present disclosure.

Turning to FIG. 9A, FIG. 9A illustrates the display engine 812 beginning the composition of the video frame in the frame buffer 814.

The display engine (DE) 812 stores identifiers in a register corresponding to a first subset of the pixels of the video frame that are composed. In particular, the DE 812 stores a reference value 902, which identifies a first subset of the pixels of the video frame (and frame buffer 814) that are composed. The reference value 902 can be used to bifurcates the frame buffer 814 into two subsets: one that has been composed by the display engine 812 and another that has not been composed by the DE 812; either may be used in embodiments of the present specification. The DE 812 also stores a polarity value 904, which indicates whether the DE 812 is composing the same video frame that the encoder 908 is encoding (or whether they are working on different frames). In this example, the polarity value 904 is to store a value corresponding to a video frame that the DE 812 is composing. As discussed above, the display engine 812 composes the video frame and writes it into the frame buffer 814 on a line-by-line basis (i.e., one line at a time). In FIG. 9A, the display engine 812 has composed the first line (Line 0) of the video frame and stored it in the frame buffer 814; the display engine 812 is actively composing the second line (Line 1) of the video frame and storing it in the frame buffer 814. Thus, the display engine 812 stores a value corresponding to Line 1 of the frame buffer 814 in the reference value 902. The reference value 902 is a tail pointer that indicates that last line has at least partially composed. The display engine 812 stores a value corresponding to a first frame of a video (e.g., zero, 0).

The encoder 908 stores identifiers in a register corresponding to a second subset of the pixels of the video frame that are encoded. In particular, the encoder 908 stores a reference value 910, which identifies the second subset of the pixels of the video frame (and frame buffer 814) that are encoded. The reference value 910 can be used to bifurcate the frame buffer 814 into two subsets: one that has been encoded by the encoder 908 and another that has not been encoded by the encoder 908; either may be used in embodiments of the present specification. The encoder 908 also stores a polarity value 912, which indicates whether the encoder 908 is encoding the same video frame that the display engine 812 is composing (or whether they are working on different frames). In this example, the polarity value 912 is to store a value corresponding to a video frame that the encoder 908 is encoding. The reference value 902 is a head pointer that indicates that a leading line (e.g., a highest line number) has at least partially encoded. In FIG. 9A, the encoder 908 is not yet working (because the display engine 812 has yet to compose enough lines). Thus, at this point the encoder 908 stores, in the reference value 910, a value indicating that the encoder has not encoded any line of frame buffer 814 (e.g., 0xfff, a value indicating null). The encoder 908 stores, in the polarity value 912, a value corresponding to a first frame of a video (e.g., zero, 0); though the encoder 908 is not yet working, the polarity value 912 identifies the frame that the encoder will encode on when notified by the display engine 812.

The encoder 908 may work on a different basis than the display engine 812. In this example, the encoder works on a block-by-block basis (i.e., one block (group of pixels) at a time, which, in this example, is 4×4 (16) pixels). Though the encoder block-by-block basis, it encodes all blocks in a single time before advancing to blocks of another tile. It is noted that the encoder 908 is not limited to working on a block-by-block basis. In some embodiments, the encoder 908 works a tile-by-tile basis. The frame buffer 814 must compose the pixels before they are encoded by the encoder 908 (i.e., based on an order specified by a wireless display pipeline). Thus, the frame buffer 814 needs to complete composition of compose 4 lines before the encoder 908 can work on the video frame. Though the encoder 908 and the display engine 812 may reside in different domains of a chip/chipset (e.g., physically separate from one another (e.g., in separate areas of silicon), a notification mechanism allows them to communicate with one another.

Figure 9B:
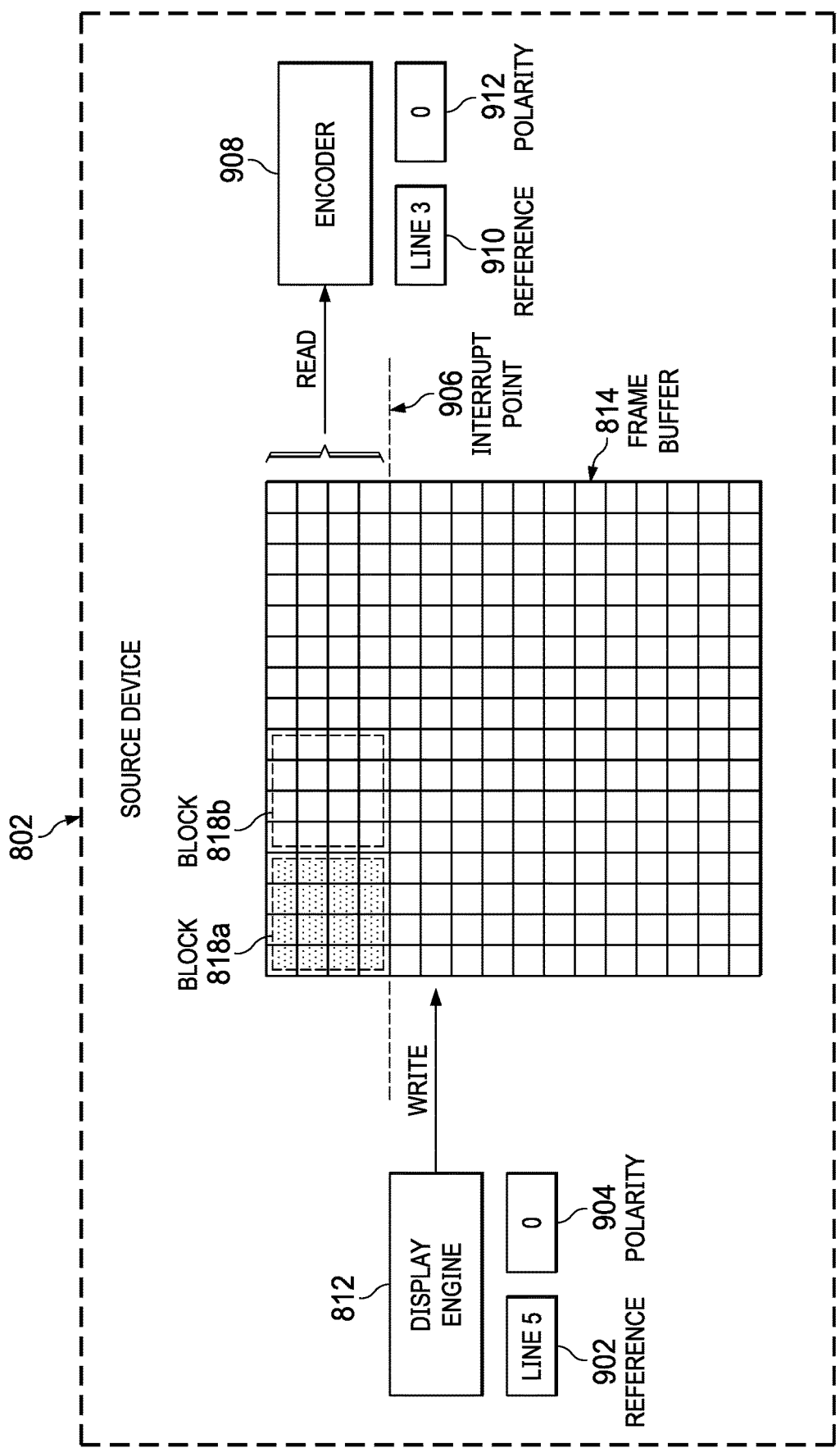

Once the display engine 812 has composed enough lines for the encoder 908 to operate (i.e., has reached interrupt point 906), the display engine 812 generates and transmits a notification (e.g., an interrupt) to "wake" the encoder 908, which may hold (e.g., pause) in a low-power state (e.g., not completely off) while checking for the notification (and/or for commands corresponding to the notification). The encoder 908 becomes active (e.g., enters a full power state, "wakes" up, and begins encoding) based on receiving the notification and/or commands corresponding to the notification. The encoder 908 begins encoding data from the frame buffer 814 that have already encoded by the display engine 812. FIG. 9B illustrates a point after which the display engine 812 has transmitted such a notification to the encoder 908 and the encoder is encoding blocks of the video frame from the frame buffer 814.

Turning to FIG. 9B, the display engine 812 has composed Lines 0 through 4 and is actively composing Line 5 of the video frame and storing it in the frame buffer 814. Thus, the display engine 812 has updated the reference value 902 to a value corresponding to Line 5 of the frame buffer 814 (i.e., the tail pointer). The polarity value 904 is unchanged. The encoder 908 has encoded a first block 818a and is actively reading and encoding a second block 818b from the frame buffer 814. Thus, the encoder 908 has updated the reference value 910 to a value corresponding to Line 3 of the frame buffer 814 (i.e., the leading edge of the encoding). The polarity value 912 is unchanged. In general, the polarity values 912 and 904 contain matching values (e.g., bits) based on the display engine 812 composing and the encoder 908 encoding the same frame; the polarity values 912 and 904 contain mismatching values based on the display engine 812 composing and the encoder 908 encoding different video frames. In FIG. 9B, the polarity values 912 and 904 match, which indicates that the encoder 908 and the display engine 812 are working on the same video frame. After encoding, the encoder 908 stores encoded versions of the blocks (i.e., encoded groups, encoded blocks) in an encode buffer. The encoder 908 is encode groups of the pixels of the video frame simultaneous with the composition of the video frame by the display engine 812. For each block of the video frame the encoder determines if the block has already been composed by the display engine 812. This prevents the encoder 908 from erroneously overtaking the display engine 812 while they work on the same frame.

The reference and polarity values at least in part facilitate the display engine 812 and the encoder 908 to work simultaneously on the same frame. The display engine 812 and the encoder 908 work in parallel to compose and encode different portions of the same frame. Moreover, the display engine 812 and the encoder 908 share the same frame buffer 814. When the polarity values 912 and 904 match (i.e., the display engine 812 and the encoder 908 are working simultaneously on the same frame), then the display engine 812 is the "master" (and encoder 908 waits on the display engine 812, if needed). After the encoder 908 completes encoding a block (and before advancing to the next block), the encoder 908 checks whether advancing to the next block would cause it to advance past the display engine 812 based on comparing its reference value 910 to the reference value 902 of the display engine 812 (e.g., determine whether advancing to the next block would cause the reference value 910 to be greater than reference value 902). Upon determining that advancing to the next block would not overtake the display engine 812 (i.e., the encoder 908 remains behind the display engine 812), then the encoder 908 advances to the next block. The encoder 908 encodes a block based on a determination that the display engine 812 has composed the block (e.g., based on the encoder 908 reading the reference value 902). The encoder 908 encoded the blocks 818a and 818b based on such a determination. Upon determining that advancing to the next block would overtake the display engine 812, the encoder 908 can wait until the display engine 812 has composed enough lines for it to proceed (i.e., the encoder 908 prevents encoding blocks while it waits). The encoder 908 prevents encoding a block based on a determination that the display engine 812 has not composed the block (e.g., based on encoder reading the reference value 902). The encoder 908 prevented encoding any blocks beyond line 5 based on such a determination. While waiting, the encoder 908 may enter a low-power mode (e.g., sleep mode, idle mode, wait mode), e.g., while periodically polling the reference value 902 maintained by the display engine 812. The encoder 908 is configured to pause/hold, confined to the first subset of the frame buffer 814 (i.e., as identified by the reference value 902) when the encoder 908 and the display engine 812 are working on the same frame (as identified by a comparison of the polarity values 912 and 904); encoder 908 waits on the display engine 812 to finish so that it does not advance beyond the display engine 812 when they are working on the same frame.

Figure 9C:
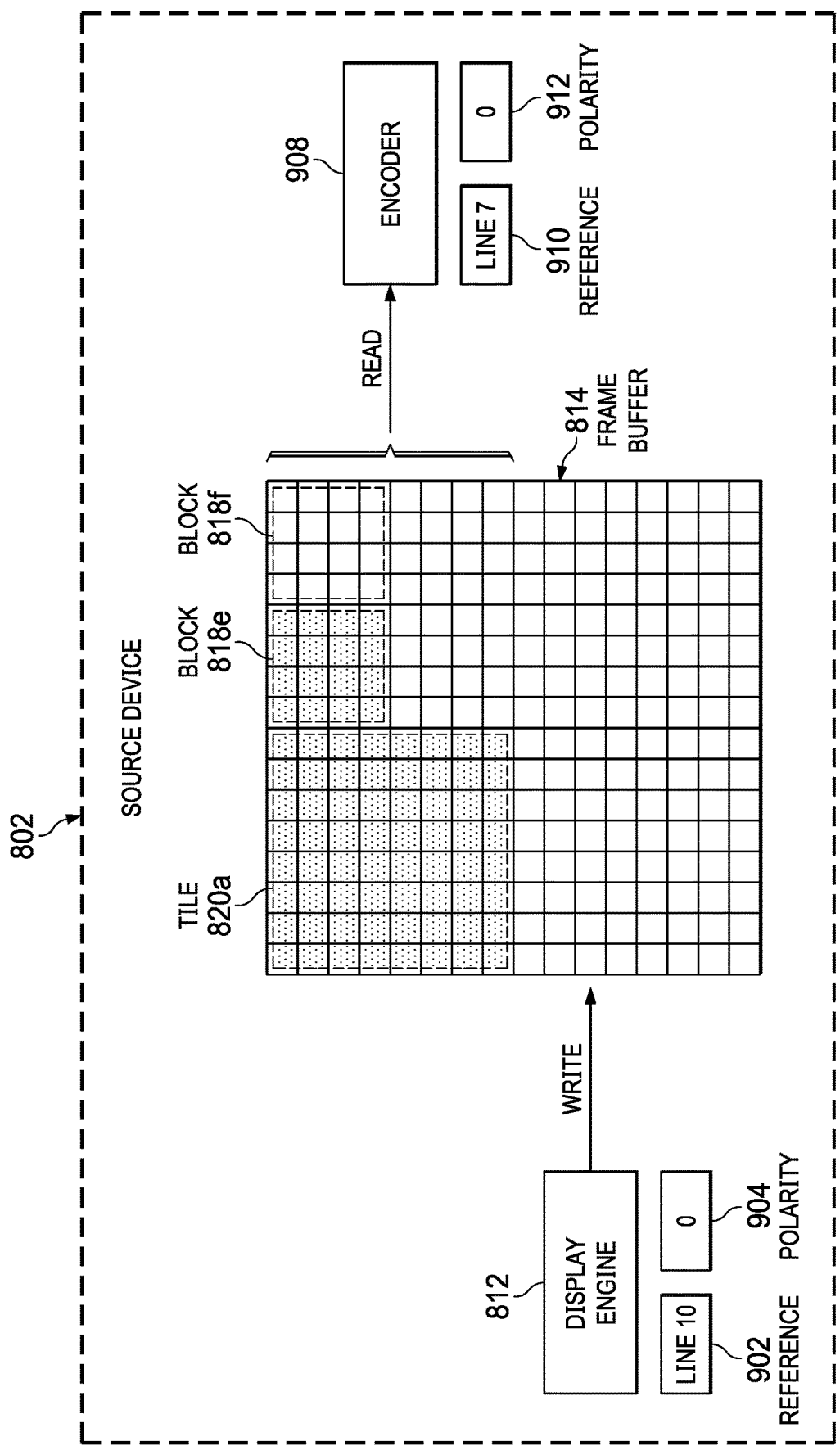

Turning to FIG. 9C, the display engine 812 has composed Lines 0 through 9 and is actively composing Line 10 of the video frame and storing it in the frame buffer 814. Thus, the display engine 812 has updated the reference value 902 to a value corresponding to Line 10 of the frame buffer 814. The polarity value 904 is unchanged. The encoder 908 has encoded all blocks in the first tile 820a, a first block 818e of second tile and is actively reading and encoding a second block 818f of the second tile from the frame buffer 814. Thus, the encoder 908 has updated the reference value 910 to a value corresponding to Line 7 of the frame buffer 814 (i.e., the leading edge of the encoding). The polarity value 912 is unchanged. The polarity values 912 and 904 match, which indicates that the encoder 908 and the display engine 812 are working on the same video frame.

Figure 9D:
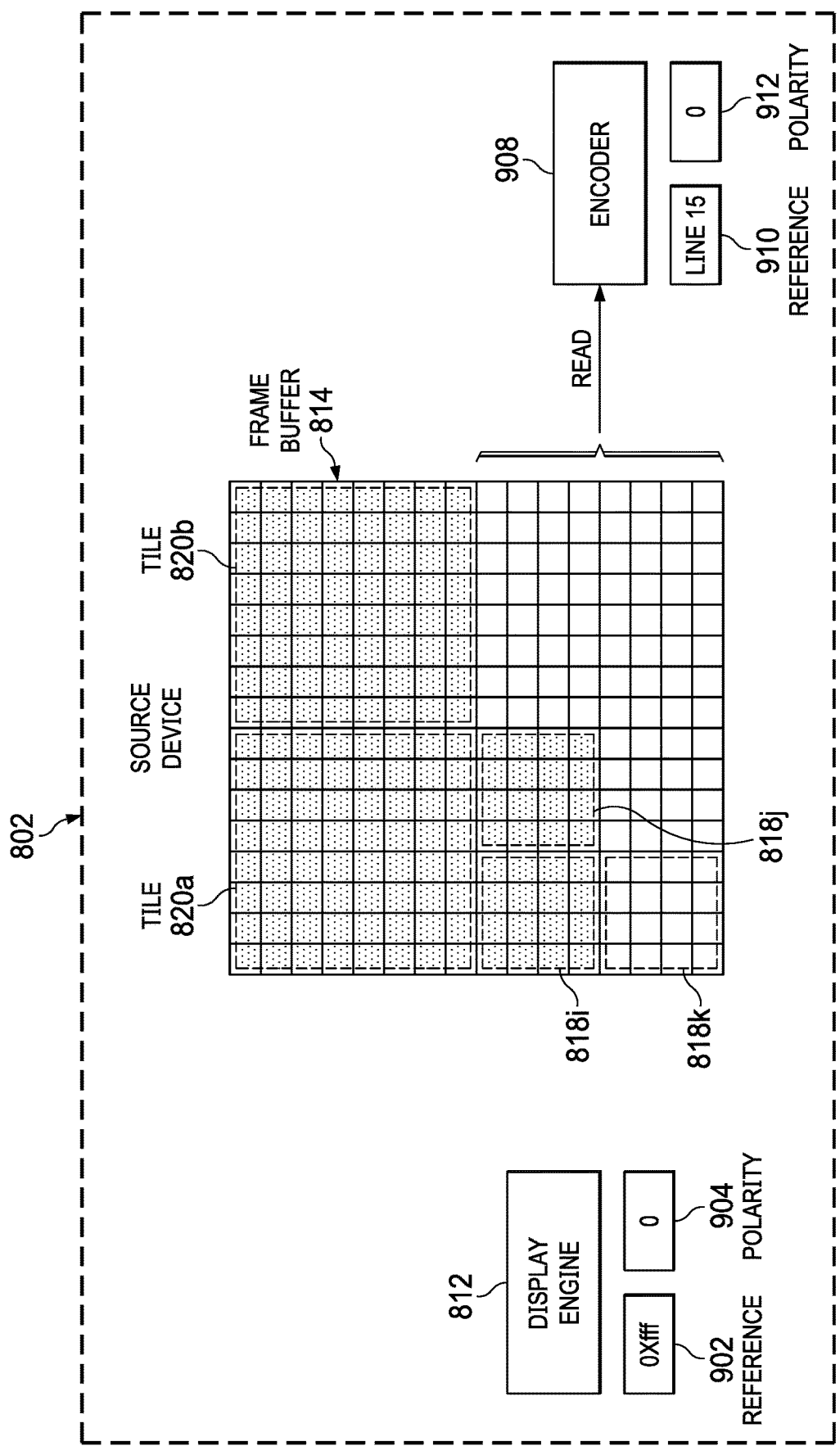

Turning to FIG. 9D, the display engine 812 has composed all lines of the video frame and stored them the frame buffer 814. Thus, the display engine 812 has updated the reference value 902 to a value indicating that the display engine 812 is not composing any line of frame buffer 814 (e.g., 0xfff, a value indicating null). The polarity value 904 is unchanged. The encoder 908 has encoded all blocks in the first tile 820a, all blocks in the second tile 820b, and a first block 818i and a second block 818j of a third tile and is actively reading and encoding a third block 818k of the third tile from the frame buffer 814. Thus, the encoder 908 has updated the reference value 910 to a value corresponding to Line 15 of the frame buffer 814 (i.e., the leading edge of the encoding). The polarity value 912 is unchanged.

In this example, two reference values are used (i.e., the reference value 902 (head pointer) corresponding to the display engine 812 and the reference value 910 (tail pointer) corresponding to the encoder 908). In other examples, only a single reference value may be used (e.g. to track the progress of the display engine 812). A challenge with using only a single reference value is that the display engine 812 may not be able to advance to another frame until the encoder 908 was complete (e.g., since the display engine 812 would have no way of identifying where the encoder 908 is at in its encoding of the frame buffer 814). This could potentially create a performance issue (a bottleneck causing jitter) whereby the display engine 812 is limited by the speed of the encoder 908 (i.e., where the display engine 812 must wait for the encoder 908 to complete the entire video frame before the de could advance to a next frame). Advantageously, embodiments that utilize the two reference values solve this potential challenge, by adding a second reference value 910 (tail pointer) corresponding to the encoder 908. Using the two reference values enables the simultaneous processing of video frames without performance introducing jitter (caused by the display engine 812 waiting on the encoder) and the display engine 812 can work as fast as possible (without overtaking the encoder). The display engine 812 can use the reference value 910 (tail pointer) corresponding to the encoder 908 to prevent overtaking the encoder 908 while accessing a new frame (i.e., a next frame relative to the frame being encoder 908 by the encoder 908).

When the display engine 812 moves to the next frame, there is a paradigm shift: from the display engine 812 being in the "lead" to the encoder 908 being in the lead in the frame buffer 814. In the new paradigm, the display engine 812 does not overtake the encoder 908 because it would overwrite data from the last frame that has not yet been encoded by the encoder 908. As described above, when the polarity values 912 and 904 match, then the display engine 812 is the "master" (and the encoder 908 waits on the display engine 812). This is the case in each of FIGS. 9A-9D. However, When the polarity values 912 and 904 do not match, then the encoder 908 is the "master" (and the display engine 812 waits on the encoder 908). This is the case in FIG. 9E (described below).

Figure 9E:
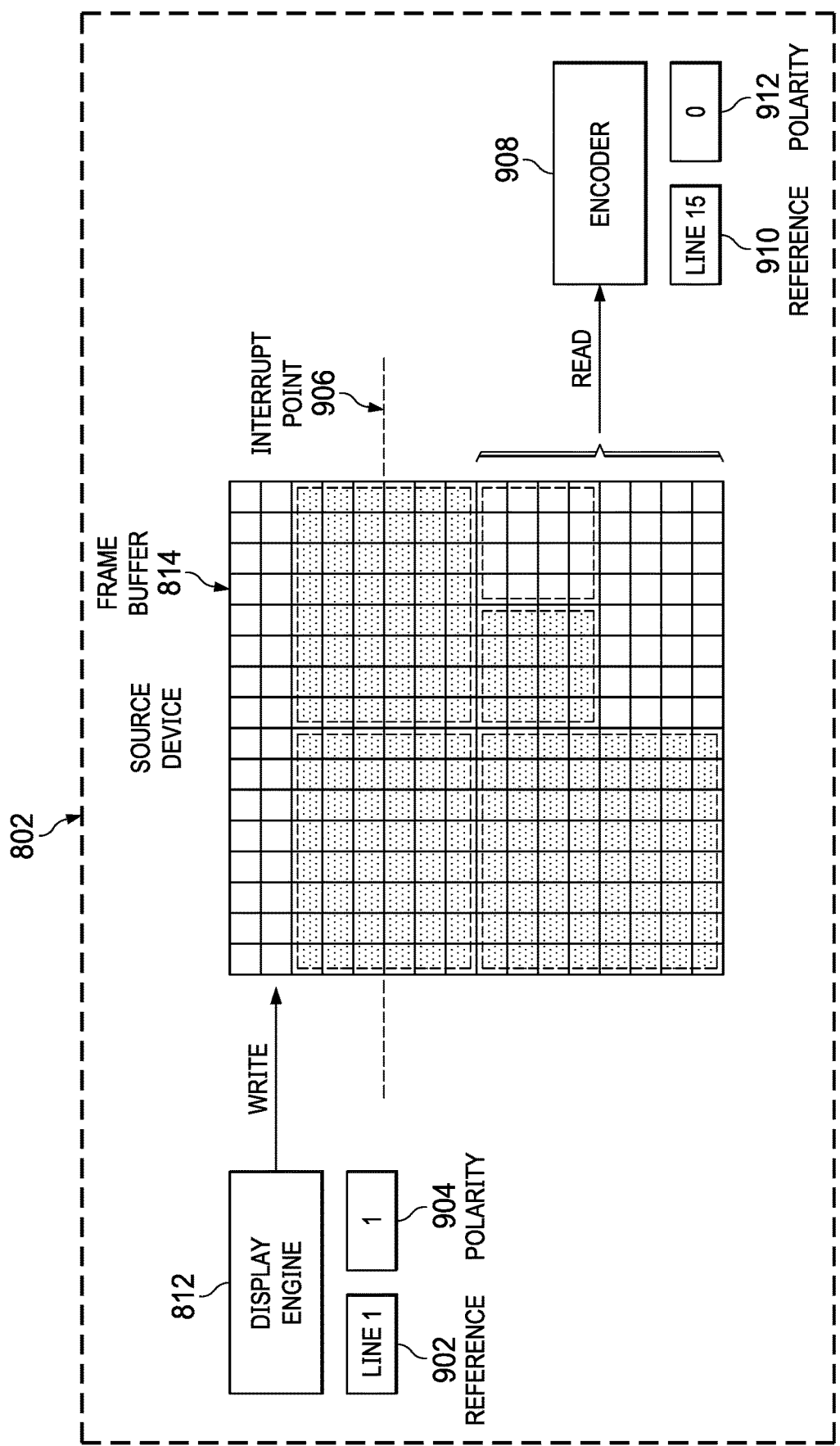

Turning to FIG. 9E, the display engine 812 has advanced to a next frame while the encoder 908 is still working on a previous frame. The display engine 812 has composed Line 0 and is actively composing Line 1 of the next video frame and storing it in the frame buffer 814. Thus, the display engine 812 has updated the reference value 902 to a value corresponding to Line 1 of the frame buffer 814 (i.e., the tail pointer). The polarity value 904 has been changed to 1 (corresponding to the next frame). The encoder 908 has encoded the vast majority of the previous frame and is actively reading and a block from the last tile in the frame buffer 814. Thus, the reference value 910 and the polarity value 912 are unchanged (relative to FIG. 9D). In general, the polarity values 912 and 904 contain matching values (e.g., bits) based on the display engine 812 composing and the encoder 908 encoding the same frame; the polarity values 912 and 904 contain mismatching values based on the display engine 812 composing and the encoder 908 encoding different video frames.

In FIG. 9E, the polarity values 912 and 904 are mismatch, which indicates that the encoder 908 and the display engine 812 are working simultaneously on different video frames. Thus, the display engine 812 treats the encoder 908 as the master and can continue composing a next frame without waiting for the encoder 908 to finish the previous frame. In this situation, the display engine 812 stays behind the encoder 908 to allows the encoder to encode each pixel before the display engine 812 overwrites the pixels from the previous video frame, which the encoder is still working on. After the display engine 812 completes composing a line (and before advancing to the next line), the display engine 812 checks whether advancing to the next line would cause it to advance past the encoder 908 (the master) based on comparing its reference value 902 to the reference value 910 of the encoder 908 (e.g., determine whether advancing to the next line would cause the reference value 902 to be greater than reference value 910). Upon determining that advancing to the next line would not overtake the encoder 908 (i.e., the display engine 812 remains behind the encoder 908), then the display engine 812 advances to the next line. Thus, the display engine 812 composes a pixel based on a determination that the encoder 908 has already encoded the pixel (e.g., that the pixel is included in the second subset of the pixels of the video frame that are encoded, based on reference value 910). The display engine 812 can overwrite such a pixel because the encoder 908 has already used it. Upon determining that advancing to the next line would overtake the encoder 908, the display engine 812 can wait until the encoder 908 has encoded enough blocks for it to proceed (i.e., the display engine 812 prevents composing lines while it waits). Thus, the display engine 812 prevents composing a pixel based on a determination that the encoder 908 has not already encoded the pixel (e.g., that the pixel is not included in the second subset of the pixels of the video frame that are encoded, based on reference value 910). The display engine 812 cannot overwrite such a pixel because the encoder 908 has not already encoded it; doing so could cause the encoder 908 to erroneously mix data from two different frames. While waiting, the display engine 812 may enter a low-power mode (e.g., sleep mode, idle mode, wait mode), e.g., while periodically polling the reference value 910 maintained by the encoder 908. The display engine 812 is configured to pause/hold, confined to the second subset of the frame buffer 814 (i.e., as identified by the reference value 910) when the encoder 908 and the display engine 812 are working on different frames (e.g., as identified by a comparison of the polarity values 912 and 904).

In FIGS. 9A-9E, two polarity values are used to determine whether the DE 812 and the encoder 908 are working on the same frame. Other embodiments may use only a single bit to indicate whether the DE 812 and the encoder 908 are working on the same frame (e.g., 0 indicates same frame and 1 indicates different frames).

In some examples, the display engine 812 is processing a lower (later) portion of the video frame, the encoder 908 is encoding an earlier portion of the video frame, and a packetizer is working on an even earlier portion of the frame; all are happening simultaneously on the same video frame to achieve low latency. While some frame-based systems have each of these processes working on separate video frames, the embodiments disclosed herein can execute each of these processes in parallel on a same video frame.

In the example of FIG. 9, the display engine 812 can work in parallel to render and compose a vide frame. However, rendering (i.e., the render engine 806) may not be utilized while composition (i.e., the display engine 812) is utilized. For example, when an application executing in the operating system 804 is playing a video with subtitles is the only source of graphical content for wireless display, the display engine 812 may compose the video with the subtitles and place them in the buffer 814 (with not activity from the render engine 806). In other examples, rendering is utilized and composition is not utilized. For example, when a 3-dimensional gaming application is playing in a full screen mode, the render engine may be used to render frames of the 3D gamins scene. If no composition is required, the render engine may directly add the rendered frame into the frame buffer. Thus, the particular order may be amended to remove the display engine 108 and result in the following pipeline order: 1) the render engine 106, 2) the encoder 110, 3) the packetizer 112, and 4) the transmitter 114 (each of which may work in parallel with the others). In still other examples, neither rendering nor composition is utilized (e.g., when an application playing a video without subtitles is the only source of graphical content for wireless display, such as in full screen mode). Thus, the particular order may be amended to remove the display engine 108 and the render engine 106, resulting in the following pipeline order: 1) the encoder 110, 3) the packetizer 112, and 4) the transmitter 114 (each of which may work in parallel with the others).

Figure 10:
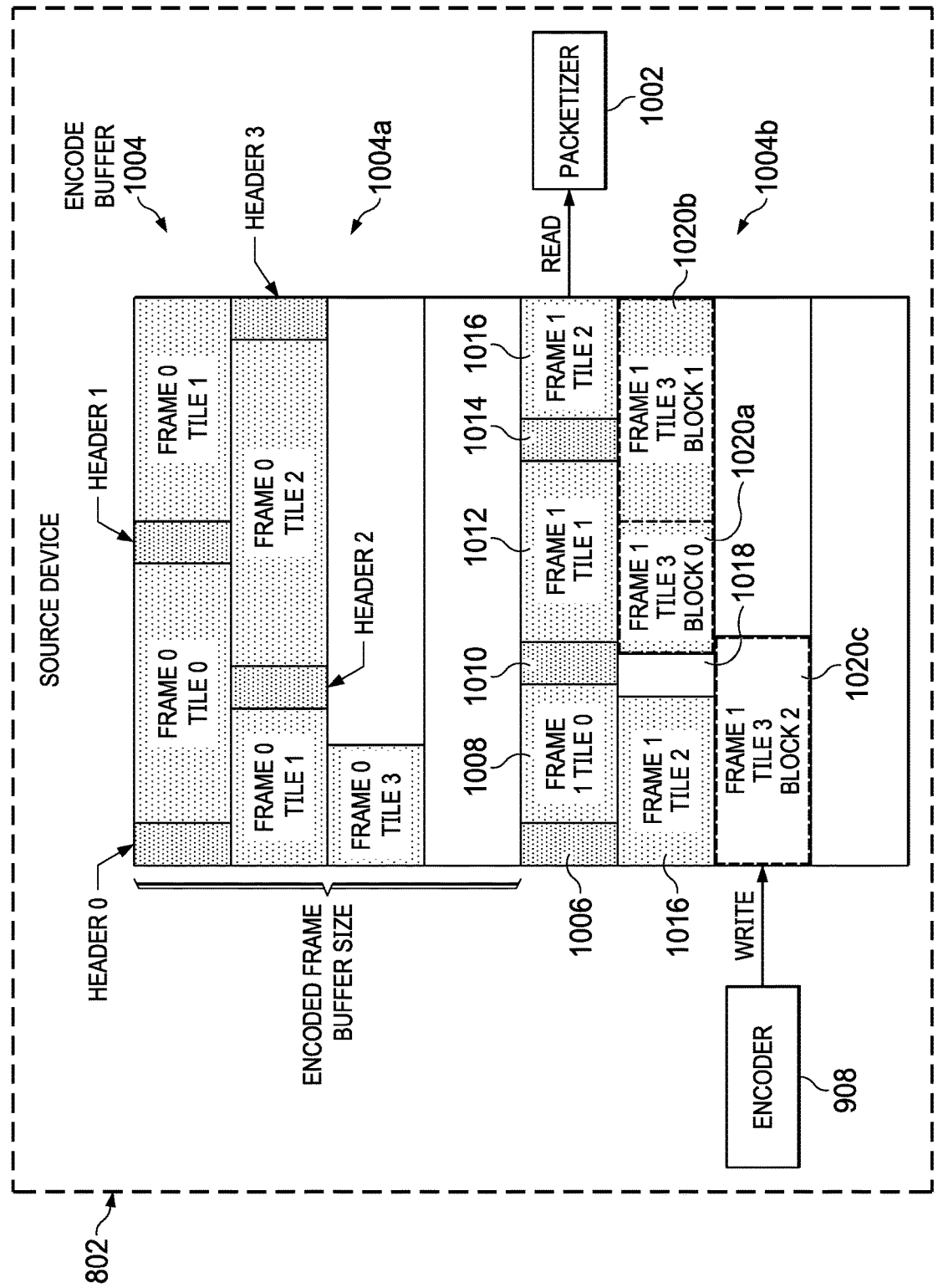
FIG. 10 illustrates a device encoding and packetizing a video frame in parallel, according to some embodiments of the present disclosure.

Turning to FIG. 10, FIG. 10 illustrates the video source device 802 encoding and packetizing a video frame in parallel, according to some embodiments of the present disclosure. For example, the encoder 908 and a packetizer 1002 can reduce latency associated with a display of the video frame by working in parallel with one another (e.g., based on the encoder 908 executing at least a portion of the logic 500 of FIG. 5 and/or based on the packetizer 1002 executing at least a portion of the logic 500 of FIG. 5).

Each video frame comprises a plurality of tiles and each of the plurality of tiles comprises a plurality of blocks. The encoder 908 encodes a video frame into an encoded video frame by encoding each of the tiles of the video frame. The encoder 908 encodes a tile of the video frame into an encoded tile by encoding each of the blocks of the tile (i.e., since the encoder 908, in the example, works on a block-by-block basis). After encoding, the encoder 908 stores encoded versions of the blocks (i.e., encoded groups, encoded blocks) in an encode buffer 1004. Each of the encoded blocks comprises a bitstream of encoded data that complies with a video compression standard. The encode buffer 1004 may include multiple adjacent blocks of memory organized in a circular buffer. Each circular buffer is used for a single video frame at a time. In this example, the encode buffer 1004 comprises a first circular buffer 1004a and a second circular buffer 1004b. Each of the circular buffers occupies a same amount of memory (i.e., the encoded frame buffer size). The encoder 908 compresses the blocks in a video frame by using an algorithm to attempt to shrink its size for transmission (based on video compression standard). Some blocks compress more compactly than others (e.g., some encoded block may consume several multiples of the memory space of other blocks). Consequently, some tiles (and video frames) compress more compactly than others.

The packetizer 1002 has to regularly retrieve data of varying sizes (since the encoded tiles can vary in size). This is a potential challenge for the packetizer 1002 because it may not know where each encoded tile begins/ends. If the packetizer 1002 retrieves a wrong chunk of data (does not match with the extents of an encoded tile), then the encoded tile can be gargled (e.g., unusable to any device receiving it). A potential solution is to allocate some worst-case amount (largest possible) of space to each encoded tile. Then the packetizer 1002 could simply move to the next tile by jumping to a next encoded tile in memory by advancing to a predetermined stop in memory (e.g., where each encoded tile is allocated the same amount of memory space). However, this could consume a large area in memory. In addition, because the encoded tiles vary in size, it is possible that a large portion of the allocated memory would be wasted and not used (e.g., if the encoded data tended to be much smaller than the worst-case size.) In addition, accessing the large swaths of memory could be power intensive and the memory allocated too large to store in SRAM (and therefore, would need to be stored in main memory, which is slower to access that SRAM). Thus, in the potential solutions could allocate too much memory, consume too much power, run the risk of not knowing where the tiles begin and end, and the like.

The embodiments of the present disclosure address this potential challenge using a combination of a header and a circular buffer. The encoder 908 encodes video frames in to circular buffers 1004*a* and 1004*b* in the buffer 1004 and writes a header before each of the encoded tiles in the video frames. Each header includes metadata descriptive of the encoded tile. As an example, the metadata may comprise: a signature comprising a particular sequence of bits, a value identifying a size of an area of memory occupied by the encoded tile (e.g., measured in bits, bytes, or other unit measure of memory); a frame number corresponding to the video frame to which the tile belongs (e.g., frame 0, 1, etc.); and a tile number corresponding to the tile's order within the frame (e.g., tile number 0, 1, etc.). The headers separate encoded tiles from one another within the circular buffers of the buffer 1004.

In FIG. 10, the encoder 908 has encoded a first video frame (Frame 0) in to the first circular buffer 1004*a*. The first video frame includes 4 tiles (i.e., tile 0, 1, 2, and 3). The encoder 908 placed a header (Headers 0, 1, 2, and 3) before each of the encoded tiles. The encoder 908 has encoded a portion of a second video frame (Frame 1) in to the second circular buffer 1004*b*. The encoder 908 encoded the header 1006 before the encoded tile 1008; encoded the header 1010 before the encoded tile 1012; encoded the header 1014 before the encoded tile 1016.

Because the encoder 908 doesn't know how big an encoded tile will be in advance it does not generate the header be until it has finished encoding the tile into the encoded tile. Thus, during encoding (e.g., prior to generating the metadata), the encoder 908 reserves an area of the buffer 1004 for the header/metadata before each tile. For example, encoder 908 may prevent writing the encoded tiles into the area of the buffer, clear the area of the buffer for the metadata, and/or store a zero in each bit in the area of the buffer. Once the encoder has finished encoding the tile, it goes back and adds the metadata descriptive of the encoded tile. In FIG. 10, the encoder 908 has reserved space for a header 1018. The encoder 908 encoded has only encoded a portion of the last tile of the second video frame; the encoder 908 encoded has encoded the encoded block 1020*a* and the encoded block 1020*b* and is actively encoding the encoded block 1020*c*. Because the encoder 908 doesn't know how big the encoded tile will be in advance, it does not complete the header 1018 be until it has finished encoding the tile into the encoded tile.

After encoding each of the tiles into an encoded tile, the encoder 908 generates a notification indicating that the encoded tile is ready for packetization. For example, for each tile in a plurality of tiles in a video frame, the encoder 908 generates a notification based on completion of encoding the encoded tile. The notification may be transmitted to an operating system and/or to the packetizer 1002. In embodiments where the notification is transmitted to the operating system, the operating system may relay the notification to one or more instances of a packetizer. In such an example, the operating system may manage multiple instances of a packetizer. (e.g., using the GUC as is described herein for multiple instances of video codecs). The packetizer 1002 may receive an interrupt based on the notification. The notification signals to the packetizer 1002 or OS (as the case may be) that the encoded tile is ready for packetization. The packetizer 1002 generates packets corresponding to the video frame simultaneous with the encoding of the video frame by the encoder 908, based on the notification(s). The notification can cause the packetizer 1002 or the operating system to initiate packetization of some of the tiles of the video frame while simultaneously other tiles of the video frame are being encoded by the encoder 908.

The packetizer 1002 receives a notification for each encoded tile (indicating that a tile has been encoded by the encoder 908). The packetizer 1002 executes packetization based on the notifications from the encoder 908 indicating that a tile has been encoded. The packetizer 1002 is configured generate packets corresponding to the video frame simultaneous with the encoding of the video frame by the encoder 908. For each tile in the plurality of tiles: the packetizer 1002 generates packets from the encoded tile corresponding to the tile based on the notification (from the encoder 908). The packetizer 1002 generates the packets based on a wireless communication protocol (e.g., each of the packets complies with the wireless communication protocol). The packetizer 1002 is configured to access a corresponding encoded tile based on the metadata in the header (e.g., the encoded tile is a payload corresponding to the header). The metadata delineates a boundary between encoded tiles. For example, the packetizer can identify an area of memory (in the buffer 1004) occupied by the encoded tile based on the metadata and read the encoded tile from the area of memory. The signature may be a unique sequence of bits that the packetizer looks for the identify the start of a tile. This enables the packetizer 1002 to easily traverse the encoded tiles, which can all vary in size. The packetizer 1002 uses the metadata to identify where each encoded tile begins and ends and thereby, retrieve the encoded tile from the buffer 1004 for packetization. This enables small memory allocation and compact storage (i.e., no gaps/unused memory addresses between tiles) and pre-empts any need to allocate "worst case" memory. The packetizer 1002 uses metadata to navigating the buffer 1004; however, the metadata is not transmitted included in the packets generated by the packetizer 1002.

The packetizer 1002 generates packets from the encoded tiles in the buffer 1004 (corresponding to the video frame). The packetizer 1002 stores the packets in a transmission (Tx) buffer. After the packetizer 1002 generate and storing packets for all of the tiles for which it has received a notification, the packetizer 1002, the packetizer 1002 may enter a low-power mode (e.g., sleep mode, idle mode, wait mode) (i.e., because there is no work to be done) where it waits for another notification (to "wake" it up).

Figure 11:
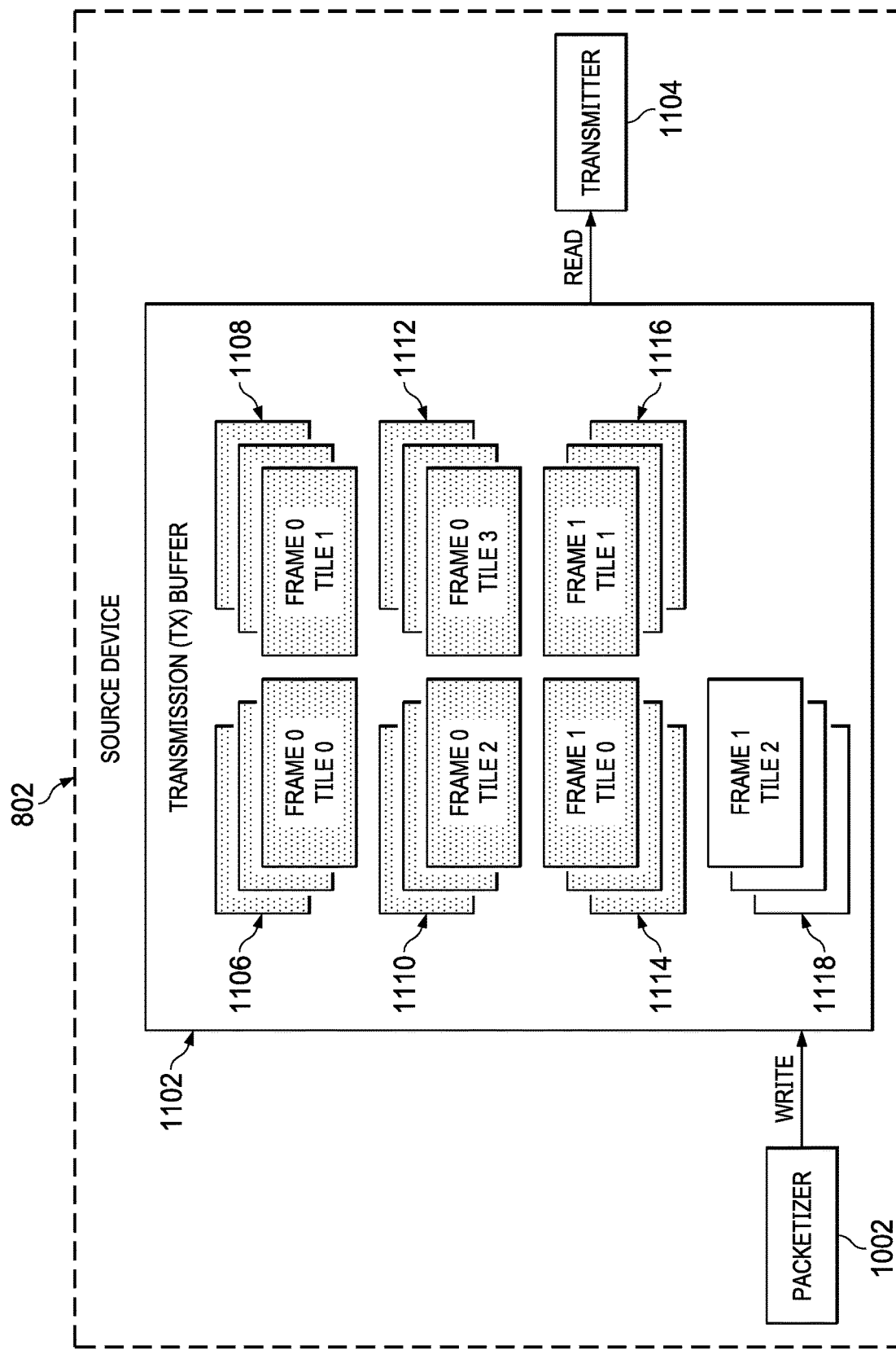
FIG. 11 illustrates a device packetizing and transmitting a video frame in parallel, according to some embodiments of the present disclosure.

Turning to FIG. 11, FIG. 11 illustrates the video source device 802 packetizing and transmitting a video frame in parallel, according to some embodiments of the present disclosure. For example, the packetizer 1002 and a transmitter 1104 can reduce latency associated with a display of the video frame by working in parallel with one another (e.g., based on the packetizer 1002 executing at least a portion of the logic 600 of FIG. 6 and/or based on the transmitter 1104 executing at least a portion of the logic 600 of FIG. 6).

The packetizer 1002 generates packets based on a wireless communication protocol that is utilized by the transmitter 1104. The packetizer 1002 applies a packet standard for the wireless communication protocol to create transmission packets that comply with the wireless communication protocol (WI-FI, WIGIG, BLUETOOTH, or others). The packetizer 1002 writes packets to a transmission (Tx) buffer 1102. The transmitter 1104 reads packets from the Tx buffer 1102.

In FIG. 11, the packetizer 1002 has written, to the Tx buffer 1102, each of packets 1006 (corresponding to a first frame of a first video frame), packets 1008 (corresponding to a second frame of the first video frame), packets 1110 (corresponding to a third frame of the first video frame), packets 1112 (corresponding to a fourth frame of the first video frame), packets 1114 (corresponding to a first frame of a second video frame), and packets 1116 (corresponding to a second frame of the second video frame). The packetizer 1002 is actively generating and writing the packets 1118 (corresponding to a third frame of the second video frame). The transmitter 1104 has transmitted the packets 1006, 1008, 1110, 1112, 1114. The transmitter 1104 is actively transmitting the packets 1016. The packetizer 1002 is generating packets corresponding to a first portion of the second video frame (packets 1118, corresponding to the third frame of the second video frame) while, simultaneously, the transmitter 1104 is wirelessly transmitting the packets corresponding to a second portion of video frame (packets 1116, corresponding to the second frame of the second video frame).

Figure 12:
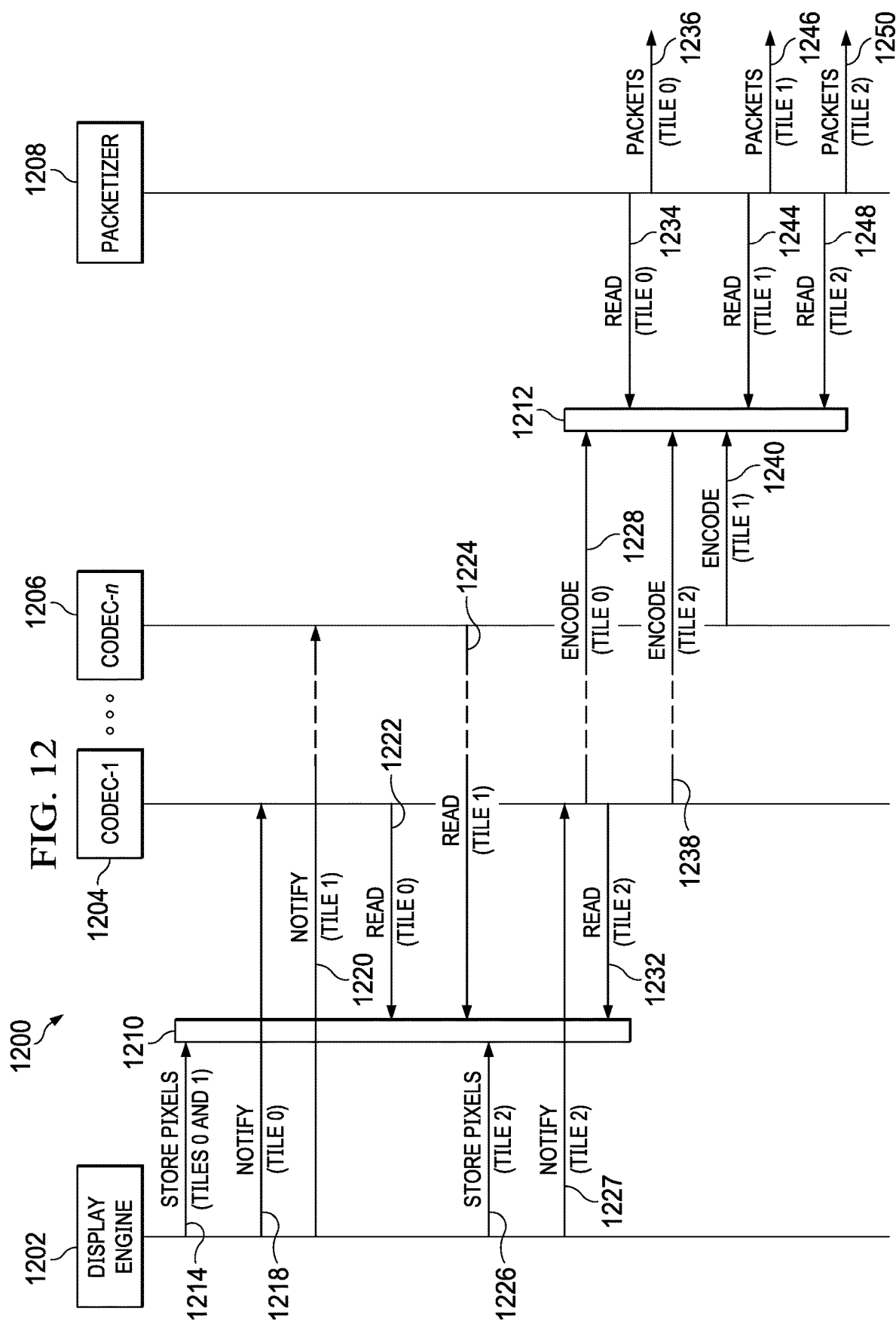
FIG. 12 illustrates a system for simultaneous composition, encoding, and packetizing a video, according to some embodiments of the present disclosure.

Turning to FIG. 12, FIG. 12 illustrates a system (1200) for simultaneous composition, encoding, and packetizing a video, according to some embodiments of the present disclosure. The system 1200 comprises a display engine 1202, a plurality of video codec, and a packetizer 1208, and memory 1210 and 1212. The system 1200 uses multiple video codecs to encode different portions of the video. The system 1200 includes codec-1 1204 and codec-n 1206 (i.e., any number of codecs (n) may be used; where n>0). A global tail pointer is shared between the codecs the track their collective progress in encoding a video frame. For example, a register may store an identifier corresponding to a subset of the pixels of the video frame that have been encoded by the codecs. For clarity, FIG. 12 depicts a specific number of each of the display engines, codecs, and packetizers. However, any number of display engines, codecs, and packetizers may be implemented in a system according to one or more embodiments of the present specification. When n is 2, a first encoder (codec 1204) may work on half of the video frame (e.g., tiles 0 and 2) while a second encoder (codec-1206) works on the other half of the video frame (e.g., tiles 1 and 3). The codecs can simultaneously encode different blocks of the same video frame. The codecs may not finish encoding the tiles in the order specific by the vide frame (e.g., based on some of the tiles taking more time to encode than others). Thus, the packetizer 1208 may get the tiles out of order. However, for some video compression standard, the packetizer 1208 (and a corresponding transmitter) must process (e.g., packetize and/or transmit) the tiles in order (e.g., the order specified by the frame numbers).

The packetizer 1002 generates packets corresponding to a frame by encoding each tile in the order specified by the frame number. Thus, the first frame using packetized first, second frame is packetized next, and so on. However, in embodiments that utilize more than one encoder, the packet ties or may receive notifications for tiles out of the order specified by the frame numbers.

At 1214 the display engine 1202 stores, in the memory 1210, pixels corresponding to the first two tiles (i.e., tiles 0 and 1) of a frame that includes four tiles. display engine 1202 is actively composing a third tile (i.e., tile 2). At 1218, the display engine 1202 notifies the codec 1204 that it has completed composing the first tile (i.e., tile 0). At 1220, the display engine 1202 notifies the codec 1206 that it has completed composing the second tile (i.e., tile 1). At 1222, the codec 1204 reads the first tile (i.e., tile 0) from the memory 1210 (and begins encoding the tile). At 1224, the codec 1206 reads the second tile from the memory 1210 (and begins encoding the tile). After composing the third tile (i.e., tile 2), the display engine 1202 stores pixels corresponding to tile to at 1226. At 1227, the display engine 1202 notifies the codec 1204 that the third tile has been composed (transmits a notification). At 1228 (after the codec 1204 completed encoding of the first tile (i.e., tile 0)), the codec 1204 stores the encoded tile into the memory 1214. At 1232, the codec 1204 reads the third tile (i.e., tile 2) from the memory 1210. At 1234, the packetizer 1208 reads the encoded tile corresponding to the first tile from the memory 1212. At 1236, the packetizer 1208 generates packets corresponding to the first tile. For example, a packetizer 1208 may generate the packets from the encoded tile based on the notification. At 1238 (after the codec 1204 completed encoding of the third tile (i.e., tile 2)), the codec 1204 stores the encoded tile into the memory 1214. At 1240, (after the codec 1206 completed encoding of the second tile (i.e., tile 1)), the codec 1206 stores the encoded tile into the memory 1214.

In this example, the tiles are encoded out of order and therefore the packetizer 1208 is notified about the tiles out of order. In particular, the first tile (i.e., tile 0) is encoded first (at 1228), the third tile (i.e., tile 2) is encoded second (at 1238), the second tile (i.e., tile 1) is encoded third (at 1240). Even though the packetizer 1208 had access to the third tile (i.e., tile 2) before it had access to the second tile (i.e., tile 1), the packetizer 1208 entered a low-power mode (e.g., sleep mode, idle mode, wait mode) at least in part because it did not receive a notification for a next sequential tile number (e.g., so that the tiles are packetized and transmitted in order). After the packetizer 1208 is notified about the next tile number (i.e. the second tile (tile 1) since it last packetized the first tile (tile 0) at 1236), the packetizer 1208 enters a full power mode to generate packets. At 1244, the packetizer 1208 reads the encoded tile corresponding to the second tile (tile 1) from the memory 1212. At 1246, the packetizer 1208 generates packets corresponding to the second tile. At 1248, the packetizer 1208 reads the encoded tile corresponding to the third tile (tile 2) from the memory 1212. At 1250, the packetizer 1208 generates packets corresponding to the third tile. Thus, although the packetizer 1208 received notification of the packets out of order, the packetizer 1208 generates the packets in the order.

Figure 13:
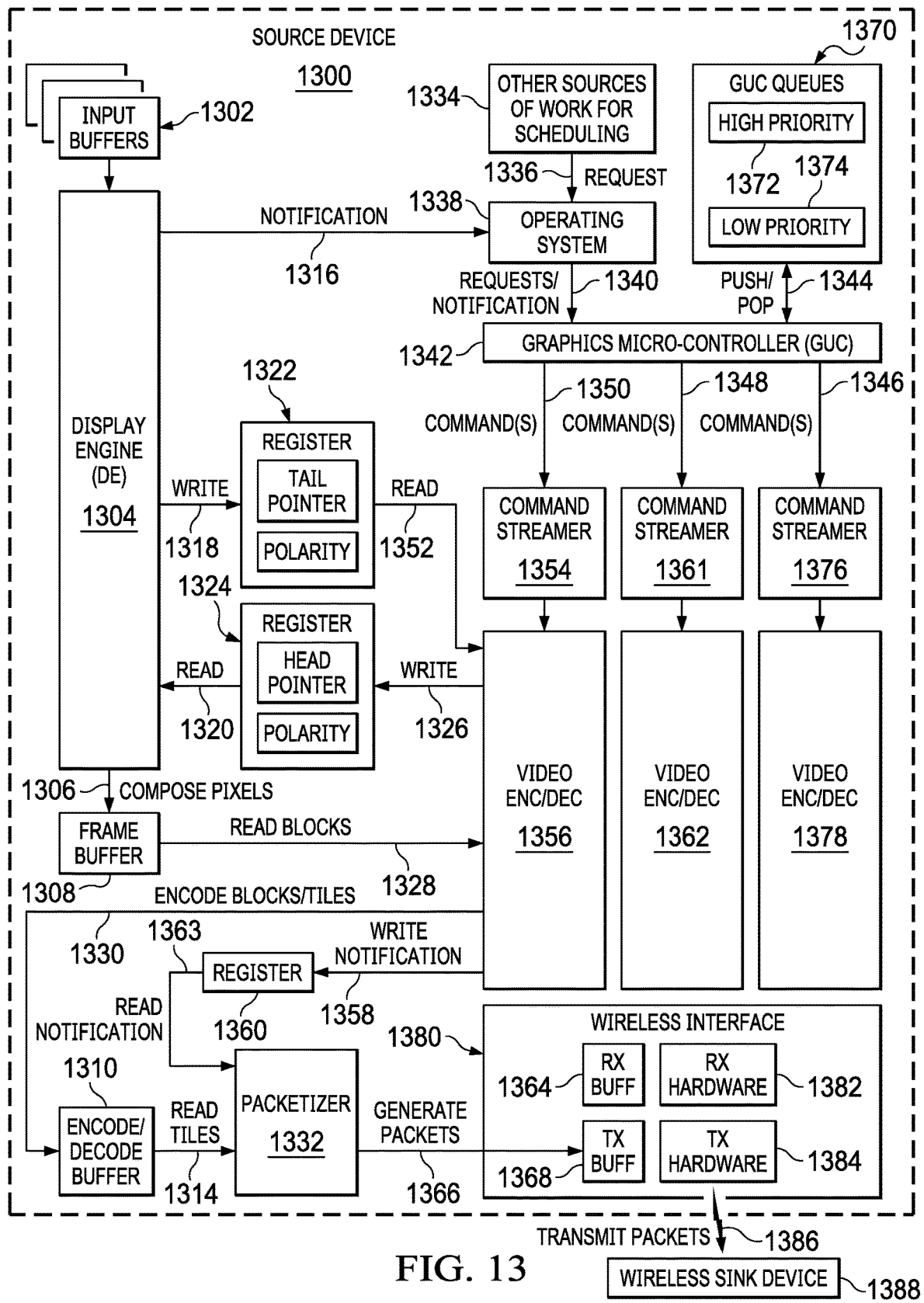
FIG. 13 illustrates messaging between components of a wireless display pipeline on a device during parallel processing of a video frame, according to some embodiments of the present disclosure.

Turning to FIG. 13, FIG. 13 illustrates some messaging between components of a wireless display pipeline on a source device 1300 during parallel processing of a video frame, according to some embodiments of the present disclosure. The source device 1300 comprises input buffers 1302, a display engine (DE) 1304, a frame buffer 1308, an encode/device buffer 1310, registers 1322, 1324, and 1360, a packetizer 1332, an operating system 1338, other sources of work for scheduling 1334 (e.g., applications executing in the operating system packets corresponding to a video to the sink device 1388), a graphics microcontroller (GUC) 1342, GUC queues 1370, command streamers 1354, 1361, and 1376, video encoders/decoders 1356, 1362, and 1378, and a wireless interface 1380. The registers 1322 and 1324 include pointers (head/tail pointers) and polarity values (e.g., bits or other values). The GUC queues 1370 comprise high priority queue 1372 and a low priority queue 1374. The wireless interface 1380 comprises a receiver (Rx) buffer 1364, a transmitter (Tx) buffer 1368, a receiver (Rx) hardware 1382, a transmitter (Tx) hardware 1384. The Rx hardware 1382 receives packets and stores them in the Rx buffer 1364. The Tx hardware 1388 transmits packets that are stored in the Tx buffer 1368.

The components of the source device 1300 can operate as is described for the device 200 (of FIG. 2). The details of which are not repeated here only for the sake of brevity. The device 1300 can execute instructions corresponding to at least a portion of a wireless display pipeline (e.g., based on instructions executed by the display engine 1304, the video encoder/decoders 1356, 1362, and 1378, the packetizer 1332, and the wireless interface 1380, in parallel with one another).

The source device 1300 can reduce latency associated with a display of the video frame on the sink device 1338 based on two or more components of the wireless display pipeline operating in parallel with one another. The FIG. 13 illustrates messages transferred between some components of the wireless display pipeline on the source device 1300 during such parallel operation.

As the display engine 1304 reads information from the input buffers 1302, it composes pixels into the frame buffer 1308. At the same time, the display engine 1304 tracks its progress through the frame buffer 1308 by updating the tail pointer and polarity in the register 1322 (which is read by video encoders, e.g., at 1352). After composing a threshold portion of a video frame (e.g., a certain number of line, blocks, tiles, and the like), the display engine 1304 transmits a notification 1213 the operating system 1338.

The operating system 1338 receives the notification 1316 and can also receive notifications and requests 1336 from other sources of work 1334. The operating system 1338 synthesizes the requests and/or notifications for transferring to the GUC 1342. Requests from the display engine 1302 (or other components of a wireless display pipeline) are placed (pushed at 1344) into the high priority queue 1372 of the GUC queues 1370. Requests from the operating system 1338 or from the other sources of work 1334 are placed (pushed at 1344) into the low priority queue 1374 in the GUC queues 1370.

The GUC 1342 first retrieves (pops at 1344) requests from the high priority queue 1372 and, when the high priority queue is empty, retrieves (pops at 1344) requests from the low priority queue 1374. The GUC 1342 uses the command streamers to stream commands to video encoders/decoders. Each of the video encoders/decoders is paired with a corresponding command streamer. For example, when the GUC 1342 transmits a request to the video encoder/decoder 1356 it does so by streaming commands 1350 through the command streamer 1354; when the GUC 1342 transmits a request to the video encoder/decoder 1362 it does so by streaming commands 1350 through the command streamer 1361; and when the GUC 1342 transmits a request to the video encoder/decoder 1378 it does so by streaming commands 1350 through the command streamer 1376.

Each of the encoders can read blocks of pixels from the frame buffer 1308. For clarity, only the video encoder/decoder 1356 is illustrated as performing encoding operations. However, each of the video encoder/decoder 1362 and 1378 can perform similar operations. In this case, the video encoder/decoder 1356 reads blocks (1328) from the frame buffer 1308 and encodes the blocks (1330) to produce encoded tiles into the buffer 1310. After encoding a threshold portion of a video frame (e.g., a block, a tile, and the like), the video encoder/decoder stores a notification 1358 in the register 1360, which is read (1363) by the packetizer 1332.

The packetizer 1332 reads encoded tiles (1314) from the buffer 1310 based at least in part on the notification. The packetizer 1332 accesses the encoded tiles based on the metadata in headers in the buffer 1310. The packetizer 1332 generates the packets from encoded tiles and stores them in the TX buffer 1368. The Tx hardware 1388 reads the packets that are stored in the Tx buffer 1368 and wirelessly transmits the packets to the sink device 1338 for display.

To provide for display of video data and/or for interaction with a user, embodiments of the subject matter described in this specification can be implemented on a device having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including text, pointer input (from a pointing device) acoustic, speech, tactile input. In addition, a computer can interact with a user by sending documents to and receiving documents from a device, including remote devices, which are used by the user.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The following examples pertain to some embodiments disclosed herein.

Example 1 is an apparatus for wireless display of video data, the apparatus comprising: an encoder configured to: encode groups of pixels of a video frame into encoded groups, wherein the video frame comprises a plurality of tiles and each of the plurality of tiles comprises one or more of the groups, and for each tile in the plurality of tiles: generate a notification based on completion of encoding an encoded tile corresponding to the tile; and a packetizer configured to: generate packets corresponding to the video frame simultaneous with the encoding of the video frame by the encoder, wherein for each tile in the plurality of tiles: the packets are generated from the encoded tile corresponding to the tile based on the notification.

Example 2 may include the subject matter of Example 1, and may further specify that the apparatus is configured to: reduce latency associated with display of the video frame based on the generation of the packets corresponding to the video frame being simultaneous with the encoding of the video frame.

Example 3 include the subject matter of any of Examples 1-2, and may further specify: a render engine configured to render the video frame.

Example 4 may include the subject matter of Example 3, further comprising:

a display engine configured to compose the video frame simultaneous with the rendering of the video frame by the render engine.

Example 5 may include the subject matter of Example 4, wherein the notification based on completion of encoding an encoded tile corresponding to the tile is a second notification; wherein the display engine is configured to: compose the pixels of the video frame, and generate a first notification based on a determination that a threshold portion of the video frame is composed; and one or more register configured to store an identifier corresponding to a first subset of the pixels of the video frame that are composed; and wherein the encoder is configured to: encode, based on the first notification, the groups of pixels of the video frame into the encoded groups simultaneous with the composition of the video frame by the display engine, and wherein for each group in the groups the encoder is to: encode the group into an encoded group based on a determination that the subset encloses the group, and prevent encoding the group based on a determination that the subset excludes the group.

Example 6 may include the subject matter of Example 5, wherein the display engine is configured to advance to a next video frame while the encoder is encoding the video frame, the one or more register is configured to store an identifier corresponding to a second subset of the pixels of the video frame that are encoded; wherein for each pixel of pixels of the next video frame the display engine is to: compose the pixel based on a determination that the second subset comprises the pixel, and prevent composing the pixel based on a determination that the second subset excludes the pixel.

Example 7 may include the subject matter of Example 6, wherein the next video frame is after the video frame in a sequence defined by a video.

Example 8 may include the subject matter of any of Examples 1-7, further comprising: a frame buffer comprising an area of memory in which to store the pixels of the video frame.

Example 9 may include the subject matter of Example 8, wherein the frame buffer is shared by the encoder and the display engine; wherein the display engine is configured to: access a set of input pixels, each in the set of input pixels is to be retrieved from a corresponding location in one or more input buffer, generate an output pixel based on the set of input pixels, and store the output pixel in the frame buffer.

Example 10 may include the subject matter of Example 5 or 6, wherein the one or more register configured to store at least one bit indicating whether the display engine is composing and the encoder is encoding a same video frame.

Example 11 may include the subject matter of Example 10, wherein the at least one bit comprises a first value based on the display engine composing and the encoder encoding the same frame and the at least one bit comprises a second value based on the display engine composing and the encoder encoding different video frames.

Example 12 may include the subject matter of Example 10, wherein the at least one bit comprises: a first bit and a second bit, and wherein: the first bit and the second bit contain matching values based on the display engine composing and the encoder encoding the same frame, and the first bit and the second bit contain mismatching values based on the display engine composing and the encoder encoding different video frames.

Example 13 may include the subject matter of any of Examples 1-12, further comprising: a transmitter configured to wirelessly transmit the packets corresponding to the video frame simultaneous with the generation of other packets corresponding to the video frame by the packetizer.

Example 14 may include the subject matter of Example 13, wherein the transmitter is configured to transmit the packets to a device for display.

Example 15 may include the subject matter of any of Examples 1-14, wherein the transmitter comprises a radio transmitter configured to transmit electromagnetic waves in a radio frequency.

Example 16 may include the subject matter of any of Examples 1-15, further comprising: a plurality of encoders, wherein the plurality of encoders is configured to simultaneously encode different ones of the groups of pixels of the video frame, and wherein the encoder is one of the plurality of encoders.

Example 17 may include the subject matter of Example 16, further comprising: a register to store an identifier corresponding to a subset of the pixels of the video frame that are encoded by the plurality of encoders, wherein the register is shared by the plurality of encoders.

Example 18 may include the subject matter of Example 17, further comprising: wherein the identifier identifies the subset based on one of the plurality of encoders that is more advanced within the video frame that others of the plurality of encoders.

Example 19 may include the subject matter of any of Examples 1-18, wherein the packetizer is configured to: receive an interrupt based on the notification.

Example 20 may include the subject matter of any of Examples 1-19, wherein the encoder is configured to: encode each of the one or more of the groups comprised in the tile to complete encoding of the encoded tile corresponding to the tile.

Example 21 may include the subject matter of any of Examples 1-20, wherein the encoder is configured to: generate metadata descriptive of the encoded tile.

Example 22 may include the subject matter of Example 21, wherein the packetizer is configured to: access the encoded tile based on the metadata.

Example 23 may include the subject matter of Example 21 and/or 22, wherein the packetizer is configured to: identify an area of memory occupied by the encoded tile based on the metadata; and read the encoded tile from the area of memory.

Example 24 may include the subject matter of Example 21, 22, and/or 23, wherein the metadata comprises a header, and the encoded tile is a payload corresponding to the header.

Example 25 may include the subject matter of Example 21, 22, 23, and/or 24, wherein the metadata comprises: a signature comprising a particular sequence of bits, a value identifying a size of an area of memory occupied by the encoded tile, a frame number corresponding to the video frame to which the tile belongs, and a tile number corresponding to the tile.

Example 26 may include the subject matter of any of Examples 1-25, further comprising: a buffer configured to store encoded data corresponding to one or more video frames.

Example 27 may include the subject matter of Example 26, wherein the encoder is configured to: prior to generating the metadata, reserve an area of the buffer for the metadata.

Example 28 may include the subject matter of Example 27, wherein the encoder is configured to: prevent writing the encoded groups into the area of the buffer.

Example 29 may include the subject matter of Example 27, wherein the encoder is configured to: clear the area of the buffer for the metadata.

Example 30 may include the subject matter of Example 27, wherein the encoder is configured to: store a zero in each bit in the area of the buffer.

Example 31 may include the subject matter of Example 27, wherein the encoder is configured to: store the encoded tile in the buffer; and store the metadata in the area of the buffer.

Example 32 may include the subject matter of any of Examples 26-31, wherein the metadata separates the encoded tile from a different encoded tile within the buffer.

Example 33 may include the subject matter of any of Examples 26-33, wherein the metadata delineates a boundary between the encoded tile and the different encoded tile within the buffer.

Example 34 may include the subject matter of any of Examples 1-33, wherein each of the packets complies with a wireless communication protocol.

Example 35 may include the subject matter of Example 8, wherein the encoder is configured to retrieve the groups of the pixels of the video frame from the frame buffer.

Example 36 may include the subject matter of any of Examples 1-35, wherein the video frame is one of a plurality of video frames of a video.

Example 37 may include the subject matter of any of Examples 1-36, wherein the encoder comprises a codec configured to: encode an unencoded video frame into an encoded video frame based on a video compression standard, and decode the encoded video frame into an unencoded video frame based on the video compression standard.

Example 38 is a machine readable non-transitory storage medium having instructions stored thereon, wherein the instructions, when executed by at least one processor, causes the at least one processor to perform operations comprising: encoding groups of pixels of a video frame into encoded groups, wherein the video frame comprises a plurality of tiles and each of the plurality of tiles comprises one or more of the groups; for each tile in the plurality of tiles: generating a notification based on completion of encoding an encoded tile corresponding to the tile; and generating packets corresponding to the video frame simultaneous with the encoding of the video frame, wherein for each tile in the plurality of tiles: the packets are generated from the encoded tile corresponding to the tile based on the notification.

Example 39 may include the subject matter of Example 38, wherein the operations comprise: reducing latency associated with display of the video frame based on the generation of the packets corresponding to the video frame being simultaneous with the encoding of the video frame.

Example 40 may include the subject matter of any of Examples 38-39, wherein the operations comprise: rendering the video frame.

Example 41 may include the subject matter of Example 40, wherein the operations comprise: composing the video frame simultaneous with the rendering of the video frame.

Example 42 may include the subject matter of Example 41, wherein the notification based on completion of encoding an encoded tile corresponding to the tile is a second notification; and wherein the operations comprise: composing the pixels of the video frame; generating a first notification based on a determination that a threshold portion of the video frame is composed; storing an identifier corresponding to a first subset of the pixels of the video frame that are composed; and encoding, based on the first notification, the groups of pixels of the video frame into the encoded groups simultaneous with the composition of the video frame, wherein for each group in the groups: encoding the group into an encoded group based on a determination that the subset encloses the group, and preventing encoding the group based on a determination that the subset excludes the group.

Example 43 may include the subject matter of Example 42, wherein the operations comprise: storing an identifier corresponding to a second subset of the pixels of the video frame that are encoded; and advancing to composing a next video frame while encoding the video frame, wherein for each pixel of the next video frame: compose the pixel based on a determination that the second subset comprises the pixel, and prevent composing the pixel based on a determination that the second subset excludes the pixel.

Example 44 may include the subject matter of Example 43, wherein the next video frame is after the video frame in a sequence defined by a video.

Example 45 may include the subject matter of any of Examples 38-44, wherein the operations comprise: storing the pixels of the video frame in a frame buffer.

Example 46 may include the subject matter of Example 45, wherein the frame buffer is shared by for the encoding and the composing; wherein the composing comprising: accessing a set of input pixels, each in the set of input pixels is accessed from one or more input buffer, generating an output pixel based on the set of input pixels, and storing the output pixel in the frame buffer.

Example 47 may include the subject matter of Example 42 or 43, wherein the operations comprise: storing at least one bit indicating whether the composing and the encoding are performed simultaneously on a same video frame.

Example 48 may include the subject matter of Example 47, wherein the operations comprise: storing a first value in the at least one bit based on the composing and the encoding are performed simultaneously on the same video frame; and storing a second value in the at least one bit based on the composing and the encoding are performed simultaneously on different video frames.

Example 49 may include the subject matter of Example 47, wherein the at least one bit comprises: a first bit and a second bit; and wherein the operations comprise: determining that the composing and the encoding are performed simultaneously on the same video frame based on the first bit and the second bit containing matching values; determining that the composing and the encoding are performed simultaneously on different video frames based on the first bit and the second bit containing mismatching values.

Example 50 may include the subject matter of any of Examples 38-49, wherein the operations comprise: wirelessly transmitting the packets corresponding to the video frame simultaneous with the generation of other packets corresponding to the video frame.

Example 51 may include the subject matter of Example 50, wherein the operations comprise: transmitting the packets to a device for display of the video frame.

Example 52 may include the subject matter of any of Examples 38-51, wherein the transmitting comprises: transmitting electromagnetic waves in a radio frequency.

Example 53 may include the subject matter of any of Examples 38-52, wherein the operations comprise: simultaneously encoding different ones of the groups of pixels of the video frame.

Example 54 may include the subject matter of Example 53, further comprising: storing an identifier corresponding to a subset of the pixels of the video frame that are being simultaneously encoded.

Example 55 may include the subject matter of Example 54, wherein the identifier identifies the subset based on one of the groups of pixels of the video frame being more advanced within the video frame that others of the groups of pixels of the video frame.

Example 56 may include the subject matter of any of Examples 38-55, wherein the operations comprise: generating an interrupt based on the notification.

Example 57 may include the subject matter of any of Examples 38-56, wherein the operations comprise: encoding each of the one or more of the groups comprised in the tile to complete encoding of the encoded tile corresponding to the tile.

Example 58 may include the subject matter of any of Examples 38-57, wherein the operations comprise: generating metadata descriptive of the encoded tile.

Example 59 may include the subject matter of Example 58, wherein the operations comprise: accessing the encoded tile based on the metadata.

Example 60 may include the subject matter of Example 58 and/or 59, wherein the operations comprise: identifying an area of memory occupied by the encoded tile based on the metadata; and reading the encoded tile from the area of memory.

Example 61 may include the subject matter of Example 58, 59, and/or 60, wherein the operations comprise: encoding the metadata into a header, wherein the encoded tile is a payload corresponding to the header.

Example 62 may include the subject matter of Example 58, 59, 60, and/or 61, wherein the metadata comprises: a signature comprising a particular sequence of bits, a value identifying a size of an area of memory occupied by the encoded tile, a frame number corresponding to the video frame to which the tile belongs, and a tile number corresponding to the tile.

Example 63 may include the subject matter of any of Examples 38-62, wherein the operations comprise: storing encoded data in a buffer.

Example 64 may include the subject matter of Example 63, wherein the operations comprise: prior to generating the metadata, reserving an area of the buffer for the metadata.

Example 65 may include the subject matter of Example 64, wherein the operations comprise: preventing writing the encoded groups into the area of the buffer.

Example 66 may include the subject matter of Example 64, wherein the operations comprise: clearing the area of the buffer for the metadata.

Example 67 may include the subject matter of Example 64, wherein the operations comprise: storing a zero in each bit in the area of the buffer.

Example 68 may include the subject matter of Example 64, wherein the operations comprise: storing the encoded tile in the buffer; and storing the metadata in the area of the buffer.

Example 69 may include the subject matter of any of Examples 63-68, wherein the metadata separates the encoded tile from a different encoded tile within the buffer.

Example 70 may include the subject matter of any of Examples 63-69, wherein the metadata delineates a boundary between the encoded tile and the different encoded tile within the buffer.

Example 71 may include the subject matter of any of Examples 38-70, wherein each of the packets is generated based on a wireless communication protocol.

Example 72 may include the subject matter of Example 45, wherein the operations comprise: retrieving the groups of the pixels of the video frame from the frame buffer.

Example 73 may include the subject matter of any of Examples 38-72, wherein the video frame is one of a plurality of video frames of a video.

Example 74 may include the subject matter of any of Examples 38-73, wherein the operations comprise: encoding an unencoded video frame into an encoded video frame based on a video compression standard; and decoding the encoded video frame into an unencoded video frame based on the video compression standard.

Example 75 is a method for wireless display of video data, the method comprising: encoding groups of pixels of a video frame into encoded groups, wherein the video frame comprises a plurality of tiles and each of the plurality of tiles comprises one or more of the groups; for each tile in the plurality of tiles: generating a notification based on completion of encoding an encoded tile corresponding to the tile; and generating packets corresponding to the video frame simultaneous with the encoding of the video frame, wherein for each tile in the plurality of tiles: the packets are generated from the encoded tile corresponding to the tile based on the notification.

Example 76 may include the subject matter of Example 75, further comprising:
reducing latency associated with display of the video frame based on the generation of the packets corresponding to the video frame being simultaneous with the encoding of the video frame.

Example 77 may include the subject matter of any of Examples 75-76, further comprising: rendering the video frame.

Example 78 may include the subject matter of Example 77, further comprising: composing the video frame simultaneous with the rendering of the video frame.

Example 79 may include the subject matter of Example 78, wherein the notification based on completion of encoding an encoded tile corresponding to the tile is a second notification; and further comprising: composing the pixels of the video frame; generating a first notification based on a determination that a threshold portion of the video frame is composed; storing an identifier corresponding to a first subset of the pixels of the video frame that are composed; and encoding, based on the first notification, the groups of pixels of the video frame into the encoded groups simultaneous with the composition of the video frame, wherein for each group in the groups: encoding the group into an encoded group based on a determination that the subset encloses the group, and preventing encoding the group based on a determination that the subset excludes the group.

Example 80 may include the subject matter of Example 79, further comprising: storing an identifier corresponding to a second subset of the pixels of the video frame that are encoded; and advancing to composing a next video frame while encoding the video frame, wherein for each pixel of the next video frame: compose the pixel based on a determination that the second subset comprises the pixel, and prevent composing the pixel based on a determination that the second subset excludes the pixel.

Example 81 may include the subject matter of Example 80, wherein the next video frame is after the video frame in a sequence defined by a video.

Example 82 may include the subject matter of any of Examples 75-81, further comprising: storing the pixels of the video frame in a frame buffer.

Example 83 may include the subject matter of Example 82, wherein the frame buffer is shared for the encoding and the composing; wherein the composing comprising: accessing a set of input pixels, each in the set of input pixels is accessed from one or more input buffer; generating an output pixel based on the set of input pixels; and storing the output pixel in the frame buffer.

Example 84 may include the subject matter of Example 79 or 80, further comprising: storing at least one bit indicating whether the composing and the encoding are performed simultaneously on a same video frame.

Example 85 may include the subject matter of Example 84, further comprising: storing a first value in the at least one bit based on the composing and the encoding are performed simultaneously on the same video frame; and storing a second value in the at least one bit based on the composing and the encoding are performed simultaneously on different video frames.

Example 86 may include the subject matter of Example 84, wherein the at least one bit comprises: a first bit and a second bit; and further comprising: determining that the composing and the encoding are performed simultaneously on the same video frame based on the first bit and the second bit containing matching values; determining that the composing and the encoding are performed simultaneously on different video frames based on the first bit and the second bit containing mismatching values.

Example 87 may include the subject matter of any of Examples 75-86, further comprising: wirelessly transmitting the packets corresponding to the video frame simultaneous with the generation of other packets corresponding to the video frame.

Example 88 may include the subject matter of Example 87, further comprising: transmitting the packets to a device for display of the video frame.

Example 89 may include the subject matter of any of Examples 75-88, wherein the transmitting comprises: transmitting electromagnetic waves in a radio frequency.

Example 90 may include the subject matter of any of Examples 75-89, further comprising: simultaneously encoding different ones of the groups of pixels of the video frame.

Example 91 may include the subject matter of Example 90, further comprising:
storing an identifier corresponding to a subset of the pixels of the video frame that are being simultaneously encoded.

Example 92 may include the subject matter of Example 91, wherein the identifier identifies the subset based on one of the groups of pixels of the video frame being more advanced within the video frame that others of the groups of pixels of the video frame.

Example 93 may include the subject matter of any of Examples 75-92, further comprising: generating an interrupt based on the notification.

Example 94 may include the subject matter of any of Examples 75-93, further comprising: encoding each of the one or more of the groups comprised in the tile to complete encoding of the encoded tile corresponding to the tile.

Example 95 may include the subject matter of any of Examples 75-94, further comprising: generating metadata descriptive of the encoded tile.

Example 96 may include the subject matter of Example 95, further comprising: accessing the encoded tile based on the metadata.

Example 97 may include the subject matter of Example 95 and/or 96, further comprising: identifying an area of memory occupied by the encoded tile based on the metadata; and reading the encoded tile from the area of memory.

Example 98 may include the subject matter of Example 95, 96, and/or 97, further comprising: encoding the metadata into a header, wherein the encoded tile is a payload corresponding to the header.

Example 99 may include the subject matter of Example 95, 96, 97, and/or 98, wherein the metadata comprises: a signature comprising a particular sequence of bits, a value identifying a size of an area of memory occupied by the encoded tile, a frame number corresponding to the video frame to which the tile belongs, and a tile number corresponding to the tile.

Example 100 may include the subject matter of any of Examples 75-99, further comprising: storing encoded data in a buffer.

Example 101 may include the subject matter of Example 100, further comprising: prior to generating the metadata, reserving an area of the buffer for the metadata.

Example 102 may include the subject matter of Example 101, further comprising: preventing writing the encoded groups into the area of the buffer.

Example 103 may include the subject matter of Example 101, further comprising: clearing the area of the buffer for the metadata.

Example 104 may include the subject matter of Example 101, further comprising:
storing a zero in each bit in the area of the buffer.

Example 105 may include the subject matter of Example 101, further comprising: storing the encoded tile in the buffer; and storing the metadata in the area of the buffer.

Example 106 may include the subject matter of any of Examples 100-105, wherein the metadata separates the encoded tile from a different encoded tile within the buffer.

Example 107 may include the subject matter of any of Examples 100-106, wherein the metadata delineates a boundary between the encoded tile and the different encoded tile within the buffer.

Example 108 may include the subject matter of any of Examples 75-77, wherein each of the packets is generated based on a wireless communication protocol.

Example 109 may include the subject matter of Example 82, further comprising: retrieving the groups of the pixels of the video frame from the frame buffer.

Example 110 may include the subject matter of any of Examples 75-109, wherein the video frame is one of a plurality of video frames of a video.

Example 111 may include the subject matter of any of Examples 75-110, further comprising: encoding an unencoded video frame into an encoded video frame based on a video compression standard; and decoding the encoded video frame into an unencoded video frame based on the video compression standard.

Example 112 is an apparatus comprising means to perform a method as specified in any of Examples 75-111.

Example 113 is a machine-readable storage including machine-readable instructions, when executed, to implement a method or realize an apparatus as specified in any of Examples 75-111.

Example 114 is a machine readable medium including code, when executed, to cause a machine to perform the methods of any one of Examples 75-111.

Example 115 is an apparatus comprising: a processor; and a memory coupled to the processor to store instructions, the instructions, when executed by the processor, to perform the methods of any one of Examples 75-111.

Example 116 is an apparatus for wireless display of video data, the apparatus comprising: means for encoding groups of pixels of a video frame into encoded groups, wherein the video frame comprises a plurality of tiles and each of the plurality of tiles comprises one or more of the groups; means for, for each tile in the plurality of tiles, generating a notification based on completion of encoding an encoded tile corresponding to the tile; and means for generating packets corresponding to the video frame simultaneous with the encoding of the video frame, wherein for each tile in the plurality of tiles: the packets are generated from the encoded tile corresponding to the tile based on the notification.

Example 117 may include the subject matter of Example 116, further comprising: means for reducing latency associated with display of the video frame based on the generation of the packets corresponding to the video frame being simultaneous with the encoding of the video frame.

Example 118 may include the subject matter of any of Examples 116-117, further comprising: means for rendering the video frame.

Example 119 may include the subject matter of Example 118, further comprising: means for composing the video frame simultaneous with the rendering of the video frame.

Example 120 may include the subject matter of Example 119, wherein the notification based on completion of encoding an encoded tile corresponding to the tile is a second notification; and further comprising: means for composing the pixels of the video frame; means for generating a first notification based on a determination that a threshold portion of the video frame is composed; means for storing an identifier corresponding to a first subset of the pixels of the video frame that are composed; and means for encoding, based on the first notification, the groups of pixels of the video frame into the encoded groups simultaneous with the composition of the video frame, wherein for each group in the groups: encoding the group into an encoded group based on a determination that the subset encloses the group, and preventing encoding the group based on a determination that the subset excludes the group.

Example 121 may include the subject matter of Example 120, further comprising: means for storing an identifier corresponding to a second subset of the pixels of the video frame that are encoded; and means for advancing to composing a next video frame while encoding the video frame, wherein for each pixel of the next video frame: compose the pixel based on a determination that the second subset comprises the pixel, and prevent composing the pixel based on a determination that the second subset excludes the pixel.

Example 122 may include the subject matter of Example 121, wherein the next video frame is after the video frame in a sequence defined by a video.

Example 123 may include the subject matter of any of Examples 116-122, further comprising: means for storing the pixels of the video frame in a frame buffer.

Example 124 may include the subject matter of Example 123, wherein the frame buffer is shared by for the encoding and the composing; and further comprising: means for accessing a set of input pixels, each in the set of input pixels is accessed from one or more input buffer, means for generating an output pixel based on the set of input pixels, and means for storing the output pixel in the frame buffer.

Example 125 may include the subject matter of Example 120 or 121, further comprising: means for storing at least one bit indicating whether the composing and the encoding are performed simultaneously on a same video frame.

Example 126 may include the subject matter of Example 125, further comprising: means for storing a first value in the at least one bit based on the composing and the encoding are performed simultaneously on the same video frame; and means for storing a second value in the at least one bit based on the composing and the encoding are performed simultaneously on different video frames.

Example 127 may include the subject matter of Example 125, wherein the at least one bit comprises: a first bit and a second bit; and further comprising: means for determining that the composing and the encoding are performed simultaneously on the same video frame based on the first bit and the second bit containing matching values; means for determining that the composing and the encoding are performed simultaneously on different video frames based on the first bit and the second bit containing mismatching values.

Example 128 may include the subject matter of any of Examples 116-127, further comprising: means for wirelessly transmitting the packets corresponding to the video frame simultaneous with the generation of other packets corresponding to the video frame.

Example 129 may include the subject matter of Example 128, further comprising: means for transmitting the packets to a device for display of the video frame.

Example 130 may include the subject matter of Example any of Examples 116-129, wherein the means for transmitting comprises: means for transmitting electromagnetic waves in a radio frequency.

Example 131 may include the subject matter of any of Examples 116-130, further comprising: means for simultaneously encoding different ones of the groups of pixels of the video frame.

Example 132 may include the subject matter of Example 131, further comprising: means for storing an identifier corresponding to a subset of the pixels of the video frame that are being simultaneously encoded.

Example 133 may include the subject matter of Example 132, wherein the identifier identifies the subset based on one of the groups of pixels of the video frame being more advanced within the video frame that others of the groups of pixels of the video frame.

Example 134 may include the subject matter of any of Examples 116-133, further comprising: means for generating an interrupt based on the notification.

Example 135 may include the subject matter of any of Examples 116-134, further comprising: means for encoding each of the one or more of the groups comprised in the tile to complete encoding of the encoded tile corresponding to the tile.

Example 136 may include the subject matter of any of Examples 116-135, further comprising:

means for generating metadata descriptive of the encoded tile.

Example 137 may include the subject matter of Example 136, further comprising: means for accessing the encoded tile based on the metadata.

Example 138 may include the subject matter of Example 136 and/or 137, further comprising: means for identifying an area of memory occupied by the encoded tile based on the metadata; and reading the encoded tile from the area of memory.

Example 139 may include the subject matter of Example 136, 137, and/or 138, further comprising: means for encoding the metadata into a header, wherein the encoded tile is a payload corresponding to the header.

Example 140 may include the subject matter of Example 136, 137, 138, and/or 139, wherein the metadata comprises: a signature comprising a particular sequence of bits, a value identifying a size of an area of memory occupied by the encoded tile, a frame number corresponding to the video frame to which the tile belongs, and a tile number corresponding to the tile.

Example 141 may include the subject matter of any of Examples 116-140, further comprising: means for storing encoded data in a buffer.

Example 142 may include the subject matter of Example 141, further comprising: means for prior to generating the metadata, reserving an area of the buffer for the metadata.

Example 143 may include the subject matter of Example 142, further comprising: means for preventing writing the encoded groups into the area of the buffer.

Example 144 may include the subject matter of Example 142, further comprising: means for clearing the area of the buffer for the metadata.

Example 145 may include the subject matter of Example 142, further comprising: means for storing a zero in each bit in the area of the buffer.

Example 146 may include the subject matter of Example 142, further comprising: means for storing the encoded tile in the buffer; and means for storing the metadata in the area of the buffer.

Example 147 may include the subject matter of any of Examples 141-146, wherein the metadata separates the encoded tile from a different encoded tile within the buffer.

Example 148 may include the subject matter of any of Examples 141-147, wherein the metadata delineates a boundary between the encoded tile and the different encoded tile within the buffer.

Example 149 may include the subject matter of any of Examples 116-148, wherein each of the packets is generated based on a wireless communication protocol.

Example 150 may include the subject matter of Example 123, further comprising: means for retrieving the groups of the pixels of the video frame from the frame buffer.

Example 151 may include the subject matter of any of Examples 116-150, wherein the video frame is one of a plurality of video frames of a video.

Example 152 may include the subject matter of any of Examples 116-151, further comprising: means for encoding an unencoded video frame into an encoded video frame based on a video compression standard; and means for decoding the encoded video frame into an unencoded video frame based on the video compression standard.

Example 153 is an apparatus for wireless display of video data, the apparatus comprising: a render engine configured to: render an image based on data generated by a program, wherein the image comprises a plurality of tiles and each of the plurality of tiles comprises one or more groups of pixels; and a display engine configured to: compose pixels of the image corresponding to a first tile of the image simultaneous with the rendering pixels of the image corresponding to a second tile of the image by the render engine.

Example 154 may include the subject matter of Example 153, wherein the apparatus is configured to: reduce latency associated with display of a video frame in which the image is included based on the rendering of the image being simultaneous with the composition of the image.

Example 155 may include the subject matter of any of Examples 153-154, further comprising: an encoder configured to encode the pixels of the image corresponding to the first tile simultaneous with the composition of the pixels of the image corresponding to the second tile by the display engine.

Example 156 may include the subject matter of Example 155, wherein for each pixel in the pixels, the encoder is configured to: compose the pixel based on a determination that the pixel is included in the first tile, and prevent composing the pixel based on a determination that the pixel is excluded from the first tile.

Example 157 may include the subject matter of any of Examples 155-156, wherein the display engine is configured to advance to a next video frame while the encoder is encoding the video frame; wherein the one or more register is configured to store an identifier corresponding to a second subset of the pixels of the video frame that are encoded; wherein for each pixel of pixels of the next video frame the display engine is to: compose the pixel based on a determination that the second subset comprises the pixel, and prevent composing the pixel based on a determination that the second subset excludes the pixel.

Example 158 may include the subject matter of Example 155, further comprising: a frame buffer comprising an area of memory in which to store data, the buffer being shared by the encoder and the display engine; wherein the display engine is configured to: access a set of input pixels, each in the set of input pixels is retrieved from one or more input buffer, generate an output pixel based on the set of input pixels, and store the output pixel in the frame buffer; and wherein the encoder is to retrieve the groups of the pixels of the video from the frame buffer.

Example 159 may include the subject matter of Example 157, wherein the one or more register is configured to store at least one bit indicating whether the composing and the encoding are performed simultaneously on a same video frame.

Example 160 may include the subject matter of any of Examples 153-159, further comprising: a packetizer configured to generate packets corresponding to the video frame simultaneous with the encoding of the video frame by the encoder.

Example 161 may include the subject matter of Example 160, further comprising: a transmitter configured to wirelessly transmit the packets corresponding to the video frame simultaneous with the generation of other packets corresponding to the video frame by the packetizer.

Example 162 may include the subject matter of Example 161, wherein the transmitter is configured to wirelessly transmit the packets corresponding to the first tile to a device for display.

Example 163 may include the subject matter of Example 161 and/or 162, wherein the transmitter comprises a radio transmitter configured to transmit electromagnetic waves in a radio frequency.

Example 164 may include the subject matter of any of Examples 153-163, wherein the render engine is configured to: store, in a buffer, the first tile of the image.

Example 165 may include the subject matter of any of Examples 153-164, wherein the render engine is configured to: store, in a buffer, the pixels of the image corresponding to the first tile.

Example 166 may include the subject matter of Example 164 or 165, wherein the display engine is configured to: access the pixels of the image corresponding to the first tile from the buffer.

Example 167 may include the subject matter of any of Examples 153-166, wherein the render engine renders one of the plurality of tiles at a time.

Example 168 may include the subject matter of any of Examples 153-167, wherein the image comprises a graphic representation of the data from the program.

Example 169 may include the subject matter of any of Examples 153-168, wherein the image comprises a video frame.

Example 170 may include the subject matter of any of Examples 153-169, wherein the image is a portion of a video stream.

Example 171 may include the subject matter of any of Examples 153-170, wherein the render engine is configured to: generate a notification based on a determination that a threshold portion of the image is rendered.

Example 172 may include the subject matter of Example 153, wherein the render engine is configured to: for each tile in the plurality of tiles: generate a notification based on completion of rendering the tile.

Example 173 may include the subject matter of Example 172, wherein each of the first tile and the second tile is one of the plurality of tiles.

Example 174 may include the subject matter of any of Examples 153-173, wherein the video frame is one of a plurality of video frames of a video.

Example 175 may include the subject matter of any of Examples 155-162, wherein the encoder comprises a codec configured to: encode an unencoded video frame into an encoded video frame that complies with a video compression standard, and decode the encoded video frame into an unencoded video frame.

Example 176 is a machine readable non-transitory storage medium having instructions stored thereon, wherein the instructions, when executed by at least one processor, causes the at least one processor to perform operations comprising: rendering an image based on data generated by a program, wherein the image comprises a plurality of tiles and each of the plurality of tiles comprises one or more groups of pixels; and composing pixels of the image corresponding to a first tile of the image simultaneous with the rendering pixels of the image corresponding to a second tile of the image.

Example 177 may include the subject matter of Example 176, wherein the operations comprise: reducing latency associated with display of a video frame in which the image is included based on the rendering of the image being simultaneous with the composition of the image.

Example 178 may include the subject matter of any of Examples 176-177, wherein the operations comprise: encoding the pixels of the image corresponding to the first tile simultaneous with the composition of the pixels of the image corresponding to the second tile.

Example 179 may include the subject matter of Example 178, wherein the operations comprise: for each pixel in the pixels: composing the pixel based on a determination that the pixel is included in the first tile, and preventing composing the pixel based on a determination that the pixel is excluded from the first tile.

Example 180 may include the subject matter of any of Examples 178-179, wherein the operations comprise: advancing to composing to a next video frame while encoding is encoding the video frame, storing an identifier corresponding to a second subset of the pixels of the video frame that are encoded; and for each pixel of pixels of the next video frame: composing the pixel based on a determination that the second subset comprises the pixel, and preventing composing the pixel based on a determination that the second subset excludes the pixel.

Example 181 may include the subject matter of Example 178, wherein the operations comprise: storing the pixels of the video frame in a frame buffer, wherein the frame buffer is shared for the encoding and the composing; accessing a set of input pixels, each in the set of input pixels is accessed from one or more input buffer; and generating an output pixel based on the set of input pixels, and storing the output pixel in the frame buffer.

Example 182 may include the subject matter of Example 180, wherein the operations comprise: storing at least one bit indicating whether the composing and the encoding are performed simultaneously on a same video frame.

Example 183 may include the subject matter of any of Examples 176-182, wherein the operations comprise: generating packets corresponding to the video frame simultaneous with the encoding of the video frame.

Example 184 may include the subject matter of Example 183, wherein the operations comprise: transmitting the packets corresponding to the video frame simultaneous with the generation of other packets corresponding to the video frame.

Example 185 may include the subject matter of Example 184, wherein the operations comprise: transmitting the packets to a device for display of the video frame Example 186 may include the subject matter of Example 183 and/or 184, wherein the transmitting comprises: transmitting electromagnetic waves in a radio frequency.

Example 187 may include the subject matter of Example 176, wherein the operations comprise: storing the first tile in a buffer.

Example 188 may include the subject matter of Example 176, wherein the operations comprise: storing the pixels of the image corresponding to the first tile in a buffer.

Example 189 may include the subject matter of Example 187 or 188, wherein the operations comprise: accessing the pixels of the image corresponding to the first tile from the buffer.

Example 190 may include the subject matter of any of Examples 176-189, wherein the operations comprise: rendering one of the plurality of tiles at a time.

Example 191 may include the subject matter of any of Examples 176-190, wherein the image comprises a graphic representation of the data from the program.

Example 192 may include the subject matter of any of Examples 176-191, wherein the image comprises a video frame.

Example 193 may include the subject matter of any of Examples 176-192, wherein the image is a portion of a video stream.

Example 194 may include the subject matter of any of Examples 176-193, wherein the operations comprise: generating a notification based on a determination that a threshold portion of the image is rendered.

Example 195 may include the subject matter of Example 176, wherein the operations comprise: for each tile in the plurality of tiles: generating a notification based on completion of rendering the tile.

Example 196 may include the subject matter of Example 195, wherein each of the first tile and the second tile is one of the plurality of tiles.

Example 197 may include the subject matter of any of Examples 176-196, wherein the video frame is one of a plurality of video frames of a video.

Example 198 may include the subject matter of any of Examples 178-186, wherein the operations comprise: encoding an unencoded video frame into an encoded video frame that complies with a video compression standard, and decoding the encoded video frame into an unencoded video frame.

Example 199 is a method for wireless display of video data, the method comprising: rendering an image based on data generated by a program, wherein the image comprises a plurality of tiles and each of the plurality of tiles comprises one or more groups of pixels; and composing pixels of the image corresponding to a first tile of the image simultaneous with the rendering pixels of the image corresponding to a second tile of the image.

Example 200 may include the subject matter of Example 199, further comprising:

reducing latency associated with display of a video frame in which the image is included based on the rendering of the image being simultaneous with the composition of the image.

Example 201 may include the subject matter of any of Examples 199-200, further comprising: encoding the pixels of the image corresponding to the first tile simultaneous with the composition of the pixels of the image corresponding to the second tile.

Example 202 may include the subject matter of Example 201, further comprising: for each pixel in the pixels: composing the pixel based on a determination that the pixel is included in the first tile, and preventing composing the pixel based on a determination that the pixel is excluded from the first tile.

Example 203 may include the subject matter of any of Examples 201-202, further comprising: advancing to composing to a next video frame while encoding is encoding the video frame, storing an identifier corresponding to a second subset of the pixels of the video frame that are encoded; and for each pixel of pixels of the next video frame: composing the pixel based on a determination that the second subset comprises the pixel, and preventing composing the pixel based on a determination that the second subset excludes the pixel.

Example 204 may include the subject matter of Example 201, further comprising: storing the pixels of the video frame in a frame buffer, wherein the frame buffer is shared for the encoding and the composing; accessing a set of input pixels, each in the set of input pixels is accessed from one or more input buffer; and generating an output pixel based on the set of input pixels, and storing the output pixel in the frame buffer.

Example 205 may include the subject matter of Example 203, further comprising: storing at least one bit indicating whether the composing and the encoding are performed simultaneously on a same video frame.

Example 206 may include the subject matter of any of Examples 199-205, further comprising: generating packets corresponding to the video frame simultaneous with the encoding of the video frame.

Example 207 may include the subject matter of Example 206, further comprising: transmitting the packets corresponding to the video frame simultaneous with the generation of other packets corresponding to the video frame.

Example 208 may include the subject matter of Example 207, further comprising: transmitting the packets to a device for display of the video frame Example 209 may include the subject matter of Example 206 and/or 207, wherein the transmitting comprises: transmitting electromagnetic waves in a radio frequency.

Example 210 may include the subject matter of Example 199, further comprising: storing the first tile in a buffer.

Example 211 may include the subject matter of Example 199, further comprising: storing the pixels of the image corresponding to the first tile in a buffer.

Example 212 may include the subject matter of Example 210 or 211, further comprising: accessing the pixels of the image corresponding to the first tile from the buffer.

Example 213 may include the subject matter of any of Examples 199-212, further comprising: rendering one of the plurality of tiles at a time.

Example 214 may include the subject matter of any of Examples 199-213, wherein the image comprises a graphic representation of the data from the program.

Example 215 may include the subject matter of any of Examples 199-214, wherein the image comprises a video frame.

Example 216 may include the subject matter of any of Examples 199-215, wherein the image is a portion of a video stream.

Example 217 may include the subject matter of any of Examples 199-216, further comprising: generating a notification based on a determination that a threshold portion of the image is rendered.

Example 218 may include the subject matter of Example 199, further comprising: for each tile in the plurality of tiles: generating a notification based on completion of rendering the tile.

Example 219 may include the subject matter of Example 218, wherein each of the first tile and the second tile is one of the plurality of tiles.

Example 220 may include the subject matter of any of Examples 199-219, wherein the video frame is one of a plurality of video frames of a video.

Example 221 may include the subject matter of any of Examples 201-209, further comprising: encoding an unencoded video frame into an encoded video frame that complies with a video compression standard, and decoding the encoded video frame into an unencoded video frame.

Example 222 is an apparatus comprising means to perform a method as specified in any of Examples 75-111.

Example 223 is a machine-readable storage including machine-readable instructions, when executed, to implement a method or realize an apparatus as specified in any of Examples 199-221.

Example 224 is a machine readable medium including code, when executed, to cause a machine to perform the methods of any one of Examples 199-221.

Example 225 is an apparatus comprising: a processor; and a memory coupled to the processor to store instructions, the instructions, when executed by the processor, to perform the methods of any one of Examples 199-221.

Example 226 is an apparatus for wireless display of video data, the apparatus comprising: means for rendering an image based on data generated by a program, wherein the image comprises a plurality of tiles and each of the plurality of tiles comprises one or more groups of pixels; and means for composing pixels of the image corresponding to a first tile of the image simultaneous with the rendering pixels of the image corresponding to a second tile of the image.

Example 227 may include the subject matter of Example 226, further comprising: means for reducing latency associated with display of a video frame in which the image is included based on the rendering of the image being simultaneous with the composition of the image.

Example 228 may include the subject matter of any of Examples 226-227, further comprising: means for encoding the pixels of the image corresponding to the first tile simultaneous with the composition of the pixels of the image corresponding to the second tile.

Example 229 may include the subject matter of Example 228, further comprising: means for, for each pixel in the pixels: composing the pixel based on a determination that the pixel is included in the first tile, and preventing composing the pixel based on a determination that the pixel is excluded from the first tile.

Example 230 may include the subject matter of Example 228 and/or 229, further comprising: means for advancing to composing to a next video frame while encoding is encoding the video frame, means for storing an identifier corresponding to a second subset of the pixels of the video frame that are encoded; and means for, for each pixel of pixels of the next video frame: composing the pixel based on a determination that the second subset comprises the pixel, and preventing composing the pixel based on a determination that the second subset excludes the pixel.

Example 231 may include the subject matter of Example 228, further comprising: means for storing the pixels of the video frame in a frame buffer, wherein the frame buffer is shared for the encoding and the composing; means for accessing a set of input pixels, each in the set of input pixels is accessed from one or more input buffer; means for generating an output pixel based on the set of input pixels, and means for storing the output pixel in the frame buffer.

Example 232 may include the subject matter of Example 230, further comprising: means for storing at least one bit indicating whether the composing and the encoding are performed simultaneously on a same video frame.

Example 233 may include the subject matter of any of Examples 226-232, further comprising: means for generating packets corresponding to the video frame simultaneous with the encoding of the video frame.

Example 234 may include the subject matter of Example 233, further comprising: means for transmitting the packets corresponding to the video frame simultaneous with the generation of other packets corresponding to the video frame by the packetizer.

Example 235 may include the subject matter of Example 234, further comprising: means for transmitting the packets to a device for display of the video frame Example 236 may include the subject matter of Example 233 and/or 234, wherein the means for transmitting comprises: means for transmitting electromagnetic waves in a radio frequency.

Example 237 may include the subject matter of Example 226, further comprising: means for storing the first tile in a buffer.

Example 238 may include the subject matter of Example 226, further comprising: means for storing the pixels of the image corresponding to the first tile in a buffer.

Example 239 may include the subject matter of Example 237 or 238, further comprising:

means for accessing the pixels of the image corresponding to the first tile from the buffer.

Example 240 may include the subject matter of any of Examples 226-239, further comprising: means for rendering one of the plurality of tiles at a time.

Example 241 may include the subject matter of any of Examples 226-240, wherein the image comprises a graphic representation of the data from the program.

Example 242 may include the subject matter of any of Examples 226-241, wherein the image comprises a video frame.

Example 243 may include the subject matter of any of Examples 226-242, wherein the image is a portion of a video stream.

Example 244 may include the subject matter of any of Examples 226-243, further comprising: means for generating a notification based on a determination that a threshold portion of the image is rendered.

Example 245 may include the subject matter of Example 226, further comprising: means for, for each tile in the plurality of tiles, generating a notification based on completion of rendering the tile.

Example 246 may include the subject matter of Example 245, wherein each of the first tile and the second tile is one of the plurality of tiles.

Example 247 may include the subject matter of any of Examples 226-246, wherein the video frame is one of a plurality of video frames of a video.

Example 248 may include the subject matter of any of Examples 228-236, further comprising: means for encoding an unencoded video frame into an encoded video frame that complies with a video compression standard, and means for decoding the encoded video frame into an unencoded video frame.

Example 249 is an apparatus for wireless display of video data, the apparatus comprising: a display engine to: compose pixels of a video frame, and generate a notification based on a determination that a threshold portion of the video frame is composed; one or more register to store an identifier corresponding to a first subset of the pixels of the video frame that are composed; and an encoder to: encode, based on the notification, groups of the pixels of the video frame simultaneous with the composition of the video frame by the display engine, wherein for each group in the groups the encoder is to: encode the group based on a determination that the first subset encloses the group, and prevent encoding the group based on a determination that the first subset excludes the group.

Example 250 may include the subject matter of Example 249, wherein the apparatus is configured to: reduce latency associated with display of the video frame based on the encoding of the video frame being simultaneous with the composition of the video frame.

Example 251 may include the subject matter of any of Examples 249-250, wherein the video frame comprises a plurality of tiles and each of the plurality of tiles comprises a plurality of groups of the pixels, and wherein the encoder is configured to: for each tile in the plurality of tiles: generate a second notification based on completion of encoding an encoded tile corresponding to the tile.

Example 252 may include the subject matter of Example 251, further comprising: a packetizer configured to generate packets corresponding to the video frame simultaneous with the encoding of the video frame by the encoder, wherein for each tile in the plurality of tiles: the packets are generated from the encoded tile corresponding to the tile based on the second notification.

Example 253 may include the subject matter of Example 252, further comprising: a transmitter configured to wirelessly transmit the packets corresponding to the video frame simultaneous with the generation of other packets corresponding to the video frame by the packetizer.

Example 254 may include the subject matter of any of Examples 249-253, further comprising: a render engine configured to render the video frame.

Example 255 may include the subject matter of Example 249, wherein the display engine is configured to advance to a next video frame while the encoder is encoding the video frame, the one or more register is configured to store an identifier corresponding to a second subset of the pixels of the video frame that are encoded; and wherein for each pixel of pixels of the next video frame the display engine is to: compose the pixel based on a determination that the second subset comprises the pixel, and prevent composing the pixel based on a determination that the second subset excludes the pixel.

Example 256 may include the subject matter of any of Examples 249-255, further comprising: a frame buffer comprising an area of memory in which to store data, the buffer being shared by the encoder and the display engine; wherein the display engine is configured to: access a set of input pixels, each in the set of input pixels is retrieved from a corresponding location in each of one or more input buffer, generate an output pixel based on the set of input pixels, store the output pixel in the frame buffer; and wherein the encoder is to retrieve the groups of the pixels of the video from the frame buffer.

Example 257 may include the subject matter of any of Examples 249-256, wherein the one or more register configured to store the at least one bit indicating whether the display engine is composing and the encoder is encoding a same frame.

Example 258 may include the subject matter of any of Examples 249-257, wherein the video frame is one of a plurality of video frames of a video.

Example 259 may include the subject matter of any of Examples 249-258, wherein the encoder comprises a codec configured to: encode an unencoded video frame into an encoded video frame that complies with a video compression standard, and decode the encoded video frame into an unencoded video frame.

Example 260 is a machine readable non-transitory storage medium having instructions stored thereon, wherein the instructions, when executed by at least one processor, causes the at least one processor to perform operations comprising: composing pixels of a video frame; and generating a notification based on a determination that a threshold portion of the video frame is composed; storing an identifier corresponding to a first subset of the pixels of the video frame that are composed; encoding, based on the notification, groups of the pixels of the video frame simultaneous with the composition of the video frame, wherein for each group in the groups: encoding the group based on a determination that the first subset encloses the group, and prevent encoding the group based on a determination that the first subset excludes the group.

Example 261 may include the subject matter of Example 260, wherein the operations comprise: reducing latency associated with display of the video frame based on the encoding of the video frame being simultaneous with the composition of the video frame.

Example 262 may include the subject matter of any of Examples 260-261, wherein the video frame comprises a plurality of tiles and each of the plurality of tiles comprises a plurality of groups of the pixels, and wherein the operations comprise: for each tile in the plurality of tiles: generating a second notification based on completion of encoding an encoded tile corresponding to the tile.

Example 263 may include the subject matter of Example 262, wherein the operations comprise: generating packets corresponding to the video frame simultaneous with the encoding of the video frame, wherein the generating comprises, for each tile in the plurality of tiles, generating the packets from the encoded tile corresponding to the tile based on the second notification.

Example 264 may include the subject matter of Example 263, wherein the operations comprise: transmitting the packets corresponding to the video frame simultaneous with the generation of other packets corresponding to the video frame.

Example 265 may include the subject matter of any of Examples 260-264, wherein the operations comprise: rendering the video frame.

Example 266 may include the subject matter of Example 260, wherein the operations comprise: advancing to composing to a next video frame while encoding is encoding the video frame, storing an identifier corresponding to a second subset of the pixels of the video frame that are encoded; and for each pixel of pixels of the next video frame: composing the pixel based on a determination that the second subset comprises the pixel, and preventing composing the pixel based on a determination that the second subset excludes the pixel.

Example 267 may include the subject matter of any of Examples 260-266, wherein the operations comprise: storing the pixels of the video frame in a frame buffer, wherein the frame buffer is shared for the encoding and the composing; accessing a set of input pixels, each in the set of input pixels is accessed from one or more input buffer; generating an output pixel based on the set of input pixels; storing the output pixel in the frame buffer; and retrieving the groups of the pixels of the video from the frame buffer.

Example 268 may include the subject matter of any of Examples 260-267, wherein the operations comprise: storing the at least one bit indicating whether the composing and the encoding are performed simultaneously on a same video frame.

Example 269 may include the subject matter of any of Examples 260-268, wherein the video frame is one of a plurality of video frames of a video.

Example 270 may include the subject matter of any of Examples 260-269, wherein the operations comprise: encoding an unencoded video frame into an encoded video frame that complies with a video compression standard, and decoding the encoded video frame into an unencoded video frame.

Example 271 is a method for wireless display of video data, the method comprising: composing pixels of a video frame; and generating a notification based on a determination that a threshold portion of the video frame is composed; storing an identifier corresponding to a first subset of the pixels of the video frame that are composed; encoding, based on the notification, groups of the pixels of the video frame simultaneous with the composition of the video frame, wherein for each group in the groups: encoding the group based on a determination that the first subset encloses the group, and prevent encoding the group based on a determination that the first subset excludes the group.

Example 272 may include the subject matter of Example 271, further comprising: reducing latency associated with display of the video frame based on the encoding of the video frame being simultaneous with the composition of the video frame.

Example 273 may include the subject matter of any of Examples 271-272, wherein the video frame comprises a plurality of tiles and each of the plurality of tiles comprises a plurality of groups of the pixels, and further comprising: for each tile in the plurality of tiles: generating a second notification based on completion of encoding an encoded tile corresponding to the tile.

Example 274 may include the subject matter of Example 273, further comprising: generating packets corresponding to the video frame simultaneous with the encoding of the video frame, wherein the generating comprises, for each tile in the plurality of tiles, generating the packets from the encoded tile corresponding to the tile based on the second notification.

Example 275 may include the subject matter of Example 274, further comprising: transmitting the packets corresponding to the video frame simultaneous with the generation of other packets corresponding to the video frame.

Example 276 may include the subject matter of any of Examples 271-275, further comprising: rendering the video frame.

Example 277 may include the subject matter of Example 271, further comprising: advancing to composing to a next video frame while encoding is encoding the video frame, storing an identifier corresponding to a second subset of the pixels of the video frame that are encoded; and for each pixel of pixels of the next video frame: composing the pixel based on a determination that the second subset comprises the pixel, and preventing composing the pixel based on a determination that the second subset excludes the pixel.

Example 278 may include the subject matter of any of Examples 271-277, further comprising: storing the pixels of the video frame in a frame buffer, wherein the frame buffer is shared for the encoding and the composing; accessing a set of input pixels, each in the set of input pixels is accessed from one or more input buffer; generating an output pixel based on the set of input pixels; storing the output pixel in the frame buffer; and retrieving the groups of the pixels of the video from the frame buffer.

Example 279 may include the subject matter of any of Examples 271-278, further comprising: storing the at least one bit indicating whether the composing and the encoding are performed simultaneously on a same video frame.

Example 280 may include the subject matter of any of Examples 271-279, wherein the video frame is one of a plurality of video frames of a video.

Example 281 may include the subject matter of any of Examples 271-280, further comprising: encoding an unencoded video frame into an encoded video frame that complies with a video compression standard, and decoding the encoded video frame into an unencoded video frame.

Example 282 is an apparatus comprising means to perform a method as specified in any of Examples 271-281.

Example 283 is a machine-readable storage including machine-readable instructions, when executed, to implement a method or realize an apparatus as specified in any of Examples 271-281.

Example 284 is a machine readable medium including code, when executed, to cause a machine to perform the methods of any one of Examples 271-281.

Example 285 is an apparatus comprising: a processor; and a memory coupled to the processor to store instructions, the instructions, when executed by the processor, to perform the methods of any one of Examples 271-281.

Example 286 is an apparatus for wireless display of video data, the apparatus comprising: means for composing pixels of a video frame; and means for generating a notification based on a determination that a threshold portion of the video frame is composed; means for storing an identifier corresponding to a first subset of the pixels of the video frame that are composed; means for encoding, based on the notification, groups of the pixels of the video frame simultaneous with the composition of the video frame, wherein for each group in the groups: encoding the group based on a determination that the first subset encloses the group, and prevent encoding the group based on a determination that the first subset excludes the group.

Example 287 may include the subject matter of Example 286, further comprising: means for reducing latency associated with display of the video frame based on the encoding of the video frame being simultaneous with the composition of the video frame.

Example 288 may include the subject matter of any of Examples 286-287, wherein the video frame comprises a plurality of tiles and each of the plurality of tiles comprises a plurality of groups of the pixels, and further comprising: means for, for each tile in the plurality of tiles, generating a second notification based on completion of encoding an encoded tile corresponding to the tile.

Example 289 may include the subject matter of Example 288, further comprising: means for generating packets corresponding to the video frame simultaneous with the encoding of the video frame, wherein the generating comprises, for each tile in the plurality of tiles, generating the packets from the encoded tile corresponding to the tile based on the second notification.

Example 290 may include the subject matter of Example 289, further comprising: means for transmitting the packets corresponding to the video frame simultaneous with the generation of other packets corresponding to the video frame.

Example 291 may include the subject matter of any of Examples 286-290, further comprising: means for rendering the video frame.

Example 292 may include the subject matter of Example 286, further comprising: means for advancing to composing to a next video frame while encoding is encoding the video frame, means for storing an identifier corresponding to a second subset of the pixels of the video frame that are encoded; and means for, for each pixel of pixels of the next video frame: composing the pixel based on a determination that the second subset comprises the pixel, and preventing composing the pixel based on a determination that the second subset excludes the pixel.

Example 293 may include the subject matter of any of Examples 286-292, further comprising: means for storing the pixels of the video frame in a frame buffer, wherein the frame buffer is shared for the encoding and the composing; means for accessing a set of input pixels, each in the set of input pixels is accessed from one or more input buffer; means for generating an output pixel based on the set of input pixels; means for storing the output pixel in the frame buffer; and means for retrieving the groups of the pixels of the video from the frame buffer.

Example 294 may include the subject matter of any of Examples 286-293, further comprising: means for storing the at least one bit indicating whether the composing and the encoding are performed simultaneously on a same video frame.

Example 295 may include the subject matter of any of Examples 286-294, wherein the video frame is one of a plurality of video frames of a video.

Example 296 may include the subject matter of any of Examples 286-295, further comprising: means for encoding an unencoded video frame into an encoded video frame that complies with a video compression standard; and means for decoding the encoded video frame into an unencoded video frame.

Example 297 is an apparatus for wireless display of video data, the apparatus comprising: a packetizer configured to generate packets corresponding to a first tile of a plurality of tiles of a video frame, wherein each of the plurality of tiles comprises a group of pixels of the video frame; and a transmitter configured to wirelessly transmit the packets corresponding to the first tile of the video frame simultaneous with the generation of packets corresponding to others of the plurality of tiles of the video frame by the packetizer.

Example 298 may include the subject matter of Example 297, wherein the apparatus is configured to: reduce latency associated with display of the video frame based on the generation of the packets corresponding to the first tile of the video frame being simultaneous with the transmission of the packets corresponding to others of the plurality of tiles of the video frame.

Example 299 may include the subject matter of Example 297 and/or 298, wherein the transmitter is configured to wirelessly transmit the packets corresponding to the first tile to a device for display.

Example 300 may include the subject matter of any of Examples 297-298, wherein the transmitter comprises a radio transmitter configured to transmit electromagnetic waves in a radio frequency.

Example 301 may include the subject matter of any of Examples 297-300, further comprising: a render engine configured to render the video frame.

Example 302 may include the subject matter of Example 301, further comprising: a display engine configured to compose the video frame simultaneous with the rendering of the video frame by the render engine.

Example 303 may include the subject matter of Example 302, wherein the display engine is configured to: compose the pixels of the video frame, and generate a first notification based on a determination that a threshold portion of the video frame is composed; and further comprising: one or more register to store an identifier corresponding to a subset of the pixels of the video frame that are composed.

Example 304 may include the subject matter of Example 302 and/or 303, further comprising: an encoder configured to encode the video frame simultaneous with the composition of the video frame by the display engine.

Example 305 may include the subject matter of Example 304, wherein the encoder is configured to: encode, based on the first notification, the groups of pixels of the video frame into the encoded groups simultaneous with the composition of the video frame by the display engine, and wherein for each group in the groups the encoder is configured to: encode the group into an encoded group based on a determination that the subset encloses the group, and
prevent encoding the group based on a determination that the subset excludes the group.

Example 306 may include the subject matter of Example 304 and/or 305, wherein the packetizer is configured to: generate the packets corresponding to the first tile of the video frame simultaneous with the encoding of the video frame by the encoder.

Example 307 may include the subject matter of Example 304 and/or 305, wherein the encoder comprises a codec configured to: encode an unencoded video frame into an encoded video frame that complies with a video compression standard, and decode the encoded video frame into an unencoded video frame.

Example 308 may include the subject matter of Example 306, wherein the encoder is configured to: for each tile in the plurality of tiles: generate a second notification based on completion of encoding an encoded tile corresponding to the tile.

Example 309 may include the subject matter of Example 308, wherein the packetizer is configured to: generate packets corresponding to the video frame simultaneous with the encoding of the video frame by the encoder, wherein for each tile in the plurality of tiles: the packets are generated from the encoded tile corresponding to the tile based on the second notification.

Example 310 may include the subject matter of Example 304, wherein the encoder comprises a codec configured to: encode an unencoded video frame into an encoded video frame that complies with a video compression standard, and decode the encoded video frame into an unencoded video frame.

Example 311 may include the subject matter of any of Examples 297-310, wherein each of the packets complies with a wireless communication protocol.

Example 312 may include the subject matter of any of Examples 297-311, wherein the video frame is one of a plurality of video frames of a video.

Example 313 is a machine readable non-transitory storage medium having instructions stored thereon, wherein the instructions, when executed by at least one processor, causes the at least one processor to perform operations comprising: generating packets corresponding to a first tile of a plurality of tiles of a video frame, wherein each of the plurality of tiles comprises a group of pixels of the video frame; and wirelessly transmitting the packets corresponding to the first tile of the video frame simultaneous with the generation of packets corresponding to others of the plurality of tiles of the video frame by the packetizer.

Example 314 may include the subject matter of Example 313, wherein the operations comprise: reducing latency associated with display of the video frame based on the generation of the packets corresponding to the first tile of the video frame being simultaneous with the transmission of the packets corresponding to others of the plurality of tiles of the video frame.

Example 315 may include the subject matter of Example 313 and/or 314, wherein the operations comprise: wirelessly transmitting the packets corresponding to the first tile to a device for display.

Example 316 may include the subject matter of any of Examples 313-315, wherein the transmitting comprises: transmitting electromagnetic waves in a radio frequency.

Example 317 may include the subject matter of any of Examples 313-316, wherein the operations comprise: rendering the video frame.

Example 318 may include the subject matter of Example 317, wherein the operations comprise: composing the video frame simultaneous with the rendering of the video frame by the render engine.

Example 319 may include the subject matter of Example 318, wherein the operations comprise: composing the pixels of the video frame; generating a first notification based on a determination that a threshold portion of the video frame is composed; and storing an identifier corresponding to a first subset of the pixels of the video frame that are composed.

Example 320 may include the subject matter of Example 318 and/or 319, wherein the operations comprise: encoding, based on the first notification, the groups of pixels of the video frame into the encoded groups simultaneous with the composition of the video frame.

Example 321 may include the subject matter of Example 320, wherein the operations comprise: encoding, based on the first notification, the groups of pixels of the video frame into the encoded groups simultaneous with the composition of the video frame, wherein for each group in the groups: encoding the group into an encoded group based on a determination that the subset encloses the group, and preventing encoding the group based on a determination that the subset excludes the group.

Example 322 may include the subject matter of Example 320 and/or 321, wherein the operations comprise: generating the packets corresponding to the first tile of the video frame simultaneous with the encoding of the video frame.

Example 323 may include the subject matter of Example 320 and/or 321 wherein the operations comprise: encoding an unencoded video frame into an encoded video frame that complies with a video compression standard, and decoding the encoded video frame into an unencoded video frame.

Example 324 may include the subject matter of Example 322, wherein the operations comprise: for each tile in the plurality of tiles: generating a second notification based on completion of encoding an encoded tile corresponding to the tile.

Example 325 may include the subject matter of Example 324, wherein the operations comprise: generating packets corresponding to the video frame simultaneous with the encoding of the video frame, wherein the generating comprises, for each tile in the plurality of tiles, generating the packets from the encoded tile corresponding to the tile based on the second notification.

Example 326 may include the subject matter of Example 320, wherein the operations comprise: encoding an unencoded video frame into an encoded video frame that complies with a video compression standard, and decoding the encoded video frame into an unencoded video frame.

Example 327 may include the subject matter of any of Examples 313-326, wherein each of the packets complies with a wireless communication protocol.

Example 328 may include the subject matter of any of Examples 313-327, wherein the video frame is one of a plurality of video frames of a video.

Example 329 is a method for wireless display of video data, the method comprising: generating packets corresponding to a first tile of a plurality of tiles of a video frame, wherein each of the plurality of tiles comprises a group of pixels of the video frame; and wirelessly transmitting the packets corresponding to the first tile of the video frame simultaneous with the generation of packets corresponding to others of the plurality of tiles of the video frame by the packetizer.

Example 330 may include the subject matter of Example 329, further comprising: reducing latency associated with display of the video frame based on the generation of the packets corresponding to the first tile of the video frame being simultaneous with the transmission of the packets corresponding to others of the plurality of tiles of the video frame.

Example 331 may include the subject matter of Example 329 and/or 330, further comprising: wirelessly transmitting the packets corresponding to the first tile to a device for display.

Example 332 may include the subject matter of any of Examples 329-331, wherein the transmitting comprises: transmitting electromagnetic waves in a radio frequency.

Example 333 may include the subject matter of any of Examples 329-332, further comprising: rendering the video frame.

Example 334 may include the subject matter of Example 333, further comprising: composing the video frame simultaneous with the rendering of the video frame by the render engine.

Example 335 may include the subject matter of Example 334, further comprising: composing the pixels of the video frame; generating a first notification based on a determination that a threshold portion of the video frame is composed; and storing an identifier corresponding to a first subset of the pixels of the video frame that are composed.

Example 336 may include the subject matter of Example 334 and/or 335, further comprising: encoding, based on the first notification, the groups of pixels of the video frame into the encoded groups simultaneous with the composition of the video frame.

Example 337 may include the subject matter of Example 336, further comprising: encoding, based on the first notification, the groups of pixels of the video frame into the encoded groups simultaneous with the composition of the video frame, wherein for each group in the groups: encoding the group into an encoded group based on a determination that the subset encloses the group, and preventing encoding the group based on a determination that the subset excludes the group.

Example 338 may include the subject matter of Example 336 336 and/or 337, further comprising: generating the packets corresponding to the first tile of the video frame simultaneous with the encoding of the video frame.

Example 339 may include the subject matter of Example 336 and/or 337 further comprising: encoding an unencoded video frame into an encoded video frame that complies with a video compression standard, and decoding the encoded video frame into an unencoded video frame.

Example 340 may include the subject matter of Example 338, further comprising: for each tile in the plurality of tiles: generating a second notification based on completion of encoding an encoded tile corresponding to the tile.

Example 341 may include the subject matter of Example 340, further comprising:

generating packets corresponding to the video frame simultaneous with the encoding of the video frame, wherein the generating comprises, for each tile in the plurality of tiles, generating the packets from the encoded tile corresponding to the tile based on the second notification.

Example 342 may include the subject matter of Example 336, further comprising: encoding an unencoded video frame into an encoded video frame that complies with a video compression standard, and decoding the encoded video frame into an unencoded video frame.

Example 343 may include the subject matter of any of Examples 329-342, wherein each of the packets complies with a wireless communication protocol.

Example 344 may include the subject matter of any of Examples 329-343, wherein the video frame is one of a plurality of video frames of a video.

Example 345 is an apparatus comprising means to perform a method as specified in any of Examples 75-111.

Example 346 is a machine-readable storage including machine-readable instructions, when executed, to implement a method or realize an apparatus as specified in any of Examples 329-433.

Example 347 is a machine readable medium including code, when executed, to cause a machine to perform the methods of any one of Examples 329-433.

Example 348 is an apparatus comprising: a processor; and a memory coupled to the processor to store instructions, the instructions, when executed by the processor, to perform the methods of any one of Examples 329-433.

Example 349 is an apparatus for wireless display of video data, the apparatus comprising:

means for generating packets corresponding to a first tile of a plurality of tiles of a video frame, wherein each of the plurality of tiles comprises a group of pixels of the video frame; and means for wirelessly transmitting the packets corresponding to the first tile of the video frame simultaneous with the generation of packets corresponding to others of the plurality of tiles of the video frame by the packetizer.

Example 350 may include the subject matter of Example 349, further comprising: means for reducing latency associated with display of the video frame based on the generation of the packets corresponding to the first tile of the video frame being simultaneous with the transmission of the packets corresponding to others of the plurality of tiles of the video frame.

Example 351 may include the subject matter of Example 349 and/or 350, further comprising: means for wirelessly transmitting the packets corresponding to the first tile to a device for display.

Example 352 may include the subject matter of any of Examples 349-350, wherein the means for transmitting comprises: means for transmitting electromagnetic waves in a radio frequency.

Example 353 may include the subject matter of any of Examples 349-352, further comprising: means for rendering the video frame.

Example 354 may include the subject matter of Example 353, further comprising: means for composing the video frame simultaneous with the rendering of the video frame by the render engine.

Example 355 may include the subject matter of Example 354, further comprising: means for composing the pixels of the video frame; means for generating a first notification based on a determination that a threshold portion of the video frame is composed; and means for storing an identifier corresponding to a first subset of the pixels of the video frame that are composed.

Example 356 may include the subject matter of Example 354 and/or 355, further comprising: means for encoding, based on the first notification, the groups of pixels of the video frame into the encoded groups simultaneous with the composition of the video frame.

Example 357 may include the subject matter of Example 356, further comprising: means for encoding, based on the first notification, the groups of pixels of the video frame into the encoded groups simultaneous with the composition of the video frame, wherein for each group in the groups: encoding the group into an encoded group based on a determination that the subset encloses the group, and preventing encoding the group based on a determination that the subset excludes the group.

Example 358 may include the subject matter of Example 356 and/or 357, further comprising: means for generating the packets corresponding to the first tile of the video frame simultaneous with the encoding of the video frame.

Example 359 may include the subject matter of Example 356 and/or 357 further comprising: means for encoding an unencoded video frame into an encoded video frame that complies with a video compression standard, and decoding the encoded video frame into an unencoded video frame.

Example 360 may include the subject matter of Example 358, further comprising: means for, for each tile in the plurality of tiles, generating a second notification based on completion of encoding an encoded tile corresponding to the tile.

Example 361 may include the subject matter of Example 360, further comprising: means for generating packets corresponding to the video frame simultaneous with the encoding of the video frame, wherein the generating comprises, for each tile in the plurality of tiles, generating the packets from the encoded tile corresponding to the tile based on the second notification.

Example 362 may include the subject matter of Example 356, further comprising: means for encoding an unencoded video frame into an encoded video frame that complies with a video compression standard, and means for decoding the encoded video frame into an unencoded video frame.

Example 363 may include the subject matter of any of Examples 349-362, wherein each of the packets complies with a wireless communication protocol.

Example 364 may include the subject matter of any of Examples 349-363, wherein the video frame is one of a plurality of video frames of a video.

Example 365 is an apparatus for wireless display of video data, the apparatus comprising: a wireless display pipeline comprising components, the components comprising: an encoder configured to encode a first portion of the video frame; a packetizer configured to generate packets corresponding to a second portion of the video frame simultaneous with the encoding of the first portion of the video frame by the encoder; and a transmitter configured to wirelessly transmit packets corresponding to a third portion of the video frame simultaneous with the generation of packets corresponding to the second portion of the video frame by the packetizer, wherein the wireless display pipeline is configured to reduce latency associated with a display of the video frame based on one of the components being configured to operate in parallel with others of the components on the video frame.

Example 366 may include the subject matter of Example 365, wherein the apparatus is configured to reduce latency associated with display of the video frame based on the encoder, the packetizer, and the transmitter being configured to operate in parallel on the video frame.

Example 367 may include the subject matter of Example 365, wherein the components further comprise: a render engine configured to render the fifth portion of the video frame.

Example 368 may include the subject matter of Example 367, wherein the encoder is configured to encode the first portion of the video frame simultaneous with the rendering of the fifth portion of the video frame by the encoder.

Example 369 may include the subject matter of Example 365, wherein the components further comprise: a display engine configured to compose a sixth portion of a video frame;

Example 370 may include the subject matter of Example 369, wherein the encoder is configured to encode the first portion of the video frame simultaneous with the composing of the sixth portion of the video frame by the display engine.

Example 371 may include the subject matter of Example 367 and 369, wherein the display engine is configured to compose the sixth portion of a video frame simultaneous with the rendering of the fifth portion of the video frame by the render engine, and the encoder is configured to encode the first portion of the video frame simultaneous with the composing of the sixth portion of the video frame by the display engine.

Example 372 may include the subject matter of Example 365, 367, and/or 369, wherein each in the group is configured to operate in parallel with others in the group on the video frame.

Example 373 may include the subject matter of Example 372, wherein the latency is measured relative to a display of the video frame.

Example 374 may include the subject matter of Example 372, wherein the encoder comprises a codec configured to: encode an unencoded video frame into an encoded video frame that complies with a video compression standard, and decode the encoded video frame into an unencoded video frame.

Example 375 may include the subject matter of Example 365, wherein the transmitter comprises a radio transmitter configured to transmit electromagnetic waves in a radio frequency.

Example 376 is a machine readable non-transitory storage medium having instructions stored thereon, wherein the instructions, when executed by at least one processor, causes the at least one processor to perform operations comprising: encoding a first portion of the video frame; generating packets corresponding to a second portion of the video frame simultaneous with the encoding of the first portion of the video frame by the encoder; wirelessly transmitting packets corresponding to a third portion of the video frame simultaneous with the generation of packets corresponding to the second portion of the video frame by the packetizer; and reducing latency associated with a display of the video frame based on one of the encoding, the generation of packets, and the transmitting being in parallel on the video frame.

Example 377 may include the subject matter of Example 376, wherein the operations comprise: reducing latency associated with display of the video frame based on the encoding, the generation of packets, and the transmitting being in parallel on the video frame.

Example 378 may include the subject matter of Example 376, wherein the operations comprise: rendering the fifth portion of the video frame.

Example 379 may include the subject matter of Example 378, wherein the operations comprise: encoding the first portion of the video frame simultaneous with the rendering of the fifth portion of the video frame by the encoder.

Example 380 may include the subject matter of Example 376, wherein the operations comprise: composing a sixth portion of a video frame;

Example 381 may include the subject matter of Example 380, wherein the operations comprise: encoding the first portion of the video frame simultaneous with the composing of the sixth portion of the video frame.

Example 382 may include the subject matter of Example 378 and 380, wherein the operations comprise: composing the sixth portion of a video frame simultaneous with the rendering of the fifth portion of the video frame, and encoding the first portion of the video frame simultaneous with the composing of the sixth portion of the video frame.

Example 383 may include the subject matter of Example 376, 378, and/or 380, wherein all of the encoding, the generation of packets, and the transmitting are in parallel on the video frame.

Example 384 may include the subject matter of Example 383, wherein the latency is measured relative to a display of the video frame.

Example 385 may include the subject matter of Example 383, wherein the operations comprise: encoding an unencoded video frame into an encoded video frame that complies with a video compression standard, and decoding the encoded video frame into an unencoded video frame.

Example 386 may include the subject matter of Example 376, wherein the transmitting comprises: transmitting electromagnetic waves in a radio frequency.

Example 387 is a method for wireless display of video data, the method comprising: encoding a first portion of the video frame; generating packets corresponding to a second portion of the video frame simultaneous with the encoding of the first portion of the video frame by the encoder; wirelessly transmitting packets corresponding to a third portion of the video frame simultaneous with the generation of packets corresponding to the second portion of the video frame by the packetizer; and reducing latency associated with a display of the video frame based on one of the encoding, the generation of packets, and the transmitting being in parallel on the video frame.

Example 388 may include the subject matter of Example 387, further comprising: reducing latency associated with display of the video frame based on the encoding, the generation of packets, and the transmitting being in parallel on the video frame.

Example 389 may include the subject matter of Example 387, further comprising: rendering the fifth portion of the video frame.

Example 390 may include the subject matter of Example 389, further comprising: encoding the first portion of the video frame simultaneous with the rendering of the fifth portion of the video frame by the encoder.

Example 391 may include the subject matter of Example 387, further comprising: composing a sixth portion of a video frame.

Example 392 may include the subject matter of Example 391, further comprising: encoding the first portion of the video frame simultaneous with the composing of the sixth portion of the video frame.

Example 393 may include the subject matter of Example 389 and 391, further comprising: composing the sixth portion of a video frame simultaneous with the rendering of the fifth portion of the video frame, and encoding the first portion of the video frame simultaneous with the composing of the sixth portion of the video frame.

Example 394 may include the subject matter of Example 387, 389, and 391, wherein all of the encoding, the generation of packets, and the transmitting are in parallel on the video frame.

Example 395 may include the subject matter of Example 394, wherein the latency is measured relative to a display of the video frame.

Example 396 may include the subject matter of Example 394, further comprising: encoding an unencoded video frame into an encoded video frame that complies with a video compression standard, and decoding the encoded video frame into an unencoded video frame.

Example 397 may include the subject matter of Example 387, wherein the transmitting comprises: transmitting electromagnetic waves in a radio frequency.

Example 398 is an apparatus for wireless display of video data, the apparatus comprising: means for encoding a first portion of the video frame; means for generating packets corresponding to a second portion of the video frame simultaneous with the encoding of the first portion of the video frame by the encoder; means for wirelessly transmitting packets corresponding to a third portion of the video frame simultaneous with the generation of packets corresponding to the second portion of the video frame by the packetizer; and means for reducing latency associated with a display of the video frame based on one of the encoding, the generation of packets, and the transmitting being in parallel on the video frame.

Example 399 may include the subject matter of Example 398, further comprising: means for reducing latency associated with display of the video frame based on the encoding, the generation of packets, and the transmitting being in parallel on the video frame.

Example 400 may include the subject matter of Example 398, further comprising: means for rendering the fifth portion of the video frame.

Example 401 may include the subject matter of Example 400, further comprising: means for encoding the first portion of the video frame simultaneous with the rendering of the fifth portion of the video frame by the encoder.

Example 402 may include the subject matter of Example 398, further comprising: means for composing a sixth portion of a video frame.

Example 403 may include the subject matter of Example 402, further comprising: means for encoding the first portion of the video frame simultaneous with the composing of the sixth portion of the video frame.

Example 404 may include the subject matter of Example 400 and 402, further comprising: means for composing the sixth portion of a video frame simultaneous with the rendering of the fifth portion of the video frame; and means for encoding the first portion of the video frame simultaneous with the composing of the sixth portion of the video frame.

Example 405 may include the subject matter of Example 398, 400, and 402, wherein all of the encoding, the generation of packets, and the transmitting are in parallel on the video frame.

Example 406 may include the subject matter of Example 405, wherein the latency is measured relative to a display of the video frame.

Example 407 may include the subject matter of Example 405, further comprising: means for encoding an unencoded video frame into an encoded video frame that complies with a video compression standard; and means for decoding the encoded video frame into an unencoded video frame.

Example 408 may include the subject matter of Example 398, wherein the transmitting comprises: transmitting electromagnetic waves in a radio frequency.

Example 409 is a system comprising: a first device configured to wirelessly transmit of a portion of a video frame; a second device configured to receive wireless transmission of the portion of a video frame; wherein the first device comprises a wireless display pipeline comprising components, the components comprising: a display engine configured to compose a video frame; an encoder configured to encode the video frame; a packetizer configured to generate packets corresponding to the video frame; and a wireless transmitter configured to wirelessly transmit packets corresponding to the video frame to the second device; and wherein the wireless display pipeline is configured to reduce latency associated with a display of the video frame on the second device based on one of the components being configured to operate in parallel with others of the components on the video frame.

Example 410 may include the subject matter of Example 409, further comprising: a render engine configured to render the video frame.

Example 411 is a method comprising: rendering a first portion of a video frame; and composing the first portion of the video frame while simultaneously rendering a second portion of the video frame.

Example 412 may include the subject matter of Example 411, further comprising: encoding the first portion of the video frame while simultaneously composing the second portion of the video frame.

Example 413 may include the subject matter of Example 412, further comprising: generate packets corresponding to the first portion of the video frame while simultaneously encoding a second portion of the video frame.

Example 414 may include the subject matter of Example 413, further comprising: transmitting the packets corresponding to the first portion of the video frame while simultaneously generating packets corresponding to a second portion of the video frame.

Example 415 is an apparatus comprising means to perform a method as specified in any of Examples 411-414.

Example 416 is a machine-readable storage including machine-readable instructions, when executed, to implement a method or realize an apparatus as specified in any of Examples 411-414.

Example 417 is a machine readable medium including code, when executed, to cause a machine to perform the methods of any one of Examples 411-414.

Example 418 is a machine readable non-transitory storage medium having instructions stored thereon, wherein the instructions, when executed by at least one processor, causes the at least one processor to perform operations comprising: rendering a first portion of a video frame; and composing the first portion of the video frame while simultaneously rendering a second portion of the video frame.

Example 419 may include the subject matter of Example 418, wherein the operations comprise: encoding the first portion of the video frame while simultaneously composing the second portion of the video frame.

Example 420 may include the subject matter of Example 419, wherein the operations comprise: generate packets corresponding to the first portion of the video frame while simultaneously encoding a second portion of the video frame.

Example 421 may include the subject matter of Example 420, wherein the operations comprise: transmitting the packets corresponding to the first portion of the video frame while simultaneously generating packets corresponding to a second portion of the video frame.

Example 422 is an apparatus comprising: means for rendering a first portion of a video frame; and means for composing the first portion of the video frame while simultaneously rendering a second portion of the video frame.

Example 423 may include the subject matter of Example 422, further comprising: means for encoding the first portion of the video frame while simultaneously composing the second portion of the video frame.

Example 424 may include the subject matter of Example 423, further comprising: means for generate packets corresponding to the first portion of the video frame while simultaneously encoding a second portion of the video frame.

Example 425 may include the subject matter of Example 424, further comprising: means for transmitting the packets corresponding to the first portion of the video frame while simultaneously generating packets corresponding to a second portion of the video frame.

Example 426 is a method comprising: composing a first portion of a video frame; and encoding the first portion of the video frame while simultaneously composing a second portion of the video frame.

Example 427 may include the subject matter of Example 426, further comprising: composing the first portion of the video frame while simultaneously rendering a third portion of the video frame.

Example 428 may include the subject matter of Example 427, further comprising: generating packets corresponding to the first portion of the video frame while simultaneously encoding a second portion of the video frame.

Example 429 may include the subject matter of Example 428, further comprising: transmitting the packets corresponding to the first portion of the video frame while simultaneously generating packets corresponding to a second portion of the video frame.

Example 430 is an apparatus comprising means to perform a method as specified in any of Examples 426-429.

Example 431 is a machine-readable storage including machine-readable instructions, when executed, to implement a method or realize an apparatus as specified in any of Examples 426-429.

Example 432 is a machine readable medium including code, when executed, to cause a machine to perform the methods of any one of Examples 426-429.

Example 433 is a machine readable non-transitory storage medium having instructions stored thereon, wherein the instructions, when executed by at least one processor, causes the at least one processor to perform operations comprising: composing a first portion of a video frame; and encoding the first portion of the video frame while simultaneously composing a second portion of the video frame.

Example 434 may include the subject matter of Example 433, wherein the operations comprise: composing the first portion of the video frame while simultaneously rendering a third portion of the video frame.

Example 435 may include the subject matter of Example 434, wherein the operations comprise: generating packets corresponding to the first portion of the video frame while simultaneously encoding a second portion of the video frame.

Example 436 may include the subject matter of Example 435, wherein the operations comprise: transmitting the packets corresponding to the first portion of the video frame while simultaneously generating packets corresponding to a second portion of the video frame.

Example 437 is an apparatus comprising: means for composing a first portion of a video frame; and means for encoding the first portion of the video frame while simultaneously composing a second portion of the video frame.

Example 438 may include the subject matter of Example 437, further comprising: means for composing the first portion of the video frame while simultaneously rendering a third portion of the video frame.

Example 439 may include the subject matter of Example 438, further comprising: means for generating packets corresponding to the first portion of the video frame while simultaneously encoding a second portion of the video frame.

Example 440 may include the subject matter of Example 439, further comprising: means for transmitting the packets corresponding to the first portion of the video frame while simultaneously generating packets corresponding to a second portion of the video frame.

Example 441 is a method comprising: encoding a first portion of a video frame; and generating packets corresponding to the first portion of the video frame while simultaneously encoding a second portion of the video frame.

Example 442 may include the subject matter of Example 441, further comprising: encoding the first portion of the video frame while simultaneously composing a third portion of the video frame.

Example 443 may include the subject matter of Example 442, wherein the composing comprises blending pixels of the third portion of the video.

Example 444 may include the subject matter of Example 443, wherein the composing comprises for at least one pixel of the third portion of the video, selecting one pixel from a plurality of options for pixels, using the one pixel selected as the at least one pixel of the third portion of the video.

Example 445 is an apparatus comprising means to perform a method as specified in any of Examples 441-444.

Example 446 is a machine-readable storage including machine-readable instructions, when executed, to implement a method or realize an apparatus as specified in any of Examples 441-444.

Example 447 is a machine readable medium including code, when executed, to cause a machine to perform the methods of any one of Examples 441-444.

Example 448 is a machine readable non-transitory storage medium having instructions stored thereon, wherein the instructions, when executed by at least one processor, causes the at least one processor to perform operations comprising: encoding a first portion of a video frame; and generating packets corresponding to the first portion of the video frame while simultaneously encoding a second portion of the video frame.

Example 449 may include the subject matter of Example 448, further comprising: encoding the first portion of the video frame while simultaneously composing a third portion of the video frame.

Example 450 may include the subject matter of Example 449, wherein the composing comprises blending pixels of the third portion of the video.

Example 451 may include the subject matter of Example 450, wherein the composing comprises: for at least one pixel of the third portion of the video: selecting one pixel from a plurality of options for pixels, and using the one pixel selected as the at least one pixel of the third portion of the video.

Example 452 is an apparatus comprising: means for encoding a first portion of a video frame; and means for generating packets corresponding to the first portion of the video frame while simultaneously encoding a second portion of the video frame.

Example 453 may include the subject matter of Example 448, further comprising: means for encoding the first portion of the video frame while simultaneously composing a third portion of the video frame.

Example 545 may include the subject matter of Example 449, wherein the means for composing comprises means for blending pixels of the third portion of the video.

Example 455 may include the subject matter of Example 450, wherein the composing comprises for at least one pixel of the third portion of the video, means for selecting one pixel from a plurality of options for pixels; and means for using the one pixel selected as the at least one pixel of the third portion of the video.

Example 456 is a method comprising:
generating packets corresponding to a first portion of a video frame;
transmitting the packets corresponding to the first portion of the video frame while simultaneously generating packets corresponding to a second portion of the video frame.

Example 457 may include the subject matter of Example 456, further comprising:
generating packets corresponding the first portion of the video frame while simultaneously encoding a third portion of the video frame.

Example 458 may include the subject matter of Example 456, further comprising:
generating packets corresponding the first portion of the video frame while simultaneously composing a third portion of the video frame.

Example 459 may include the subject matter of Example 456, further comprising: generating packets corresponding the first portion of the video frame while simultaneously rendering a third portion of the video frame.

Example 460 is an apparatus comprising means to perform a method as specified in any of Examples 456-459.

Example 461 is a machine-readable storage including machine-readable instructions, when executed, to implement a method or realize an apparatus as specified in any of Examples 456-459.

Example 462 is machine readable medium including code, when executed, to cause a machine to perform the methods of any one of Examples 456-459.

Example 463 is a machine readable non-transitory storage medium having instructions stored thereon, wherein the instructions, when executed by at least one processor, causes the at least one processor to perform operations comprising: generating packets corresponding to a first portion of a video frame; and transmitting the packets corresponding to the first portion of the video frame while simultaneously generating packets corresponding to a second portion of the video frame.

Example 464 may include the subject matter of Example 463, wherein the operations comprise: generating packets corresponding the first portion of the video frame while simultaneously encoding a third portion of the video frame.

Example 465 may include the subject matter of Example 463, wherein the operations comprise: generating packets corresponding the first portion of the video frame while simultaneously composing a third portion of the video frame.

Example 466 may include the subject matter of Example 463, wherein the operations comprise: generating packets corresponding the first portion of the video frame while simultaneously rendering a third portion of the video frame.

Example 467 is an apparatus comprising: means for generating packets corresponding to a first portion of a video frame; and means for transmitting the packets corresponding to the first portion of the video frame while simultaneously generating packets corresponding to a second portion of the video frame.

Example 468 may include the subject matter of Example 467, further comprising: means for generating packets corresponding the first portion of the video frame while simultaneously encoding a third portion of the video frame.

Example 469 may include the subject matter of Example 467, further comprising: means for generating packets corresponding the first portion of the video frame while simultaneously composing a third portion of the video frame.

Example 470 may include the subject matter of Example 467, further comprising: means for generating packets corresponding the first portion of the video frame while simultaneously rendering a third portion of the video frame.

What is claimed is:

1. An apparatus for wireless display of video data, the apparatus comprising:
    a render engine configured to:
        render a video frame;
    a display engine configured to:
        compose pixels of the video frame simultaneous with the rendering of the video frame by the render engine, and generate a first notification based on a determination that a threshold portion of the video frame is composed;
    one or more register configured to store an identifier corresponding to a first subset of the pixels of the video frame that are composed;
    an encoder configured to:
        encode groups of pixels of the video frame into encoded groups simultaneous with the composition of the video frame by the display engine, wherein the encoder, based on the first notification, encodes the groups based on a determination that the subset encloses the group and prevents encoding the group based on a determination that the subset excludes the group, and wherein the video frame comprises a plurality of tiles and each of the plurality of tiles comprises one or more of the groups, and
        for each tile in the plurality of tiles, generate a second notification based on completion of encoding an encoded tile corresponding to the tile; and
    a packetizer configured to:
        generate packets corresponding to the video frame simultaneous with the encoding of the video frame by the encoder, wherein for each tile in the plurality of tiles, the packets are generated from the encoded tile corresponding to the tile based on the second notification.

2. The apparatus of claim 1, wherein the apparatus is configured to:
    reduce latency associated with display of the video frame based on the generation of the packets corresponding to the video frame being simultaneous with the encoding of the video frame.

3. The apparatus of claim 1, wherein the display engine is configured to advance to a next video frame while the encoder is encoding the video frame,
    wherein the one or more register is configured to store an identifier corresponding to a second subset of the pixels of the video frame that are encoded; and
    wherein for each pixel of pixels of the next video frame the display engine is to:
    compose the pixel based on a determination that the second subset comprises the pixel, and
    prevent composing the pixel based on a determination that the second subset excludes the pixel.

4. The apparatus of claim 3, further comprising:
    a frame buffer comprising an area of memory in which to store the pixels of the video frame.

5. The apparatus of claim 4, wherein the frame buffer is shared by the encoder and the display engine; and
    wherein the display engine is further configured to:
    access a set of input pixels, each in the set of input pixels is to be retrieved from a corresponding location in one or more input buffer,
    generate an output pixel based on the set of input pixels, and
    store the output pixel in the frame buffer.

6. The apparatus of claim 3, wherein the one or more register further configured to store at least one bit indicating whether the display engine is composing and the encoder is encoding a same video frame.

7. The apparatus of claim 1, further comprising:
    a transmitter configured to wirelessly transmit the packets corresponding to the video frame simultaneous with the generation of other packets corresponding to the video frame by the packetizer.

8. The apparatus of claim 1, wherein the encoder is configured to:
    generate metadata descriptive of the encoded tile.

9. The apparatus of claim 8, wherein the packetizer is configured to:
    access the encoded tile based on the metadata.

10. The apparatus of claim 8, wherein the metadata comprises:
- a signature comprising a particular sequence of bits,
- a value identifying a size of an area of memory occupied by the encoded tile,
- a frame number corresponding to the video frame to which the tile belongs, and
- a tile number corresponding to the tile.

11. A machine readable non-transitory storage medium having instructions stored thereon, wherein the instructions, when executed by at least one processor, causes the at least one processor to perform operations comprising:
- rendering a video frame;
- composing pixels of the video frame simultaneous with the rendering of the video frame;
- generating a first notification based on a determination that a threshold portion of the video frame is composed;
- storing an identifier corresponding to a first subset of the pixels of the video frame that are composed;
- encoding, based on the first notification, groups of pixels of the video frame into encoded groups; simultaneous with the composition of the video frame, wherein the groups are encoded based on a determination that the subset encloses the group and are not encoded based on a determination that the subset excludes the group, and wherein the video frame comprises a plurality of tiles and each of the plurality of tiles comprises one or more of the groups;
- for each tile in the plurality of tiles: generating a second notification based on completion of encoding an encoded tile corresponding to the tile; and
- generating packets corresponding to the video frame simultaneous with the encoding of the video frame, wherein for each tile in the plurality of tiles: the packets are generated from the encoded tile corresponding to the tile based on the second notification.

12. The machine readable non-transitory storage medium of claim 11, wherein the operations comprise:
- reducing latency associated with display of the video frame based on the generation of the packets corresponding to the video frame being simultaneous with the encoding of the video frame.

13. The machine readable non-transitory storage medium of claim 11, wherein the operations further comprise:
- generating metadata descriptive of the encoded tile.

14. The machine readable non-transitory storage medium of claim 13, wherein the metadata comprises:
- a signature comprising a particular sequence of bits,
- a value identifying a size of an area of memory occupied by the encoded tile,
- a frame number corresponding to the video frame to which the tile belongs, and
- a tile number corresponding to the tile.

15. A method for wireless display of video data, the method comprising:
- rendering a video frame;
- composing pixels of the video frame simultaneous with the rendering of the video frame;
- generating a first notification based on a determination that a threshold portion of the video frame is composed;
- storing an identifier corresponding to a first subset of the pixels of the video frame that are composed;
- encoding, based on the first notification, groups of pixels of the video frame into encoded groups simultaneous with the composition of the video frame, wherein the groups are encoded based on a determination that the subset encloses the group and are not encoded based on a determination that the subset excludes the group, and wherein the video frame comprises a plurality of tiles and each of the plurality of tiles comprises one or more of the groups;
- for each tile in the plurality of tiles: generating a second notification based on completion of encoding an encoded tile corresponding to the tile; and
- generating packets corresponding to the video frame simultaneous with the encoding of the video frame, wherein for each tile in the plurality of tiles: the packets are generated from the encoded tile corresponding to the tile based on the second notification.

16. The method of claim 15, further comprising:
- reducing latency associated with display of the video frame based on the generation of the packets corresponding to the video frame being simultaneous with the encoding of the video frame.

17. The method of claim 15, further comprising:
- generating metadata descriptive of the encoded tile.

18. The method of claim 17,
wherein the metadata comprises:
- a signature comprising a particular sequence of bits,
- a value identifying a size of an area of memory occupied by the encoded tile,
- a frame number corresponding to the video frame to which the tile belongs, and
- a tile number corresponding to the tile.

19. A system comprising:
- a first device configured to wirelessly transmit of a portion of a video frame;
- a second device configured to receive wireless transmission of the portion of a video frame;
- wherein the first device comprises
- a wireless display pipeline comprising components, the components comprising:
- a render engine configured to render a video frame;
- a display engine configured to compose pixels of the video frame simultaneous with the rendering of the video frame by the render engine and generate a first notification based on a determination that a threshold portion of the video frame is composed;
- a register configured to store an identifier corresponding to a first subset of the pixels of the video frame that are composed;
- an encoder configured to encode the video frame simultaneous with the composition of the video frame by the display engine, wherein the encoder, based on the first notification, encodes the groups based on a determination that the subset encloses the group and prevents encoding the group based on a determination that the subset excludes the group, and wherein the video frame comprises a plurality of tiles and each of the plurality of tiles comprises one or more of the groups, and for each tile in the plurality of tiles, generate a second notification based on completion of encoding an encoded tile corresponding to the tile;
- a packetizer configured to generate packets corresponding to the video frame simultaneous with the encoding of the video frame by the encoder, wherein for each tile in the plurality of tiles, the packets are generated from the encoded tile corresponding to the tile based on the second notification; and
- a wireless transmitter configured to wirelessly transmit packets corresponding to the video frame to the second device.

20. The system of claim 19,
wherein the wireless display pipeline is configured to reduce latency associated with display of the video frame based on the generation of the packets corresponding to the video frame being simultaneous with the encoding of the video frame.

\* \* \* \* \*